(12) United States Patent
Suess et al.

(10) Patent No.: US 12,363,457 B2
(45) Date of Patent: Jul. 15, 2025

(54) FIXED PATTERN NOISE REDUCTION IN IMAGE SENSORS OPERATED WITH PULSED ILLUMINATION

(71) Applicant: OMNIVISION TECHNOLOGIES, INC., Santa Clara, CA (US)

(72) Inventors: Andreas Suess, San Jose, CA (US); Tomas Geurts, Santa Clara, CA (US)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 160 days.

(21) Appl. No.: 18/451,764

(22) Filed: Aug. 17, 2023

(65) Prior Publication Data

US 2024/0073557 A1    Feb. 29, 2024

Related U.S. Application Data

(60) Provisional application No. 63/373,722, filed on Aug. 28, 2022.

(51) Int. Cl.

| | | |
|---|---|---|
| H04N 25/67 | (2023.01) | |
| H04N 25/616 | (2023.01) | |
| H04N 25/63 | (2023.01) | |
| H04N 25/671 | (2023.01) | |
| H04N 25/706 | (2023.01) | |
| H04N 25/709 | (2023.01) | |
| H04N 25/76 | (2023.01) | |
| H04N 25/771 | (2023.01) | |
| H04N 25/78 | (2023.01) | |

(52) U.S. Cl.
CPC ......... *H04N 25/67* (2023.01); *H04N 25/616* (2023.01); *H04N 25/671* (2023.01); *H04N 25/706* (2023.01); *H04N 25/709* (2023.01); *H04N 25/7795* (2023.01); *H04N 25/78* (2023.01)

(58) Field of Classification Search
CPC .... H04N 25/67; H04N 25/709; H04N 25/616; H04N 25/671; H04N 25/706; H04N 25/78; H04N 25/63; H04N 25/77; H04N 25/771; H04N 25/7795
See application file for complete search history.

(56) References Cited

U.S. PATENT DOCUMENTS

| | | | |
|---|---|---|---|
| 11,729,524 B2 * | 8/2023 | Jin | H04N 25/531 |
| 2019/0006403 A1 * | 1/2019 | Ikeda | H10F 39/809 |
| 2019/0124278 A1 * | 5/2019 | Velichko | H04N 25/583 |

\* cited by examiner

*Primary Examiner* — Marly S Camargo
(74) *Attorney, Agent, or Firm* — Perkins Coie LLP; Daniel L. Jackstadt

(57) ABSTRACT

Fixed pattern noise (FPN) reduction techniques in image sensors operated with pulse illumination are disclosed herein. In one embodiment, a method includes, during a first sub-exposure period of a frame, (a) operating a first tap of a pixel to capture a first signal corresponding to first charge at a first floating diffusion, the first charge corresponding to first light incident on a photosensor, and (b) operating a second tap of the pixel to capture a first parasitic signal corresponding to FPN at a second floating diffusion. The method further includes, during a second sub-exposure period of the frame, (a) operating the second tap to capture a second signal corresponding to second charge at the second floating diffusion, the second charge corresponding to second light incident on the photosensor, and (b) operating the first tap to capture a second parasitic signal corresponding to FPN at the first floating diffusion.

39 Claims, 31 Drawing Sheets

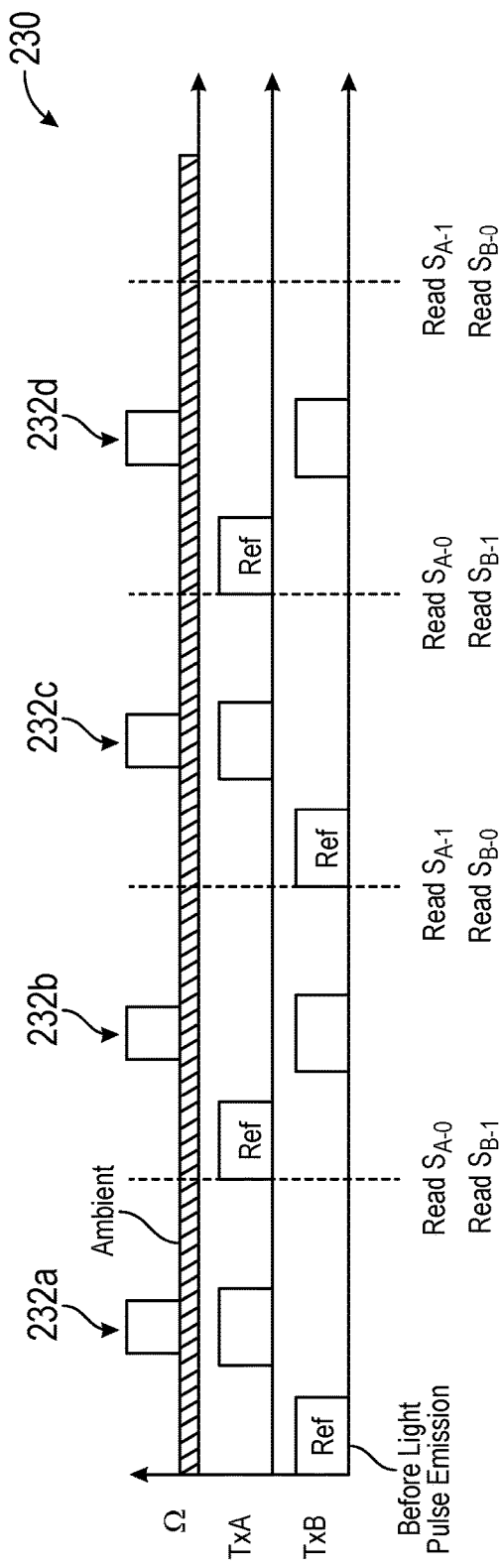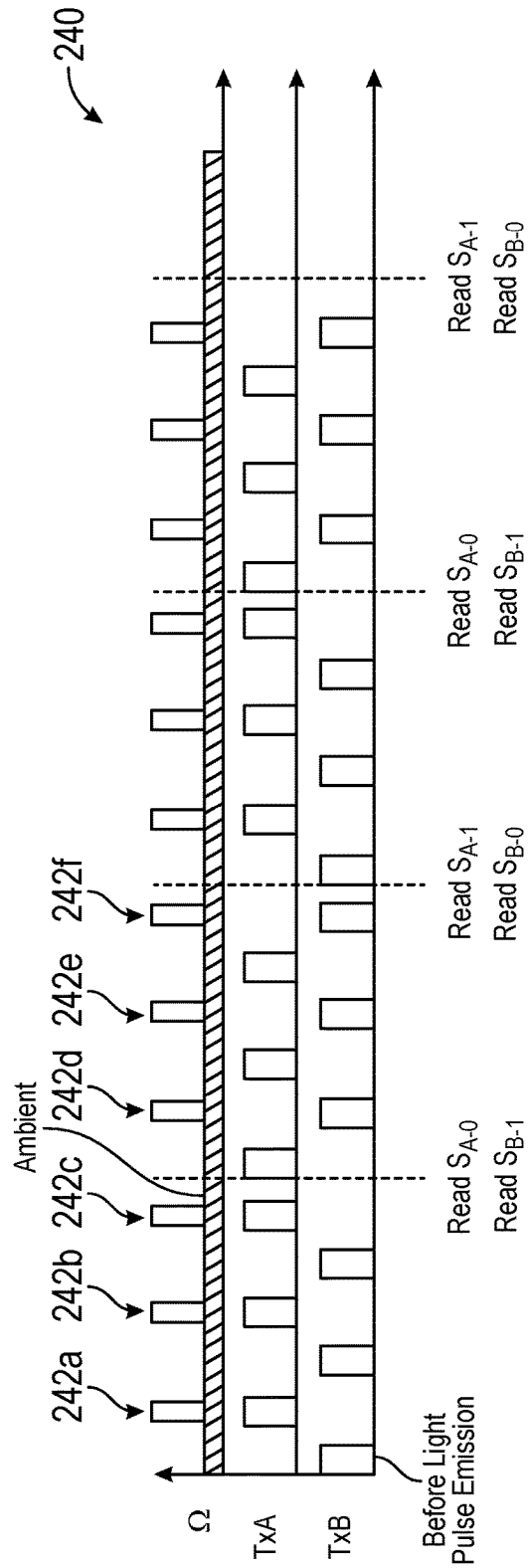
FIG. 2A
FIG. 2B

| step | cap | signal | status |
|---|---|---|---|
| sample 1 | #1 | $S_{A\text{-}0\text{-}\Delta V12}$ | new |
|  | #2 | $S_{B\text{-}1\text{-}\Delta V12}$ | new |
|  | #3 |  | empty |
|  | #4 |  | empty |
|  | #5 |  | empty |
|  | #6 |  | empty |
| sample 2 | #1 | $S_{A\text{-}0\text{-}\Delta V12}$ |  |
|  | #2 | $S_{B\text{-}1\text{-}\Delta V12}$ |  |
|  | #3 | $S_{A\text{-}0\text{-}\Delta V34}$ | new |
|  | #4 | $S_{B\text{-}1\text{-}\Delta V34}$ | new |
|  | #5 |  | empty |
|  | #6 |  | empty |
| sum 1 | #1 | $S_{A\text{-}0}$ | new |
|  | #2 | $S_{B\text{-}1}$ | new |
|  | #3 |  | empty |
|  | #4 |  | empty |
|  | #5 |  | empty |
|  | #6 |  | empty |
| sample 3 | #1 | $S_{A\text{-}0}$ |  |
|  | #2 | $S_{B\text{-}1}$ |  |
|  | #3 | $S_{A\text{-}1\text{-}\Delta V12}$ | new |
|  | #4 | $S_{B\text{-}0\text{-}\Delta V12}$ | new |
|  | #5 |  | empty |
|  | #6 |  | empty |
| sample 4 | #1 | $S_{A\text{-}0}$ |  |
|  | #2 | $S_{B\text{-}1}$ |  |
|  | #3 | $S_{A\text{-}1\text{-}\Delta V12}$ |  |
|  | #4 | $S_{B\text{-}0\text{-}\Delta V12}$ |  |
|  | #5 | $S_{A\text{-}1\text{-}\Delta V34}$ | new |
|  | #6 | $S_{B\text{-}0\text{-}\Delta V34}$ | new |
| sum 2 | #1 | $S_{A\text{-}0}$ |  |
|  | #2 | $S_{B\text{-}1}$ |  |
|  | #3 | $S_{A\text{-}1}$ | new |
|  | #4 | $S_{B\text{-}0}$ | new |
|  | #5 |  | empty |
|  | #6 |  | empty |
| sum 3 | #1 | $(S_{A\text{-}0})+(S_{B\text{-}0})$ | new |
|  | #2 | $(S_{A\text{-}1})+(S_{B\text{-}1})$ | new |
|  | #3 |  | empty |
|  | #4 |  | empty |
|  | #5 |  | empty |
|  | #6 |  | empty |
| read difference |  |  |  |

| step | cap | signal | status | step | cap | signal | status |
|---|---|---|---|---|---|---|---|
| sample 1 | #1 | $S_{A\text{-}0\text{-}V1}$ | new | sample 4 | #1 | $S_{A\text{-}0\text{-}V13}$ | |
| | #2 | $S_{B\text{-}1\text{-}V1}$ | new | | #2 | $S_{B\text{-}1\text{-}V13}$ | |
| | #3 | | empty | | #3 | $S_{A\text{-}0\text{-}V2}$ | |
| | #4 | | empty | | #4 | $S_{B\text{-}1\text{-}V2}$ | |
| | #5 | | empty | | #5 | $S_{A\text{-}0\text{-}V4}$ | new |
| | #6 | | empty | | #6 | $S_{B\text{-}1\text{-}V4}$ | new |
| | #7 | | empty | | #7 | | empty |
| | #8 | | empty | | #8 | | empty |
| | #9 | | empty | | #9 | | empty |
| | #10 | | empty | | #10 | | empty |
| sample 2 | #1 | $S_{A\text{-}0\text{-}V1}$ | | sum 2 | #1 | $S_{A\text{-}0\text{-}V13}$ | |
| | #2 | $S_{B\text{-}1\text{-}V1}$ | | | #2 | $S_{B\text{-}1\text{-}V13}$ | |
| | #3 | $S_{A\text{-}0\text{-}V2}$ | new | | #3 | $S_{A\text{-}0\text{-}V24}$ | new |
| | #4 | $S_{B\text{-}1\text{-}V2}$ | new | | #4 | $S_{B\text{-}1\text{-}V24}$ | new |
| | #5 | | empty | | #5 | | empty |
| | #6 | | empty | | #6 | | empty |
| | #7 | | empty | | #7 | | empty |
| | #8 | | empty | | #8 | | empty |
| | #9 | | empty | | #9 | | empty |
| | #10 | | empty | | #10 | | empty |
| sample 3 | #1 | $S_{A\text{-}0\text{-}V1}$ | | sample 5 | #1 | $S_{A\text{-}0\text{-}V13}$ | |
| | #2 | $S_{B\text{-}1\text{-}V1}$ | | | #2 | $S_{B\text{-}1\text{-}V13}$ | |
| | #3 | $S_{A\text{-}0\text{-}V2}$ | | | #3 | $S_{A\text{-}0\text{-}V24}$ | |
| | #4 | $S_{B\text{-}1\text{-}V2}$ | | | #4 | $S_{B\text{-}1\text{-}V24}$ | |
| | #5 | $S_{A\text{-}0\text{-}V3}$ | new | | #5 | $S_{A\text{-}1\text{-}V1}$ | new |
| | #6 | $S_{B\text{-}1\text{-}V3}$ | new | | #6 | $S_{B\text{-}0\text{-}V1}$ | new |
| | #7 | | empty | | #7 | | empty |
| | #8 | | empty | | #8 | | empty |
| | #9 | | empty | | #9 | | empty |
| | #10 | | empty | | #10 | | empty |
| sum 1 | #1 | $S_{A\text{-}0\text{-}V13}$ | new | sample 6 | #1 | $S_{A\text{-}0\text{-}V13}$ | |
| | #2 | $S_{B\text{-}1\text{-}V13}$ | new | | #2 | $S_{B\text{-}1\text{-}V13}$ | |
| | #3 | $S_{A\text{-}0\text{-}V2}$ | | | #3 | $S_{A\text{-}0\text{-}V24}$ | |
| | #4 | $S_{B\text{-}1\text{-}V2}$ | | | #4 | $S_{B\text{-}1\text{-}V24}$ | |
| | #5 | | empty | | #5 | $S_{A\text{-}1\text{-}V1}$ | |
| | #6 | | empty | | #6 | $S_{B\text{-}0\text{-}V1}$ | |
| | #7 | | empty | | #7 | $S_{A\text{-}1\text{-}V2}$ | new |
| | #8 | | empty | | #8 | $S_{B\text{-}0\text{-}V2}$ | new |
| | #9 | | empty | | #9 | | empty |
| | #10 | | empty | | #10 | | empty |

*FIG. 21*

| step | cap | signal | status | step | cap | signal | status |
|---|---|---|---|---|---|---|---|
| sample 7 | #1 | $S_{A\text{-}0\text{-}V13}$ | | sample 8 | #1 | $(S_{A\text{-}0\text{-}V13}) + (S_{B\text{-}0\text{-}V13})$ | |
| | #2 | $S_{B\text{-}1\text{-}V13}$ | | | #2 | $(S_{A\text{-}1\text{-}V13}) + (S_{B\text{-}1\text{-}V13})$ | |
| | #3 | $S_{A\text{-}0\text{-}V24}$ | | | #3 | $S_{A\text{-}0\text{-}V24}$ | |
| | #4 | $S_{B\text{-}1\text{-}V24}$ | | | #4 | $S_{B\text{-}1\text{-}V24}$ | |
| | #5 | $S_{A\text{-}1\text{-}V1}$ | | | #5 | | empty |
| | #6 | $S_{B\text{-}0\text{-}V1}$ | | | #6 | | empty |
| | #7 | $S_{A\text{-}1\text{-}V2}$ | | | #7 | $S_{A\text{-}1\text{-}V2}$ | |
| | #8 | $S_{B\text{-}0\text{-}V2}$ | | | #8 | $S_{B\text{-}0\text{-}V2}$ | |
| | #9 | $S_{A\text{-}1\text{-}V3}$ | new | | #9 | $S_{A\text{-}1\text{-}V4}$ | new |
| | #10 | $S_{B\text{-}0\text{-}V3}$ | new | | #10 | $S_{B\text{-}0\text{-}V4}$ | new |
| sum 3 | #1 | $S_{A\text{-}0\text{-}V13}$ | | sum 5 | #1 | $(S_{A\text{-}0\text{-}V13}) + (S_{B\text{-}0\text{-}V13})$ | |
| | #2 | $S_{B\text{-}1\text{-}V13}$ | | | #2 | $(S_{A\text{-}1\text{-}V13}) + (S_{B\text{-}1\text{-}V13})$ | |
| | #3 | $S_{A\text{-}0\text{-}V24}$ | | | #3 | $S_{A\text{-}0\text{-}V24}$ | |
| | #4 | $S_{B\text{-}1\text{-}V24}$ | | | #4 | $S_{B\text{-}1\text{-}V24}$ | |
| | #5 | $S_{A\text{-}1\text{-}V13}$ | new | | #5 | | empty |
| | #6 | $S_{B\text{-}0\text{-}V13}$ | new | | #6 | | empty |
| | #7 | $S_{A\text{-}1\text{-}V2}$ | | | #7 | $S_{A\text{-}1\text{-}V24}$ | new |
| | #8 | $S_{B\text{-}0\text{-}V2}$ | | | #8 | $S_{B\text{-}0\text{-}V24}$ | new |
| | #9 | | empty | | #9 | | empty |
| | #10 | | empty | | #10 | | empty |
| sum 4 | #1 | $(S_{A\text{-}0\text{-}V13}) + (S_{B\text{-}0\text{-}V13})$ | new | sum 6 | #1 | $(S_{A\text{-}0\text{-}V13}) + (S_{B\text{-}0\text{-}V13})$ | |
| | #2 | $(S_{A\text{-}1\text{-}V13}) + (S_{B\text{-}1\text{-}V13})$ | new | | #2 | $(S_{A\text{-}1\text{-}V13}) + (S_{B\text{-}1\text{-}V13})$ | |
| | #3 | $S_{A\text{-}0\text{-}V24}$ | | | #3 | $(S_{A\text{-}0\text{-}V24}) + (S_{B\text{-}0\text{-}V24})$ | new |
| | #4 | $S_{B\text{-}1\text{-}V24}$ | | | #4 | $(S_{A\text{-}1\text{-}V24}) + (S_{B\text{-}1\text{-}V24})$ | new |
| | #5 | | empty | | #5 | | empty |
| | #6 | | empty | | #6 | | empty |
| | #7 | $S_{A\text{-}1\text{-}V2}$ | | | #7 | | empty |
| | #8 | $S_{B\text{-}0\text{-}V2}$ | | | #8 | | empty |
| | #9 | | empty | | #9 | | empty |
| | #10 | | empty | | #10 | | empty |
| | | | | read difference | | | |

*FIG. 21 (Continued)*

FIXED PATTERN NOISE REDUCTION IN IMAGE SENSORS OPERATED WITH PULSED ILLUMINATION

CROSS-REFERENCE TO RELATED APPLICATION(S)

The present application claims the benefit of U.S. Provisional Patent Application No. 63/373,722, filed Aug. 28, 2022, which is incorporated by reference herein in its entirety.

TECHNICAL FIELD

This disclosure relates generally to image sensors. For example, several embodiments of the present technology relate to methods of operating pixels to reduce fixed pattern noise, such as in image sensors operated with pulsed illumination.

BACKGROUND

Image sensors have become ubiquitous and are now widely used in digital cameras, cellular phones, security cameras, as well as medical, automobile, and other applications. As image sensors are integrated into a broader range of electronic devices, it is desirable to enhance their functionality, performance metrics, and the like in as many ways as possible (e.g., resolution, power consumption, dynamic range, etc.) through both device architecture design as well as image acquisition processing.

A typical image sensor operates in response to image light from an external scene being incident upon the image sensor. The image sensor includes an array of pixels having photosensitive elements (e.g., photodiodes) that absorb a portion of the incident image light and generate image charge upon absorption of the image light. The image charge photogenerated by the pixels may be measured as analog output image signals on column bitlines that vary as a function of the incident image light. In other words, the amount of image charge generated is proportional to the intensity of the image light, which is read out as analog image signals from the column bitlines and converted to digital values to provide information that is representative of the external scene.

BRIEF DESCRIPTION OF THE DRAWINGS

Non-limiting and non-exhaustive embodiments of the present technology are described below with reference to the following figures, in which like or similar reference characters are used to refer to like or similar components throughout unless otherwise specified.

FIGS. 2A and 2B are timing diagrams illustrating methods of operating pixels in accordance with various embodiments of the present technology.

FIG. 19 is a table illustrating a method of operating the pixel of FIG. 18, in accordance with various embodiments of the present technology.

FIG. 21 is a table illustrating a method of operating the pixel of FIG. 20, in accordance with various embodiments of the present technology.

Figure 1:
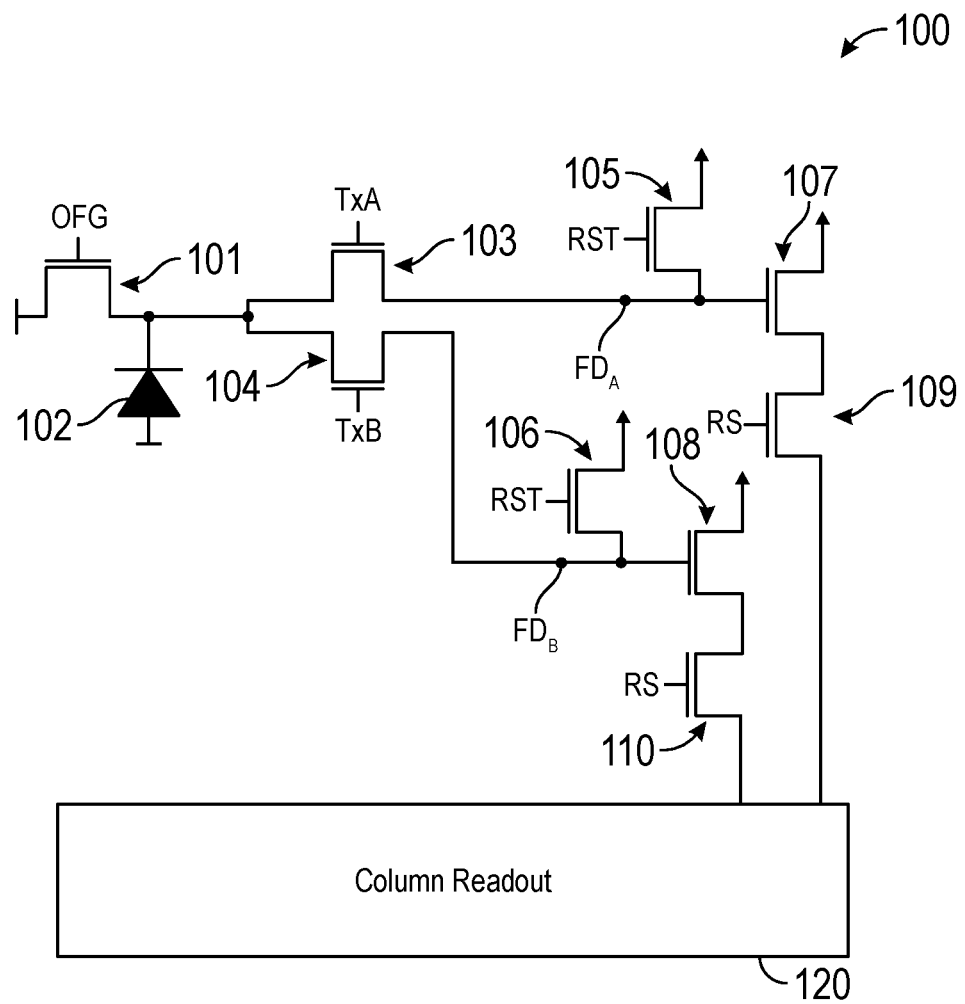
FIG. 1 is a partially schematic circuit diagram of a pixel configured in accordance with various embodiments of the present technology.

Skilled artisans will appreciate that elements in the figures are illustrated for simplicity and clarity and are not necessarily drawn to scale. For example, the dimensions of some of the elements in the figures may be exaggerated relative to other elements to aid in understanding of various aspects of the present technology. In addition, common but well-understood elements or methods that are useful or necessary in a commercially feasible embodiment are often not depicted in the figures, or described in detail below, to avoid unnecessarily obscuring the description of various aspects of the present technology.

DETAILED DESCRIPTION

The present disclosure relates to image sensors that are used in combination with pulsed illumination. For example, several embodiments of the present technology are directed to pixels and to associated methods of operating the pixels for reducing fixed pattern noise (e.g., dark current fixed pattern noise, ambient parasitic light sensitivity, and pulsed-signal parasitic light sensitivity). Some of the methods described herein employ correlated double sampling (CDS) techniques, while others of the methods described herein employ quadruple sampling techniques. In the following description, specific details are set forth to provide a thorough understanding of aspects of the present technology. One skilled in the relevant art will recognize, however, that the systems, devices, and techniques described herein can be practiced without one or more of the specific details set forth herein, or with other methods, components, materials, etc.

Reference throughout this specification to an "example" or an "embodiment" means that a particular feature, structure, or characteristic described in connection with the example or embodiment is included in at least one example or embodiment of the present technology. Thus, use of the phrases "for example," "as an example," or "an embodiment" herein are not necessarily all referring to the same example or embodiment and are not necessarily limited to the specific example or embodiment discussed. Furthermore, features, structures, or characteristics of the present technology described herein may be combined in any suitable manner to provide further examples or embodiments of the present technology.

Spatially relative terms (e.g., "beneath," "below," "over," "under," "above," "upper," "top," "bottom," "left," "right," "center," "middle," and the like) may be used herein for ease of description to describe one element's or feature's relationship relative to one or more other elements or features as illustrated in the figures. It will be understood that the spatially relative terms are intended to encompass different orientations of a device or system in use or operation, in addition to the orientation depicted in the figures. For example, if a device or system illustrated in the figures is rotated, turned, or flipped about a horizontal axis, elements or features described as "below" or "beneath" or "under" one or more other elements or features may then be oriented "above" the one or more other elements or features. Thus, the exemplary terms "below" and "under" are non-limiting and can encompass both an orientation of above and below. The device or system may additionally, or alternatively, be otherwise oriented (e.g., rotated ninety degrees about a vertical axis, or at other orientations) than illustrated in the figures, and the spatially relative descriptors used herein are interpreted accordingly. In addition, it will also be understood that when an element is referred to as being "between" two other elements, it can be the only element between the two other elements, or one or more intervening elements may also be present.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

A. Overview

Image sensors are often used in combination with pulsed illumination for a variety of applications (e.g., automobile applications, indirect time-of-flight (iTOF) applications, blood pressure measurement/monitoring applications, blood oxygen saturation level measurement/monitoring applications, active stereo applications, structured light applications, laser scanning applications). For example, image sensors are commonly employed with pulsed illumination in the automobile industry in safety systems, driving assistant systems, and in-cabin monitors. As a specific example, image sensors are commonly used in cameras directed in front of an automobile to detect objects (e.g., people, cars, traffic signs), capture speed measurements, detect road lines, and/or measure distances between the automobile and another vehicle in front of the automobile. Such front cameras often employ gated imaging to address low-light or poor visibility conditions. For example, in the dark, the energy or intensity of active illumination (a) projected in front of an automobile by a light source on the automobile and (b) received at a given location in front of the automobile, is inversely proportional to the square of the distance between the given location and the light source. Thus, the illumination can be pulsed to enable adjustment of the exposure of an image sensor in a front camera of the automobile versus the distance the image sensor 'sees' in front of the automobile (similar to high dynamic range techniques), where a number of light pulses projected in front of the automobile is positively correlated with the distance the image sensor 'sees' in front of the automobile.

As another example, in poor driving conditions (e.g., fog), illumination projected in front of an automobile is largely scattered, and (often) neither short-wave infrared nor thermal imaging is enough to provide adequate visibility in such conditions. Thus, in these scenarios, illumination projected in front of an automobile can be pulsed, and short exposure time-gate techniques can be employed such that only content within a depth slice in front of the automobile is captured by an image sensor in a front camera of the automobile. Scattered light outside of the selected depth slice can be suppressed and not captured by the image sensor.

Another automobile application in which image sensors with pulsed illumination are commonly employed is in driver monitor systems. For example, infrared illuminators are often used in systems that monitor a driver to detect and reduce glare perceived by the driver. The infrared illumination can be pulsed to increase the signal-to-noise ratio of illumination detected by an image sensor of a camera used in the monitoring system.

A common problem in several of the above applications is fixed pattern noise (FPN), including dark current FPN, ambient parasitic light sensitivity (PLS), and pulsed-signal PLS. PLS refers to the sensitivity of an image sensor to light outside of an exposure period (e.g., when the 'shutter' is closed). In pulsed illumination applications, signal light may arrive at an image sensor late or early due to, for example, reflections off glass covering or protecting the image sensor, multipath reflections in an external scene, scattering, etc. Signal light that arrives at the image sensor early or late and that is detected by the image sensor can be undesirable noise in several applications. Pulsed-signal PLS refers to such undesirable noise.

Various techniques can be employed to address FPN. For example, a 1-tap pixel can be operated to (a) transfer first charge captured by a photosensor during a bright frame (e.g., a frame in which a light source emits a pulse of light) to a floating diffusion, (b) read out a signal corresponding to the first charge at the end of the bright frame, (c) transfer second charge captured by the photosensor during a dark frame (e.g., a frame in which the light source does not emit a pulse of light) to the floating diffusion, and (d) read out a reference signal corresponding to the second charge at the end of the dark frame. During the bright frame, the first charge can be transferred to the floating diffusion at a timing corresponding to the pulse of light emitted by the light source. After readout, the reference signal from the dark frame can be used to factor out dark current FPN and ambient PLS from the signal corresponding to the bright frame. Such a technique, however, does not account for pulsed-signal PLS. In addition, the temporal multiplexing employed in this technique limits the sampling frequency of the image sensor.

In a second technique, a 1-tap pixel can be operated to (a) transfer, at a timing corresponding to when a light source emits a first pulse of light during a first bright frame, first charge captured by a photosensor to a floating diffusion; (b) read out a signal corresponding to the first charge at the end of the first bright frame; (c) transfer, at a timing before the light source emits a second pulse of light during a second bright frame, second charge captured by the photosensor to the floating diffusion; and (d) read out a reference signal corresponding to the second charge at the end of the second bright frame. The reference signal can then be used to factor out dark current FPN, ambient PLS, and pulsed-signal PLS from the signal corresponding to the first bright frame. Such a technique, however, doubles the power consumed by the illuminator in comparison to the first technique discussed above. In addition, similar to the first technique discussed above, the temporal multiplexing employed in this second technique limits the sampling frequency of the image sensor.

In a third technique, a 2-tap pixel can be operated to (a) transfer, using a first transfer transistor and at a timing before a light source emits a first pulse of light during a first bright frame, first charge captured by a photosensor to a first floating diffusion; (b) transfer, using a second transfer transistor and at a timing corresponding to when the light source emits the first pulse of light during the first bright frame, second charge captured by the photosensor to a second floating diffusion; (c) read out a signal corresponding to the second charge at the end of the first bright frame; (d) transfer, using the first transfer transistor and at a timing before the light source emits a second pulse of light during a second bright frame, third charge captured by the photosensor to the first floating diffusion; (e) transfer, using the second transfer transistor and at a timing corresponding to when the light source emits the second pulse during the second bright frame, fourth charge captured by the photosensor to the second floating diffusion; and (f) read out a reference signal corresponding to the first and third charge at the end of the second bright frame. The reference signal can then be used to factor out dark current FPN, ambient PLS, and pulsed-signal PLS from the signal read out at the end of the first bright frame. In this technique, however, there exists a mismatch in the PLS and the dark current FPN captured in the signal and reference signal, which can cause residual errors. In addition, this third technique can suffer residual errors from offset or gain errors between the different transfer transistors.

To address these concerns, the present technology is directed to 2-tap pixels and methods of operating the same that can be employed to reduce FPN (e.g., dark current FPN, ambient PLS, and pulsed-signal PLS) in image sensors that are operated with pulsed illumination. For example, several embodiments of the present technology are directed to 2-tap pixels in which (a) during a first bright frame or sub-exposure, a first tap is operated to capture one or more first light pulses emitted by a light source and a second tap is operated to capture FPN at one or more timings when the light source is not emitting the one or more first light pulses; and (b) during a second (e.g., subsequent, immediately following) bright frame or sub-exposure, the first tap is operated to capture FPN at one or more timings when the light source is not emitting one or more second light pulses and the second tap is operated to capture the one or more second light pulses emitted by the light source. In turn, each tap can be read out using CDS techniques or quadruple sampling techniques, and the different signals read out from the first and second taps can be used to factor out FPN.

Because each light pulse emitted by the light source is captured during each frame or sub-exposure, the present technology does not utilize or require extra illuminator power. In addition, the temporal multiplexing employed by the present technology is not expected to significantly limit sampling frequency. Furthermore, the present technology is expected to avoid mismatches between captured dark current FPN and PLS. Thus, the present technology is expected to reduce residual errors that can occur due to mismatches. Moreover, because both the first and second taps of a pixel are used to capture light pulses emitted by a light source as well as FPN, the present technology is expected to reduce or avoid residual errors that can occur due to offset or gain errors between the different transfer transistors of the taps.

B. Selected Embodiments of Image Sensors and Pixels Operated with Pulsed Illumination, and Associated Methods for Reducing Fixed Pattern Noise FIG. 1 is a partially schematic circuit diagram of a pixel 100 configured in accordance with various embodiments of the present technology. As shown, the pixel 100 includes an overflow transistor 101, a photosensor 102 having an anode coupled to ground and a cathode coupled to the overflow transistor 101, and two taps that are each coupled to the overflow transistor 101 and to the photosensor 102. A first of the taps includes a first transfer transistor 103, a floating diffusion $FD_A$, a first resist transistor 105, a first source follower buffer or transistor 107, and a first row select transistor 109. The second of the taps includes a second transfer transistor 104, a floating diffusion $FD_B$, a second reset transistor 106, a second source follower buffer or transistor 108, and a second row select transistor 110. The first and second row select transistors 109 and 110 can be coupled to column readout circuitry 120 (e.g., sample and hold circuits, pixel output buffers, etc.).

The photosensor 102 can be a photodiode. In other embodiments, the photosensor 102 can be any other suitable type of photosensor or photodetector (e.g., a metal-semiconductor-metal (MSM) photodetector, a phototransistor, a photoconductive detector, or a phototube). In operation, the photosensor 102 can be configured to photogenerate charge or photocurrent in response to incident light, such as light emitted (e.g., in one or more pulses) from a light source (not shown) and/or reflected to the photosensor 102.

Various signals are provided to the pixel 100 for controlling operation of the pixel 100. For example, an overflow gate signal OFG can be supplied to the overflow transistor 101 to selectively activate and clear charge generated or accumulated by the photosensor 102. The first transfer transistor 103 can be supplied a transfer signal TxA, and the second transfer transistor 104 can be supplied a transfer signal TxB. The transfer signal TxA can be configured to selectively activate the first transfer transistor 103 and transfer charge generated or accumulated by the photosensor 102 to the floating diffusion $FD_A$. Similarly, the transfer signal TxB can be configured to selectively activate the second transfer transistor 104 and transfer charge generated or accumulated by the photosensor 102 to the floating diffusion $FD_B$. The first and second reset transistors 105 and 106 are supplied with a respective reset signal RST to selectively activate the reset transistors 105 and 106 and reset a corresponding floating diffusion $FD_A$ or $FD_B$. The reset signals RST supplied to the first and second reset transistors 105 and 106 can be the same signal or different signals. A voltage at the floating diffusion $FD_A$ due to charge at the floating diffusion $FD_A$ can be applied to a gate of the first source follower transistor 107. In turn, the first source follower transistor 107 is configured to convert the charge at the floating diffusion $FD_A$ to a corresponding analog signal at the source of the first source follower transistor 107. The analog signal can be passed to the column readout circuitry 120 upon assertion of a row select signal RS supplied to a gate of the first row select transistor 109. Similarly, a voltage at the floating diffusion $FD_B$ due to charge at the floating diffusion $FD_B$ can be applied to a gate of the second source follower transistor 108. In turn, the second source follower transistor 108 is configured to convert the charge at the floating diffusion $FD_B$ to a corresponding analog signal at the source of the second source follower transistor 108. The analog signal can be passed to the column readout circuitry 120 upon assertion of a row select signal RS supplied to a gate of the second row select transistor 110. The row select signal RS applied to the gate of the second row select transistor 110 can be the same signal as or a different signal from the row select signal RS applied to the gate of the first row select transistor 109.

FIGS. 2A and 2B are timing diagrams 230 and 240, respectively, illustrating methods of operating pixels (e.g., the pixel 100 of FIG. 1, any of the other pixels discussed and illustrated herein, or another pixel of the present technology) in accordance with various embodiments of the present technology. The timing diagrams 230 and 240 each include a series of two frames, with each frame including two sub-frames (e.g., sub-exposure periods, phases). As shown in FIG. 2A, an illuminator or light source is configured to emit a single pulse 232 of light in each sub-frame. For example, the illuminator emits a first pulse 232a of light during a first sub-frame of a first frame, a second pulse 232b of light during a second sub-frame of the first frame, a third pulse 232c of light during a first sub-frame of a second frame, and a fourth pulse 232d of light during a second sub-frame of the second frame. Additionally, or alternatively, the pulses 232a-232d can correspond to light power received by the pixel at the timings shown.

Referring to FIGS. 1 and 2A together, the transfer signal TxB supplied to the gate of the second transfer transistor 104 of the pixel 100 can be asserted at a timing before the illuminator emits the first pulse 232a of light during the first sub-frame of the first frame and/or at a timing at which the pixel is not receiving a substantial amount of light power. Asserting the transfer signal TxB activates the second transfer transistor 104, allowing any charge generated or accumulated at the photosensor 102 to be transferred to the floating diffusion $FD_B$. Because the second transfer transistor 104 is activated at a timing when the illuminator is not emitting a pulse of light and/or at a timing at which the pixel is not receiving a substantial amount of light power, any charge transferred to the floating diffusion $FD_B$ while the second transfer transistor 104 is activated represents dark current FPN, ambient PLS, and pulsed-signal PLS captured or generated by the pixel 100. In other words, the second tap of the pixel 100 is used to sample FPN (or a first parasitic or noise signal) during the first sub-frame of the first frame. The transfer signal TxB is then deasserted during the first sub-frame of the first frame, and before the illuminator emits the first pulse 232a of light and/or before the pixel received a substantial amount of light power corresponding to the pulse 232a of light. Deasserting the transfer signal TxB deactivates the second transfer transistor 104.

Subsequently, the transfer signal TxA supplied to the gate of the first transfer transistor 103 of the pixel 100 can be asserted at a timing corresponding to (e.g., just before, simultaneously with) when the illuminator emits the first pulse 232a of light during the first sub-frame of the first frame and/or when the pixel receives the first pulse 232a of light during the first sub-frame. Asserting the transfer signal TxA activates the first transfer transistor 103, allowing any charge generated or accumulated at the photosensor 102 (e.g., in response to light corresponding to the first pulse 232a that is incident on the photosensor 102) to be transferred to the floating diffusion $FD_A$. Because the time period that the first transfer transistor 103 is activated during the first sub-frame of the first frame overlaps with the time period during the first sub-frame of the first frame when the illuminator is emitting the first pulse 232a of light and/or when the pixel is receiving a substantial amount of light power, charge transferred to the floating diffusion $FD_A$ while the first transfer transistor 103 is activated represents a combination of signal light, dark current FPN, ambient PLS, and pulsed-signal PLS captured or generated by the pixel 100. In other words, the first tap of the pixel 100 is used to sample a first signal or first signal voltage representing a combination of signal light and FPN during the first sub-frame of the first frame. The transfer signal TxA is then deasserted during the first sub-frame of the first frame (e.g., at a time when the illuminator stops emitting the first pulse 232a of light or shortly thereafter) and before the end of the first sub-frame of the first frame. Deasserting the transfer signal TxA deactivates the first transfer transistor 103.

At the end of the first sub-frame of the first frame, the row select signals RS applied to the gates of the first and second row select transistors 109 and 110 are asserted to activate the first and second row select transistors 109 and 110. In turn, a signal $S_{A-0}$ that corresponds to the voltage at the floating diffusion $FD_A$ at the end of the first sub-frame and applied to the gate of the first source follower transistor 107 is read out of the pixel 100 to the column readout circuitry 120. In addition, a signal $S_{B-1}$ that corresponds to the voltage at the floating diffusion $FD_B$ at the end of the first sub-frame and applied to the gate of the second source follower transistor 108 is read out of the pixel 100 to the column readout circuitry 120. The signals $S_{A-0}$ and $S_{B-1}$ can be stored in the column readout circuitry 120 for further processing at the end of the first frame.

During the second sub-frame of the first frame, the transfer signal TxA supplied to the gate of the first transfer transistor 103 of the pixel 100 can be asserted at a timing before the illuminator emits the second pulse 232b of light during the second sub-frame of the first frame and/or at a timing at which the pixel is not receiving a substantial amount of light power. Asserting the transfer signal TxA activates the first transfer transistor 103, allowing any charge generated or accumulated at the photosensor 102 to be transferred to the floating diffusion $FD_A$. Because the first transfer transistor 103 is activated at a timing when the illuminator is not emitting a pulse of light and/or at a timing at which the pixel is not receiving a substantial amount of light power, any charge transferred to the floating diffusion $FD_A$ while the first transfer transistor 103 is activated represents dark current FPN, ambient PLS, and pulsed-signal PLS captured or generated by the pixel 100. In other words, the first tap of the pixel 100 is now used to sample FPN (or a second parasitic or noise signal) during the second sub-frame of the first frame (e.g., as opposed to being used to sample a combination of signal light and FPN, as was done during the first sub-frame of the first frame). The transfer signal TxA is then deasserted during the second sub-frame of the first frame, and before the illuminator emits the second pulse 232b of light and/or before the pixel receives a substantial amount of light power corresponding to the pulse 232b of light. Deasserting the transfer signal TxA deactivates the first transfer transistor 103.

Subsequently, the transfer signal TxB supplied to the gate of the second transfer transistor 104 of the pixel 100 can be asserted at a timing corresponding to (e.g., just before, simultaneously with) when the illuminator emits the second pulse 232b of light during the second sub-frame of the first frame and/or when the pixel receives the second pulse 232b of light during the second sub-frame. Asserting the transfer signal TxB activates the second transfer transistor 104, allowing any charge generated or accumulated at the photosensor 102 (e.g., in response to light corresponding to the second pulse 232b that is incident on the photosensor 102) to be transferred to the floating diffusion $FD_B$. Because the time period that the second transfer transistor 104 is activated during the second sub-frame of the first frame overlaps with the time period during the second sub-frame of the first frame when the illuminator is emitting the second pulse 232b of light and/or when the pixel is receiving a substantial amount of light power, charge transferred to the floating diffusion $FD_B$ while the second transfer transistor 104 is activated represents a combination of signal light, dark current FPN, ambient PLS, and pulsed-signal PLS captured or generated by the pixel 100. In other words, the second tap of the pixel 100 is now used to sample a second signal or second signal voltage representing a combination of signal light and FPN during the second sub-frame of the first frame (e.g., as opposed to being used to sample just FPN, as was done during the first sub-frame of the first frame). The transfer signal TxB is then deasserted during the second sub-frame of the first frame (e.g., at a time when the illuminator stops emitting the second pulse 232b of light or shortly thereafter) and before the end of the second sub-frame of the first frame. Deasserting the transfer signal TxB deactivates the second transfer transistor 104.

At the end of the second sub-frame of the first frame (representing the end of the first frame), the row select signals RS applied to the gates of the first and second row select transistors 109 and 110 are asserted to activate the first and second row select transistors 109 and 110. In turn, a signal $S_{A-1}$ that corresponds to the voltage at the floating diffusion $FD_A$ at the end of the second sub-frame and applied to the gate of the first source follower transistor 107 is read out of the pixel 100 to the column readout circuitry 120. In addition, a signal $S_{B-0}$ that corresponds to the voltage at the floating diffusion $FD_B$ at the end of the second sub-frame and applied to the gate of the second source follower transistor 108 is read out of the pixel 100 to the column readout circuitry 120.

In turn, the column readout circuitry 120 can subtract the signal $S_{A-1}$ from the signal $S_{A-0}$ to factor out FPN (dark current FPN, ambient PLS, and pulsed-signal PLS). In addition, the column readout circuitry 120 can subtract the signal $S_{B-1}$ from the signal $S_{B-0}$ to factor out FPN (dark current FPN, ambient PLS, and pulsed-signal PLS). The column readout circuitry 120 can then add (a) the difference between the signals $S_{A-0}$ and $S_{A-1}$ to (b) the difference between the signals $S_{B-0}$ and $S_{B-1}$. The resulting sum can represent the signal light component captured by the pixel 100 during the first frame, multiplied by a sum of the camera gain factors of the first and second taps of the pixel 100. The above process can be repeated for subsequent frames, including the second frame illustrated in FIG. 2A.

Referring now to FIG. 2B, the timing diagram 240 illustrates a method generally similar to the method illustrated by the timing diagram 230 of FIG. 2A. As shown in the timing diagram 240, however, the illuminator emits several pulses 242 of light per sub-frame of a given frame. More specifically, in the illustrated embodiment, the illuminator is configured to emit three pulses 242a-242c of light during a first sub-frame of a first frame, and to emit three pulses 242d-242f of light during a second sub-frame of the first frame. Here, the transfer signal TxA is pulsed three times during the first sub-frame at timings corresponding to when the illuminator emits the three pulses 242a-242c of light and/or to when the pixel receives a substantial amount of light power corresponding to the three pulses 242a-242c, and the transfer signal TxB is pulsed during the first sub-frame at times corresponding to when the illuminator is not emitting light (e.g., at times corresponding to shortly before the illuminator emits the pulses 242a-242c) and/or to when the pixel is not receiving a substantial amount of light power corresponding to the three pulses 242a-242c. In other words, referring to FIGS. 1 and 2B together, the first tap of the pixel 100 that includes the first transfer transistor 103 and the floating diffusion $FD_A$ can be used during the first sub-frame to sample a combination of signal light from each of the three pulses 242a-242c and FPN, and the second tap of the pixel that includes the second transfer transistor 104 and the floating diffusion $FD_B$ can be used during the first sub-frame to sample FPN.

At the end of the first sub-frame of the first frame, the row select signals RS applied to the gates of the first and second row select transistors 109 and 110 are asserted to activate the first and second row select transistors 109 and 110. In turn, a signal $S_{A-0}$ that corresponds to the voltage at the floating diffusion $FD_A$ at the end of the first sub-frame and applied to the gate of the first source follower transistor 107 is read out of the pixel 100 to the column readout circuitry 120. In addition, a signal $S_{B-1}$ that corresponds to the voltage at the floating diffusion $FD_B$ at the end of the first sub-frame and applied to the gate of the second source follower transistor 108 is read out of the pixel 100 to the column readout circuitry 120. The signals $S_{A-0}$ and $S_{B-1}$ can be stored in the column readout circuitry 120 for further processing at the end of the first frame.

During the second sub-frame, the transfer signal TxA is pulsed at times corresponding to when the illuminator is not emitting light (e.g., at times shortly before the illuminator emits each of the three pulses 242d-242f) and/or to when the pixel is not receiving a substantial amount of light power corresponding to the three pulses 242d-242f, and the transfer signal TxB is pulsed at times corresponding to when the illuminator emits the pulses 242d-242f and/or to when the pixel is receiving a substantial amount of light power corresponding to the three pulses 242d-242f. In other words, the first tap of the pixel 100 is used during the second sub-frame to sample FPN, and the second tap of the pixel 100 is used during the second sub-frame to sample a combination of signal light (corresponding to each of the three pulses 242d-242f) and FPN.

At the end of the second sub-frame of the first frame (representing the end of the first frame), the row select signals RS applied to the gates of the first and second row select transistors 109 and 110 are asserted to activate the first and second row select transistors 109 and 110. In turn, a signal $S_{A-1}$ that corresponds to the voltage at the floating diffusion $FD_A$ at the end of the second sub-frame and applied to the gate of the first source follower transistor 107 is read out of the pixel 100 to the column readout circuitry 120. In addition, a signal $S_{B-0}$ that corresponds to the voltage at the floating diffusion $FD_B$ at the end of the second sub-frame and applied to the gate of the second source follower transistor 108 is read out of the pixel 100 to the column readout circuitry 120.

In turn, the column readout circuitry 120 can subtract the signal $S_{A-1}$ from the signal $S_{A-0}$ to factor out FPN (dark current FPN, ambient PLS, and pulsed-signal PLS). In addition, the column readout circuitry 120 can subtract the signal $S_{B-1}$ from the signal $S_{B-0}$ to factor out FPN (dark current FPN, ambient PLS, and pulsed-signal PLS). The column readout circuitry 120 can then add (a) the difference between the signals $S_{A-0}$ and $S_{A-1}$ to (b) the difference between the signals $S_{B-0}$ and $S_{B-1}$. The resulting sum can represent the signal light component captured by the pixel 100 during the first frame, multiplied by a sum of the camera gain factors of the first and second taps of the pixel 100. The above process can be repeated for subsequent frames, including the second frame illustrated in FIG. 2B.

Although shown with a single pulse 232 of light per sub-frame in the timing diagram 230 of FIG. 2A and with three pulses 242 of light per sub-frame in the timing diagram 240 of FIG. 2B, any number of pulses 232, 242 of light (and therefore any number of pulses of the transfer signals TxA and TxB) can be used per sub-frame in other embodiments of the present technology. In addition, the number of light pulses 232, 242 in a given sub-frame can differ from the number of pulses of the transfer signal TxA in the given sub-frame and/or from the number of pulses of the transfer signal TxB in the given sub-frame. Additionally, or alternatively, the positions of the lights pulses 232, 242, the positions of the pulses of the transfer signal TxA, and/or the positions of the pulses of the transfer signal TxB can differ from the positions of the lights pulses 232, 242, the positions of the pulses of the transfer signal TxA, and/or the positions of the pulses of the transfer signal TxB, respectively, across two sub-frames of a single frame, or across corresponding sub-frames of two different frames (e.g., across a first sub-frame of a first frame and a first sub-frame of a second frame, or across a second sub-frame of a first frame and a second sub-frame of a second frame).

In these and other embodiments, the order in which the transfer signals TxA and TxB are pulsed across a sub-frame or frame can vary from that shown in FIGS. 2A and 2B. For example, the transfer signal TxA can be pulsed first during a first sub-frame and out of alignment with a pulse 232, 242 of light emitted from the illuminator; the transfer signal TxB can be pulsed second during the first sub-frame and in alignment with (e.g., centered on) a pulse 232, 242 of light emitted from the illuminator; the transfer signal TxB can be pulsed first during a second sub-frame and out of alignment with a pulse 232, 242 of light emitted from the illuminator; and/or the transfer signal TxA can be pulsed second during the second sub-frame and in alignment with (e.g., centered on) a pulse 232, 242 of light emitted from the illuminator. As another example, the transfer signal TxB can be pulsed during a first sub-frame after (as opposed to before) the illuminator emits a pulse 232, 242 of light and out of alignment with the pulse 232, 242 of light; and/or the transfer signal TxA can be pulsed during a second sub-frame after (as opposed to before) the illuminator emits a pulse 232, 242 of light and out of alignment with the pulse 232, 242 of light.

In these and still other embodiments, the timings of the pulses of the transfer signals TxA and TxB can vary from that shown in the timing diagrams 230 and 240. For example, in the timing diagrams 230 and 240, the transfer signal TxA is pulsed during a first sub-frame at timings that align with (e.g., are centered on) when the illuminator emits pulses 232, 242 of light, and the transfer signal TxB is pulsed during the first sub-frame such that the transfer signal TxB is not asserted at any time that the illuminator emits a pulse 232, 242 of light. In other embodiments of the present technology, the transfer signal TxA can be pulsed during a first sub-frame at timings that only partially align with (e.g., that are offset from the center of) the time periods when the illuminator emits pulses 232, 242 of light, and/or the transfer signal TxB can be pulsed during the first sub-frame such that the transfer signal TxB partially overlaps time periods during which the illuminator is emitting a pulse 232, 242 of light. Generally, for ideal operation, (a) one of the transfer signals TxA or TxB should be asserted during a first sub-frame such that a substantial amount of light power from one or more pulses 232, 242 of light emitted by an illuminator or light source and/or corresponding to a desired distance or distance range, is captured and transferred to a corresponding one of the floating diffusions $FD_A$ or $FD_B$; (b) the other of the transfer signals TxA or TxB should be asserted during the first sub-frame such that a substantial amount of light power from one or more pulses 232, 242 of light emitted by the illuminator and/or corresponding to the desired distance or distance range, is not captured and transferred to the other of the floating diffusions $FD_A$ or $FD_B$; (c) the other of the transfer signals TxA or TxB should be asserted during a second sub-frame such that a substantial amount of light power from one or more pulses 232, 242 of light emitted by the illuminator and/or corresponding to the desired distance or distance range, is captured and transferred to the other of the floating diffusions $FD_A$ or $FD_B$; (d) the one of the transfer signals TxA or TxB should be asserted during the second sub-frame such that a substantial amount of light power from one or more pulses 232, 242 of light emitted by the illuminator and/or corresponding to the desired distance or distance range, is not captured and transferred to the corresponding one of the floating diffusions $FD_A$ or $FD_B$.

Figure 3A:
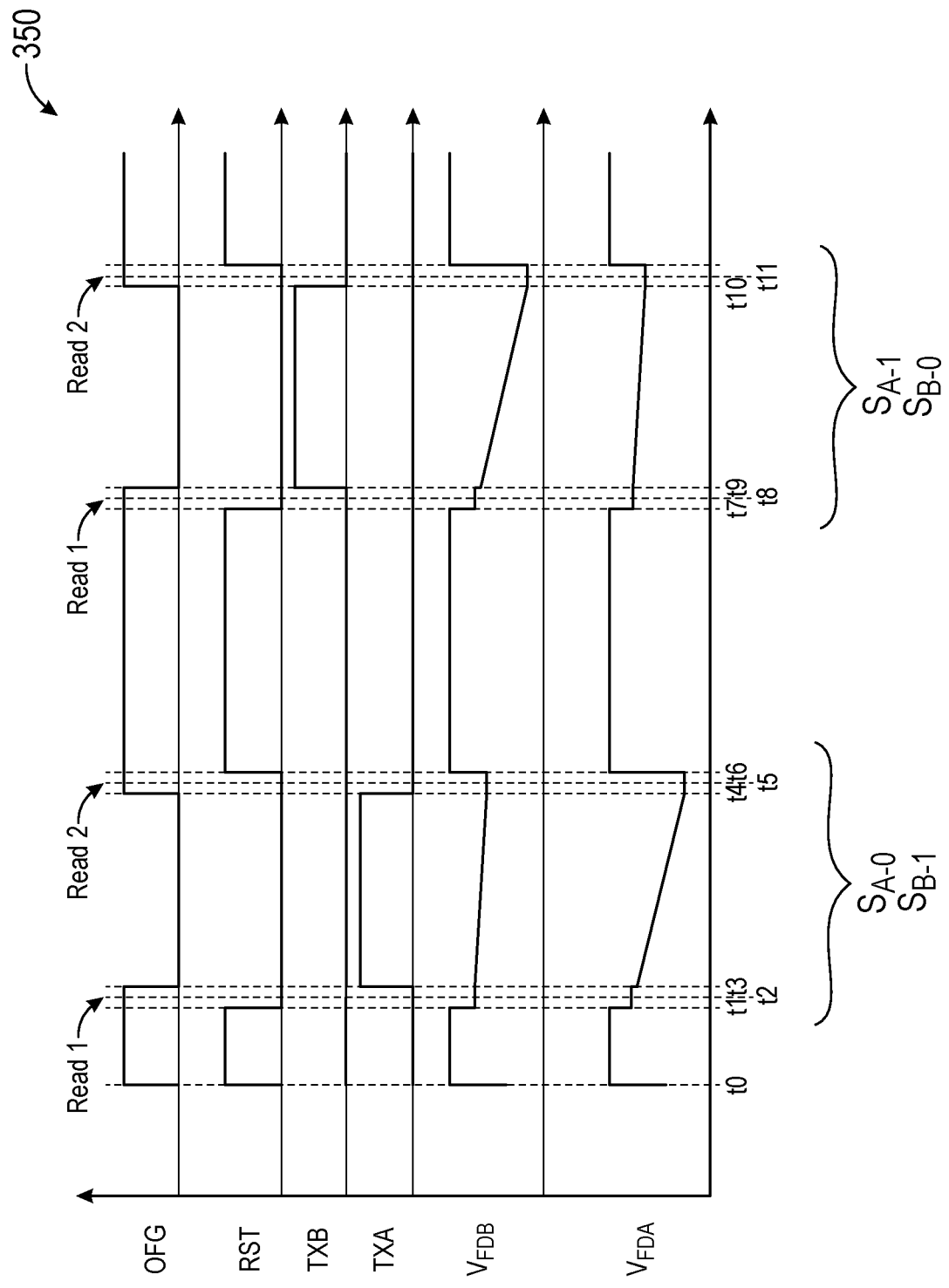
FIG. 3A is a timing diagram illustrating a correlated double sampling method of operating a pixel in accordance with various embodiments of the present technology.

FIG. 3A is a timing diagram 350 illustrating a CDS method of operating a pixel (e.g., the pixel 100 of FIG. 1, any of the other pixels discussed and illustrated herein, or another pixel of the present technology) that can be employed in combination with the FPN reduction methods described herein, in accordance with various embodiments of the present technology. Referring to FIGS. 1 and 3A together, the method begins at time t0 by asserting the overflow gate signal OFG and the reset signal RST. Asserting the overflow gate signal OFG activates the overflow transistor 101 of the pixel 100 and clears any charge generated and accumulated at the photosensor 102. Asserting the reset signal RST activates the first and second reset transistors 105 and 106, and clears any charge accumulated at the floating diffusions $FD_A$ and $FD_B$. Thus, a voltage $V_{FDA}$ at the floating diffusion $FD_A$ and a voltage $V_{FDB}$ at the floating diffusion $FD_B$ are reset to a reference voltage (e.g., $V_{DD}$ or another positive power supply voltage) via the first and second reset transistors 105 and 106, respectively. The reset signal RST is then deasserted at time t1 while the overflow gate signal OFG remains asserted.

At time t2, the row select signal RS is asserted to activate the first and second row select transistors 109 and 110 of the pixel 100 and read out (a) a first portion of (or a reference voltage for) signal $S_{A-0}$ from the pixel 100 that corresponds to the voltage $V_{FDA}$ at the floating diffusion $FD_A$ and (b) a first portion of (or a reference voltage for) signal $S_{B-1}$ from the pixel 100 that corresponds to the voltage $V_{FDB}$ at the floating diffusion $FD_B$. The time t2 can correspond to a timing at which an illuminator (not shown) is not emitting a pulse of light, or to a timing at which a substantial amount of light power from one or more light pulses emitted by the illuminator and corresponding to a desired distance or distance range is not being received by the pixel 100 and transferred to the floating diffusions $FD_A$ and/or $FD_B$. As such, the first portions of signals $S_{A-0}$ and $S_{B-1}$ can represent samples of FPN (dark current FPN, ambient PLS, and pulsed-signal PLS) captured or generated by the pixel 100 at the floating diffusions $FD_A$ and $FD_B$, respectively. The first portions of signals $S_{A-0}$ and $S_{B-1}$ read out from the pixel at time t2 can be stored for further processing at a later time, such as in sampling capacitors of the column readout circuitry 120 or in sampling capacitors of the pixel (as discussed in greater detail below).

From time t3 to time t4, the transfer signal TxA is asserted to activate the first transfer transistor 103 of the first tap of the pixel 100. The period of time between time t3 and time t4 can correspond to a timing at which the illuminator (not shown) emits one or more light pulses, or to a timing at which a substantial amount of light power from one or more light pulses emitted by the illuminator and corresponding to a desired distance or distance range is being received by the pixel 100 and transferred to the floating diffusion $FD_A$. As such, the photosensor 102 of the pixel 100 photogenerates charge or photocurrent during this time period, which is transferred to the floating diffusion $FD_A$ via the first transfer transistor 103. Thus, the voltage $V_{FDA}$ at the floating diffusion $FD_A$ drops between time t3 and time t4. At time t4, the transfer signal TxA can be deasserted, thereby deactivating the first transfer transistor 103. In some embodiments, the overflow gate signal OFG can additionally be asserted to activate the overflow transistor 101 and clear out any charge at the photosensor 102.

At time t5, the row select signal RS is asserted to activate the first and second row select transistors 109 and 110 of the pixel 100 and read out (a) a second portion of (or a signal voltage for) signal $S_{A-0}$ from the pixel 100 that corresponds to the voltage $V_{FDA}$ at the floating diffusion $FD_A$ and (b) a second portion of (or a signal voltage for) signal $S_{B-1}$ from the pixel 100 that corresponds to the voltage $V_{FDB}$ at the floating diffusion $FD_B$. As discussed above, the voltage $V_{FDA}$ decreased from time t3 to time t4 due at least in part to the pixel 100 receiving light power from one or more light pulses emitted by the illuminator and corresponding to a desired distance or distance range. Thus, the second portions of signals $S_{A-0}$ and/or $S_{B-1}$ read out from the pixel 100 at time t5 can represent samples of a combination of (a) charge (if any) that reaches the floating diffusions $FD_A$ and/or $FD_B$, respectively, from signal light received from the one or more light pulses and (b) FPN (dark current FPN, ambient PLS, and pulsed-signal PLS) at the floating diffusions $FD_A$ and/or $FD_B$, respectively. The second portions of signals $S_{A-0}$ and $S_{B-1}$ read out from the pixel 100 at time t5 can be stored for further processing at a later time, such as in sampling capacitors of the column readout circuitry 120 or in sampling capacitors of the pixel (as discussed in greater detail below).

At time t6, the reset signal RST is asserted to activate the first and second reset transistors 105 and 106. As discussed above, activating the first and second reset transistors 105 and 106 clears any charge accumulated at the floating diffusions $FD_A$ and $FD_B$. Thus, the voltage $V_{FDA}$ at the floating diffusion $FD_A$ and the voltage $V_{FDB}$ at the floating diffusion $FD_B$ are reset to the reference voltage (e.g., $V_{DD}$ or another positive power supply voltage) via the first and second reset transistors 105 and 106, respectively. The reset signal RST is then deasserted at time t7 while the overflow gate signal OFG remains asserted.

At time t8, the row select signal RS is asserted to activate the first and second row select transistors 109 and 110 of the pixel 100 and read out (a) a first portion of (or a reference voltage for) signal $S_{A-1}$ from the pixel 100 that corresponds to the voltage $V_{FDA}$ at the floating diffusion $FD_A$ and (b) a first portion of (or a reference voltage for) signal $S_{B-0}$ from the pixel 100 that corresponds to the voltage $V_{FDB}$ at the floating diffusion $FD_B$. The time t8 can correspond to a timing at which the illuminator (not shown) is not emitting a pulse of light, or to a timing at which a substantial amount of light power from one or more light pulses emitted by the illuminator and corresponding to a desired distance or distance range is not being received by the pixel 100 and transferred to the floating diffusions $FD_A$ and $FD_B$. As such, the first portions of signals $S_{A-1}$ and $S_{B-0}$ can represent samples of FPN (dark current FPN, ambient PLS, and pulsed-signal PLS) captured or generated by the pixel 100 at the floating diffusions $FD_A$ and $FD_B$, respectively. The first portions of signals $S_{A-1}$ and $S_{B-0}$ read out from the pixel at time t8 can be stored for further processing at a later time, such as in sampling capacitors of the column readout circuitry 120 or in sampling capacitors of the pixel (as discussed in greater detail below).

From time t9 to time t10, the transfer signal TxB is asserted to activate the second transfer transistor 104 of the second tap of the pixel 100. The period of time between time t9 and time t10 can correspond to a timing at which the illuminator (not shown) emits one or more light pulses, or to a timing at which a substantial amount of light power from one or more light pulses emitted by the illuminator and corresponding to a desired distance or distance range is being received by the pixel 100 and transferred to the floating diffusion $FD_B$. As such, the photosensor 102 of the pixel 100 photogenerates charge or photocurrent during this time period, which is transferred to the floating diffusion $FD_B$ via the second transfer transistor 104. Thus, the voltage $V_{FDB}$ at the floating diffusion $FD_B$ drops between time t9 and time t10. At time t10, the transfer signal TxB can be deasserted, thereby deactivating the second transfer transistor 104. In addition, the overflow gate signal OFG can be asserted to activate the overflow transistor 101 and clear out any charge at the photosensor 102.

At time t11, the row select signal RS is asserted to activate the first and second row select transistors 109 and 110 of the pixel 100 and read out (a) a second portion of (or a signal voltage for) signal $S_{A-1}$ from the pixel 100 that corresponds to the voltage $V_{FDA}$ at the floating diffusion $FD_A$ and (b) a second portion of (or a signal voltage for) signal $S_{B-0}$ from the pixel 100 that corresponds to the voltage $V_{FDB}$ at the floating diffusion $FD_B$. As discussed above, the voltage $V_{FDB}$ decreased from time t9 to time t10 due at least in part to the pixel 100 receiving light power from one or more light pulses emitted by the illuminator and corresponding to a desired distance or distance range. Thus, the second portions of signals $S_{A-1}$ and/or $S_{B-0}$ read out from the pixel 100 at time t11 can represent samples of a combination of (a) charge (if any) that reaches the floating diffusions $FD_A$ and/or $FD_B$, respectively, from signal light received from the one or more light pulses and (b) FPN (dark current FPN, ambient PLS, and pulsed-signal PLS) at the floating diffusions $FD_A$ and/or $FD_B$, respectively. The second portions of signals $S_{A-1}$ and $S_{B-0}$ read out from the pixel 100 at time t11 can be stored for further processing, such as in sampling capacitors of the column readout circuitry 120 or in sampling capacitors of the pixel (as discussed in greater detail below).

After obtaining each of the first and second portions of the signals $S_{A-0}$, $S_{A-1}$, $S_{B-0}$, and $S_{B-1}$, the first and second portions of the signals $S_{A-0}$, $S_{A-1}$, $S_{B-0}$, and $S_{B-1}$ can be processed to factor out FPN (dark current FPN, ambient PLS, and pulsed-signal PLS). For example, the column readout circuitry 120 can determine (a) the signal $S_{A-0}$ as a difference between the second portion of the signal $S_{A-0}$ and the first portion of the signal $S_{A-0}$; (b) the signal $S_{B-1}$ as a difference between the second portion of the signal $S_{B-1}$ and the first portion of the signal $S_{B-1}$; (c) the signal $S_{A-1}$ as a difference between the second portion of the signal $S_{A-1}$ and the first portion of the signal $S_{A-1}$; and (d) the signal $S_{B-0}$ as a difference between the second portion of the signal $S_{B-0}$ and the first portion of the signal $S_{B-0}$. (As exposure time lengthens, the FPN components of the first and second portions of the signals $S_{A-0}$, $S_{A-1}$, $S_{B-0}$, and $S_{B-1}$ may become less correlated and therefore may not fully cancel each other out.) Consistent with the discussion of FIGS. 2A and 2B above, the column readout circuitry 120 can then determine (i) a first difference between the signal $S_{A-0}$ and the signal $S_{A-1}$, (ii) a second difference between the signal $S_{B-0}$ and the signal $S_{B-1}$, and (iii) a summation of the first difference and the second difference. The summation can represent the signal light component captured by the pixel 100 during a frame less FPN (dark current FPN, ambient PLS, and pulsed-signal PLS) and multiplied by a summation of known camera gain factors/constants of the pixel 100. The above process can be repeated for subsequent frames.

Although shown as resetting the pixel 100 from time t6 to time t7 in the timing diagram 350, CDS methods of the present technology can omit resetting the pixel 100 between the read at time t5 and the read at time t11. More specifically, assuming that the full-well capacity of the floating diffusions $FD_A$ and $FD_B$ and/or of the photosensor 102 is large enough, the second portions of the signals $S_{A-0}$ and $S_{B-1}$ read out of the pixel 100 at time t5 can be used as reference signals for the first portions of the signals $S_{A-1}$ and $S_{B-0}$ read out at time t11. In other words, such CDS methods can skip or omit the read performed at time t8 of the timing diagram 350 to obtain the second portions of the signals $S_{A-1}$ and $S_{B-0}$. Thus, the number of reads performed during such CDS methods can be less than the number of reads performed during the CDS method illustrated by the timing diagram 350, meaning that the number of sampling capacitors (e.g., in the column readout circuitry 120 or in the pixel) required to store the portions of the signals $S_{A-0}$, $S_{A-1}$, $S_{B-0}$, and $S_{B-1}$ read out from the pixel 100 during such CDS methods can also be reduced in comparison to the number of sampling capacitors required to store the portions of the signals $S_{A-0}$, $S_{A-1}$, $S_{B-0}$, and $S_{B-1}$ read out from the pixel 100 during the CDS method illustrated in FIG. 3A.

Figure 3B:
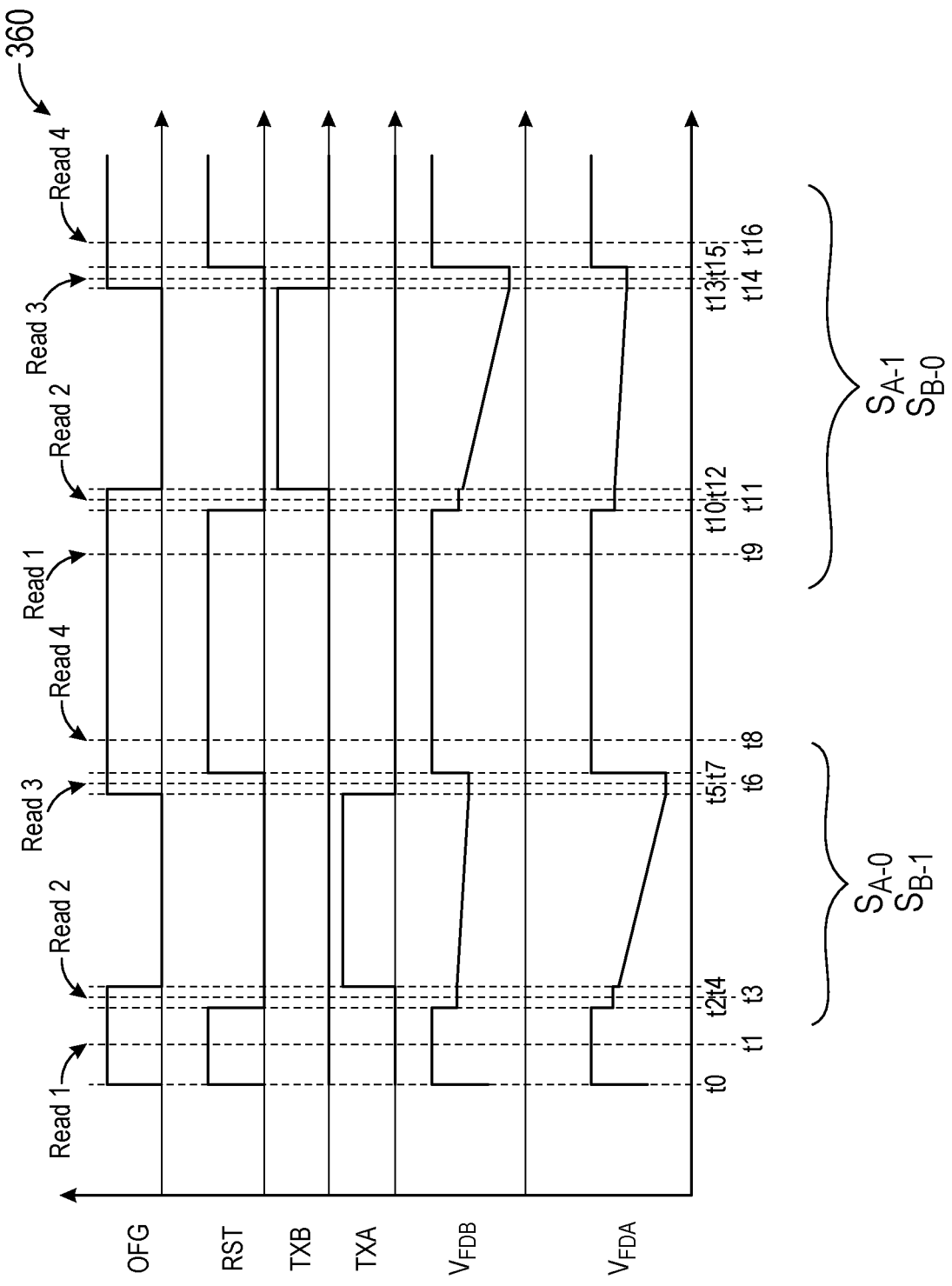
FIG. 3B is a timing diagram illustrating a quadruple sampling method of operating a pixel in accordance with various embodiments of the present technology.

FIG. 3B is a timing diagram 360 illustrating a quadruple sampling method of operating a pixel (e.g., the pixel 100 of FIG. 1, any of the other pixels discussed and illustrated herein, or another pixel of the present technology) that can be employed in combination with the FPN reduction methods described herein, in accordance with various embodiments of the present technology. Referring to FIGS. 1 and 3B together, the method begins at time to by asserting the overflow gate signal OFG and the reset signal RST. Asserting the overflow gate signal OFG activates the overflow transistor 101 of the pixel 100 and clears any charge generated and accumulated at the photosensor 102. Asserting the reset signal RST activates the first and second reset transistors 105 and 106, and clears any charge accumulated at the floating diffusions $FD_A$ and $FD_B$. Thus, a voltage $V_{FDA}$ at the floating diffusion $FD_A$ and a voltage $V_{FDB}$ at the floating diffusion $FD_B$ are reset to a reference voltage (e.g., $V_{DD}$ or another positive power supply voltage) via the first and second reset transistors 105 and 106, respectively.

At time t1, while the reset signal RST and the overflow gate signal OFG remain asserted, the row select signal RS is asserted to activate the first and second row select transistors 109 and 110 of the pixel 100 and read out (a) a first reset noise component of (or first reset noise voltage for) signal $S_{A-0}$ from the pixel 100 that corresponds to the voltage $V_{FDA}$ at the floating diffusion $FD_A$ (e.g., $V_{DD}$+reset noise at time t1), and (b) a first reset noise component of (or first reset noise voltage for) signal $S_{B-1}$ from the pixel 100 that corresponds to the voltage $V_{FDB}$ at the floating diffusion $FD_B$ (e.g., $V_{DD}$+reset noise at time t1). The time t1 can correspond to a timing at which an illuminator (not shown) is not emitting a pulse of light, or to a timing at which a substantial amount of light power from one or more light pulses emitted by the illuminator and corresponding to a desired distance or distance range is not being received by the pixel 100 and transferred to the floating diffusions $FD_A$ and $FD_B$. As such, the first reset noise signal components of signals $S_{A-0}$ and $S_{B-1}$ can represent samples of reset noise captured or generated by the pixel 100 at the floating diffusions $FD_A$ and $FD_B$, respectively. The first reset noise signal components of signals $S_{A-0}$ and $S_{B-1}$ read out from the pixel 100 at time t1 can be stored for further processing at a later time, such as in sampling capacitors of the column readout circuitry 120 or in sampling capacitors of the pixel (as discussed in greater detail below). The reset signal RST is then deasserted at time t2 while the overflow gate signal OFG remains asserted.

At time t3, the row select signal RS is asserted to activate the first and second row select transistors 109 and 110 of the pixel 100 and read out (a) a first portion of (or reference voltage for) signal $S_{A-0}$ from the pixel 100 that corresponds to the voltage $V_{FDA}$ at the floating diffusion $FD_A$ and (b) a first portion of (or reference voltage for) signal $S_{B-1}$ from the pixel 100 that corresponds to the voltage $V_{FDB}$ at the floating diffusion $FD_B$. The time t3 can correspond to a timing at which the illuminator (not shown) is not emitting a pulse of light, or to a timing at which a substantial amount of light power from one or more light pulses emitted by the illuminator and corresponding to a desired distance or distance range is not being received by the pixel 100 and transferred to the floating diffusions $FD_A$ and $FD_B$. As such, the first portions of signals $S_{A-0}$ and $S_{B-1}$ can represent samples of FPN (dark current FPN, ambient PLS, and pulsed-signal PLS) captured or generated by the pixel 100 at the floating diffusions $FD_A$ and $FD_B$, respectively. The first portions of signals $S_{A-0}$ and $S_{B-1}$ read out from the pixel at time t3 can be stored for further processing at a later time, such as in sampling capacitors of the column readout circuitry 120 or in sampling capacitors of the pixel (as discussed in greater detail below).

From time t4 to time t5, the transfer signal TxA is asserted to activate the first transfer transistor 103 of the first tap of the pixel 100. The period of time between time t4 and time t5 can correspond to a timing at which the illuminator (not shown) emits one or more light pulses, or to a timing at which a substantial amount of light power from one or more light pulses emitted by the illuminator and corresponding to a desired distance or distance range is being received by the pixel 100 and transferred to the floating diffusion $FD_A$. As such, the photosensor 102 of the pixel 100 photogenerates charge or photocurrent during this time period, which is transferred to the floating diffusion $FD_A$ via the first transfer transistor 103. Thus, the voltage $V_{FDA}$ at the floating diffusion $FD_A$ drops between time t4 and time t5. At time t5, the transfer signal TxA can be deasserted, thereby deactivating the first transfer transistor 103. In some embodiments, the overflow gate signal OFG can additionally be asserted to activate the overflow transistor 101 and clear out any charge at the photosensor 102.

At time t6, the row select signal RS is asserted to activate the first and second row select transistors 109 and 110 of the pixel 100 and read out (a) a second portion of (or signal voltage for) signal $S_{A-0}$ from the pixel 100 that corresponds to the voltage $V_{FDA}$ at the floating diffusion $FD_A$ and (b) a second portion of (or signal voltage for) signal $S_{B-1}$ from the pixel 100 that corresponds to the voltage $V_{FDB}$ at the floating diffusion $FD_B$. As discussed above, the voltage $V_{FDA}$ decreased from time t4 to time t5 due at least in part to the pixel 100 receiving light power from one or more light pulses emitted by the illuminator and corresponding to a desired distance or distance range. Thus, the second portions of signals $S_{A-0}$ and/or $S_{B-1}$ read out from the pixel 100 at time t6 can represent samples of a combination of (a) charge (if any) that reaches the floating diffusions $FD_A$ and/or $FD_B$, respectively, from signal light received from the one or more light pulses and (b) FPN (dark current FPN, ambient PLS, and pulsed-signal PLS) at the floating diffusions $FD_A$ and/or $FD_B$, respectively. The second portions of signal $S_{A-0}$ and $S_{B-1}$ read out from the pixel 100 at time t6 can be stored for further processing at a later time, such as in sampling capacitors of the column readout circuitry 120 or in sampling capacitors of the pixel (as discussed in greater detail below).

At time t7, the reset signal RST is asserted to activate the first and second reset transistors 105 and 106. As discussed above, activating the first and second reset transistors 105 and 106 clears any charge accumulated at the floating diffusions $FD_A$ and $FD_B$. Thus, the voltage $V_{FDA}$ at the floating diffusion $FD_A$ and the voltage $V_{FDB}$ at the floating diffusion $FD_B$ are reset to the reference voltage (e.g., $V_{DD}$ or another positive power supply voltage) via the first and second reset transistors 105 and 106, respectively.

At time t8, while the reset signal RST and the overflow gate signal OFG remain asserted, the row select signal RS is asserted to activate the first and second row select transistors 109 and 110 of the pixel 100 and read out (a) a second reset noise component of (or second reset noise voltage for) signal $S_{A-0}$ from the pixel 100 that corresponds to the voltage $V_{FDA}$ at the floating diffusion $FD_A$ (e.g., $V_{DD}$+reset noise at time t8), and (b) a second reset noise component of (or second reset noise voltage for) signal $S_{B-1}$ from the pixel 100 that corresponds to the voltage $V_{FDB}$ at the floating diffusion $FD_B$ (e.g., $V_{DD}$+reset noise at time t8). The time t8 can correspond to a timing at which the illuminator (not shown) is not emitting a pulse of light, or to a timing at which a substantial amount of light power from one or more light pulses emitted by the illuminator and corresponding to a desired distance or distance range is not being received by the pixel 100 and transferred to the floating diffusions $FD_A$ and $FD_B$. As such, the second reset noise components of signals $S_{A-0}$ and $S_{B-1}$ can represent samples of reset noise captured or generated by the pixel 100 at the floating diffusions $FD_A$ and $FD_B$, respectively. The second reset noise components of signals $S_{A-0}$ and $S_{B-1}$ read out from the pixel at time t8 can be stored for further processing at a later time, such as in sampling capacitors of the column readout circuitry 120 or in sampling capacitors of the pixel (as discussed in greater detail below).

At time t9, while the reset signal RST and the overflow gate signal OFG remain asserted, the row select signal RS is again asserted to activate the first and second row select transistors 109 and 110 of the pixel 100 and read out (a) a first reset noise component of (or first reset noise voltage for) signal $S_{A-1}$ from the pixel 100 that corresponds to the voltage $V_{FDA}$ at the floating diffusion $FD_A$ (e.g., $V_{DD}$+reset noise at time t9), and (b) a first reset noise component of (or first reset noise voltage for) signal $S_{B-0}$ from the pixel 100 that corresponds to the voltage $V_{FDB}$ at the floating diffusion $FD_B$ (e.g., $V_{DD}$+reset noise at time t9). The time t9 can correspond to a timing at which the illuminator (not shown) is not emitting a pulse of light, or to a timing at which a substantial amount of light power from one or more light pulses emitted by the illuminator and corresponding to a desired distance or distance range is not being received by the pixel 100 and transferred to the floating diffusions $FD_A$ and $FD_B$. As such, the first reset noise components of signals $S_{A-1}$ and $S_{B-0}$ can represent samples of reset noise captured or generated by the pixel 100 at the floating diffusions $FD_A$ and $FD_B$, respectively. The first reset noise components of signals $S_{A-1}$ and $S_{B-0}$ read out from the pixel at time t9 can be stored for further processing at a later time, such as in sampling capacitors of the column readout circuitry 120 or in sampling capacitors of the pixel (as discussed in greater detail below).

If the time period between time t8 and time t9 is short in duration, the read performed at time t8 to obtain the second reset noise components of signals $S_{A-0}$ and $S_{B-1}$ and the read performed at time t9 to obtain the first reset noise components of (or first reset noise voltages for) signals $S_{A-1}$ and $S_{B-0}$, can be merged. For example, the read performed at time t9 of the timing diagram 360 can be omitted in some embodiments, and the second reset noise components of (or second reset noise voltages for) signals $S_{A-0}$ and $S_{B-1}$ can be used in place of the first reset noise components of (or first reset noise voltage for) signals $S_{A-1}$ and $S_{B-0}$. Alternatively, the read performed at time t8 of the timing diagram 360 can be omitted in some embodiments, and the first reset noise components of (or first reset noise voltage for) signals $S_{A-1}$ and $S_{B-0}$ can be used in place of the second reset noise components of (or second reset noise voltage for) signals $S_{A-0}$ and $S_{B-1}$. Reducing the number of reads can reduce the number of sampling capacitors (e.g., in the column readout circuitry 120 or in the pixel) required to store signals read out from the pixel 100.

Referring again to the method illustrated by the timing diagram 360, the reset signal RST can be deasserted at time t10 while the overflow gate signal OFG remains asserted. At time t11, the row select signal RS is asserted to activate the first and second row select transistors 109 and 110 of the pixel 100 and read out (a) a first portion of (or reference voltage for) signal $S_{A-1}$ from the pixel 100 that corresponds to the voltage $V_{FDA}$ at the floating diffusion $FD_A$ and (b) a first portion of (or reference voltage for) signal $S_{B-0}$ from the pixel 100 that corresponds to the voltage $V_{FDB}$ at the floating diffusion $FD_B$. The time t11 can correspond to a timing at which the illuminator (not shown) is not emitting a pulse of light, or to a timing at which a substantial amount of light power from one or more light pulses emitted by the illuminator and corresponding to a desired distance or distance range is not being received by the pixel 100 and transferred to the floating diffusion $FD_A$ and $FD_B$. As such, the first portions of signals $S_{A-1}$ and $S_{B-0}$ can represent a sample of FPN (dark current FPN, ambient PLS, and pulsed-signal PLS) captured or generated by the pixel 100 at the floating diffusions $FD_A$ and $FD_B$, respectively. The first portions of signals $S_{A-1}$ and $S_{B-0}$ read out from the pixel at time t11 can be stored for further processing at a later time, such as in sampling capacitors of the column readout circuitry 120 or in sampling capacitors of the pixel (as discussed in greater detail below).

From time t12 to time t13, the transfer signal TxB is asserted to activate the second transfer transistor 104 of the second tap of the pixel 100. The period of time between time t12 and time t13 can correspond to a timing at which the illuminator (not shown) emits one or more light pulses, or to a timing at which a substantial amount of light power from one or more light pulses emitted by the illuminator and corresponding to a desired distance or distance range is being received by the pixel 100 and transferred to the floating diffusion $FD_B$. As such, the photosensor 102 of the pixel 100 photogenerates charge or photocurrent during this time period, which is transferred to the floating diffusion $FD_B$ via the second transfer transistor 104. Thus, the voltage $V_{FDB}$ at the floating diffusion $FD_B$ drops between time t12 and time t13. At time t13, the transfer signal TxB can be deasserted, thereby deactivating the second transfer transistor 104. In some embodiments, the overflow gate signal OFG can additionally be asserted to activate the overflow transistor 101 and clear out any charge at the photosensor 102.

At time t14, the row select signal RS is asserted to activate the first and second row select transistors 109 and 110 of the pixel 100 and read out (a) a second portion of (or signal voltage for) signal $S_{A-1}$ from the pixel 100 that corresponds to the voltage $V_{FDA}$ at the floating diffusion $FD_A$ and (b) a second portion of (or signal voltage for) signal $S_{B-0}$ from the pixel 100 that corresponds to the voltage $V_{FDB}$ at the floating diffusion $FD_B$. As discussed above, the voltage $V_{FDB}$ decreased from time t12 to time t13 due at least in part to the pixel 100 receiving light power from one or more light pulses emitted by the illuminator and corresponding to a desired distance or distance range. Thus, the second portions of signals $S_{A-1}$ and/or $S_{B-0}$ read out from the pixel 100 at time t14 can represent samples of a combination of (a) charge (if any) that reaches the floating diffusions $FD_A$ and/or $FD_B$, respectively, from signal light received from the one or more light pulses and (b) FPN (dark current FPN, ambient PLS, and pulsed-signal PLS) at the floating diffusions $FD_A$ and/or $FD_B$, respectively. The second portions of signal $S_{A-1}$ and $S_{B-0}$ read out from the pixel 100 at time t14 can be stored for further processing, such as in sampling capacitors of the column readout circuitry 120 or in sampling capacitors of the pixel (as discussed in greater detail below).

At time t15, the reset signal RST is asserted to activate the first and second reset transistors 105 and 106. As discussed above, activating the first and second reset transistors 105 and 106 clears any charge accumulated at the floating diffusions $FD_A$ and $FD_B$. Thus, the voltage $V_{FDA}$ at the floating diffusion $FD_A$ and the voltage $V_{FDB}$ at the floating diffusion $FD_B$ are reset to the reference voltage (e.g., $V_{DD}$ or another positive power supply voltage) via the first and second reset transistors 105 and 106, respectively.

At time t16, while the reset signal RST and the overflow gate signal OFG remain asserted, the row select signal RS is asserted to activate the first and second row select transistors 109 and 110 of the pixel 100 and read out (a) a second reset noise component of (or second reset noise voltage for) signal $S_{A-1}$ from the pixel 100 that corresponds to the voltage $V_{FDA}$ at the floating diffusion $FD_A$ (e.g., $V_{DD}$+reset noise at time t16), and (b) a second reset noise component of (or second reset noise voltage for) signal $S_{B-0}$ from the pixel 100 that corresponds to the voltage $V_{FDB}$ at the floating diffusion $FD_B$ (e.g., $V_{DD}$+reset noise at time t16). The time t16 can correspond to a timing at which the illuminator (not shown) is not emitting a pulse of light, or to a timing at which a substantial amount of light power from one or more light pulses emitted by the illuminator and corresponding to a desired distance or distance range is not being received by the pixel 100 and transferred to the floating diffusions $FD_A$ and $FD_B$. As such, the second reset noise components of signals $S_{A-1}$ and $S_{B-0}$ can represent samples of reset noise captured or generated by the pixel 100 at the floating diffusions $FD_A$ and $FD_B$, respectively. The second reset noise components of signals $S_{A-1}$ and $S_{B-0}$ read out from the pixel at time t16 can be stored for further processing, such as in sampling capacitors of the column readout circuitry 120 or in sampling capacitors of the pixel (as discussed in greater detail below).

After obtaining the first and second portions and the first and second reset noise components of each of the signals $S_{A-0}$, $S_{A-1}$, $S_{B-0}$, and $S_{B-1}$, the signals can be processed to factor out FPN. For example, the column readout circuitry 120 can determine (a) a first difference by subtracting the first portion of the signal $S_{A-0}$ from the first reset noise component of the signal $S_{A-0}$; (b) a second difference by subtracting the first portion of the signal $S_{B-1}$ from the first reset noise component of the signal $S_{B-1}$; (c) a third difference by subtracting the first portion of the signal $S_{A-1}$ from the first reset noise component of the signal $S_{A-1}$; (d) a fourth difference by subtracting the first portion of the signal $S_{B-0}$ from the first reset noise component of the signal $S_{B-0}$; (e) a fifth difference by subtracting the second reset noise component of the signal $S_{A-0}$ from the second portion of the signal $S_{A-0}$; (f) a sixth difference by subtracting the second reset noise component of the signal $S_{B-1}$ from the second portion of the signal $S_{B-1}$; (g) a seventh difference by subtracting the second reset noise component of the signal $S_{A-1}$ from the second portion of the signal $S_{A-1}$; and (h) an eighth difference by subtracting the second reset noise component of the signal $S_{B-0}$ from the second portion of the signal $S_{B-0}$.

The column readout circuitry 120 can then determine (a) a first sum of the first difference and the fifth difference; (b) a second sum of the second difference and the sixth difference; (c) a third sum of the third difference and the seventh difference; and (d) a fourth sum of the fourth difference and the eighth difference. Assuming strong correlation in the noise components of the first through fourth sums, the noise components can largely cancel each other out, leaving the signal light components captured on each tap during each sub-frame. Consistent with the discussion of FIGS. 2A and 2B above, the column readout circuitry 120 can then determine (i) a ninth difference by subtracting the third sum from the first sum, (ii) a tenth difference by subtracting the second sum from the fourth sum, and (iii) a fifth sum of the ninth difference and the tenth difference. The fifth sum can represent the signal light captured by the pixel 100 during a frame less FPN (dark current FPN, ambient PLS, and pulsed-signal PLS) and multiplied by a summation of known camera gain factors/constants of the pixel 100. The above process can be repeated for subsequent frames.

As discussed above with reference to FIG. 3A, the CDS method illustrated by the timing diagram 350 can be used to remove FPN and reset noise. At long exposures, however, the correlation between noise read out at different times can be poor, resulting in high flicker noise measurements. By capturing reset noise signals using the quadruple sampling method illustrated by the timing diagram 360 of FIG. 3B, the correlation between noise measurements captured at different times remains strong, allowing both reset noise and flicker noise to largely be factored out of signal light measurements. As a result, the dominant remaining noise when employing quadruple sampling methods of the present technology is expected to be leakage current noise from the 3T readout node of the pixel 100.

Figure 3C:
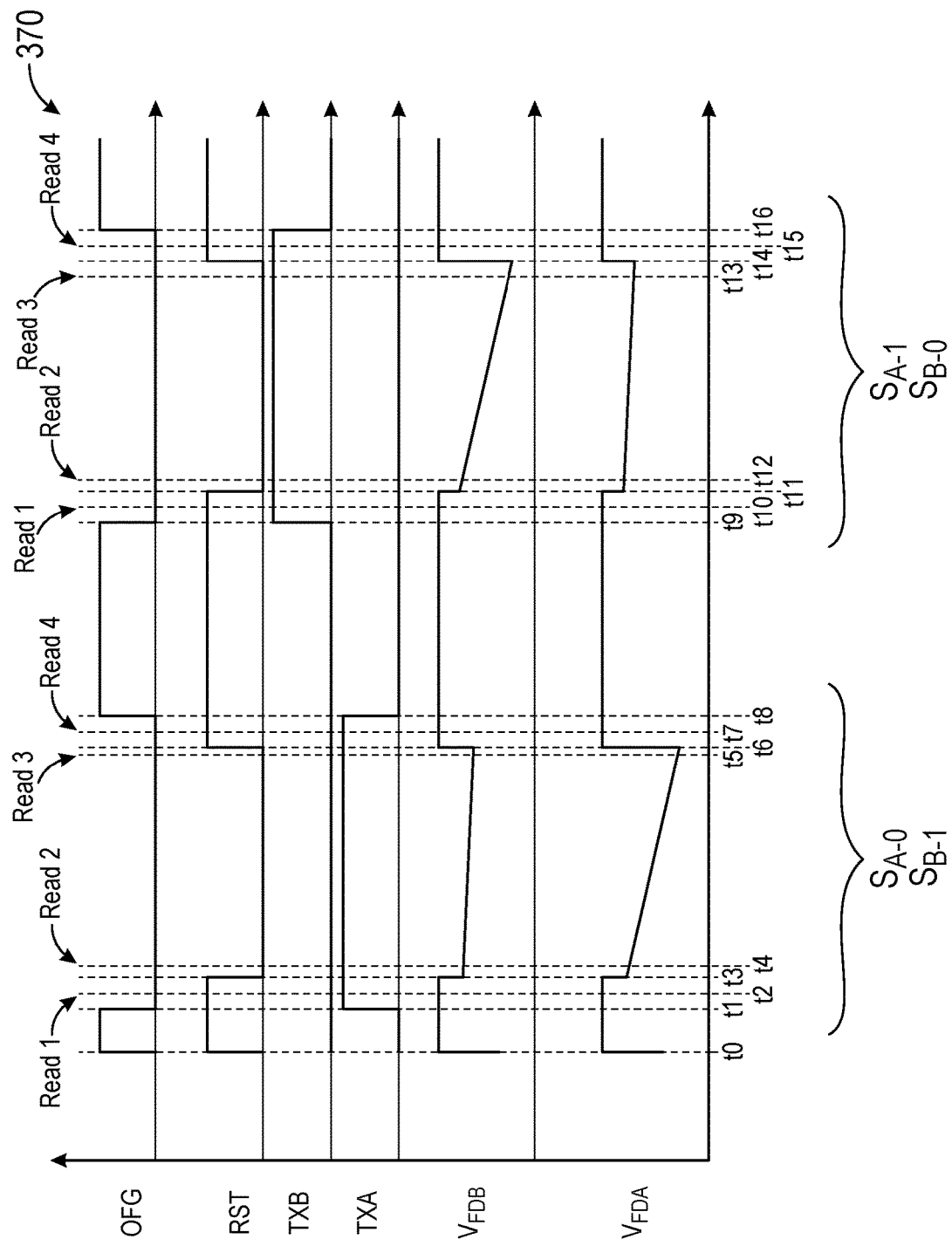
FIG. 3C is a timing diagram illustrating an alternative quadruple sampling method of operating a pixel in accordance with various embodiments of the present technology.

FIG. 3C is a timing diagram 370 illustrating an alternative quadruple sampling method of operating a pixel (e.g., the pixel 100 of FIG. 1, any of the other pixels discussed and illustrated herein, or another pixel of the present technology) that can be employed in combination with the FPN reduction methods described herein, in accordance with various embodiments of the present technology. Referring to FIGS. 1 and 3C together, the method begins at time to by asserting the overflow gate signal OFG and the reset signal RST. Asserting the overflow gate signal OFG activates the overflow transistor 101 of the pixel 100 and clears any charge generated and accumulated at the photosensor 102. Asserting the reset signal RST activates the first and second reset transistors 105 and 106, and clears any charge accumulated at the floating diffusions $FD_A$ and $FD_B$. Thus, a voltage $V_{FDA}$ at the floating diffusion $FD_A$ and a voltage $V_{FDB}$ at the floating diffusion $FD_B$ are reset to a reference voltage (e.g., $V_{DD}$ or another positive power supply voltage) via the first and second reset transistors 105 and 106, respectively.

At time t1, the overflow gate signal OFG is deasserted (deactivating the overflow transistor 101), the transfer signal TxA is asserted (activating the first transfer transistor 103 of the first tap of the pixel 100), and the reset signal RST remains asserted. As shown in the timing diagram 370, the transfer signal TxA remains asserted until time t8.

At time t2, while the reset signal RST and the transfer signal TxA remain asserted, the row select signal RS is asserted to activate the first and second row select transistors 109 and 110 of the pixel 100 and read out (a) a first reset noise component of (or first reset noise voltage for) signal $S_{A-0}$ from the pixel 100 that corresponds to the voltage $V_{FDA}$ at the floating diffusion $FD_A$ (e.g., $V_{DD}$+reset noise at time t2), and (b) a first reset noise component of (or first reset noise voltage for) signal $S_{B-1}$ from the pixel 100 that corresponds to the voltage $V_{FDB}$ at the floating diffusion $FD_B$ (e.g., $V_{DD}$+reset noise at time t2). The time t2 can correspond to a timing at which an illuminator (not shown) is not emitting a pulse of light, or to a timing at which a substantial amount of light power from one or more light pulses emitted by the illuminator and corresponding to a desired distance or distance range is not being received by the pixel 100 and transferred to the floating diffusions $FD_A$ and/or $FD_B$. Additionally, or alternatively, the time t2 can correspond to a timing at which the illuminator is emitting one or more pulses of light, or to a timing at which a substantial amount of light power from one or more light pulses emitted by the illuminator and corresponding to a desired distance or distance range is being received by the pixel 100 and transferred to the floating diffusion $FD_A$ but is being cleared out of the floating diffusion $FD_A$ via the first reset transistor 105. In any event, the first reset noise components of signals $S_{A-0}$ and $S_{B-1}$ can represent samples of reset noise captured or generated by the pixel 100 at the floating diffusions $FD_A$ and $FD_B$, respectively. The first reset noise components of signals $S_{A-0}$ and $S_{B-1}$ read out from the pixel at time t2 can be stored for further processing at a later time, such as in sampling capacitors of the column readout circuitry 120 or in sampling capacitors of the pixel (as discussed in greater detail below). The reset signal RST can then be deasserted at time t3 while the transfer signal TxA remains asserted.

At time t4, while the transfer signal TxA remains asserted, the row select signal RS is asserted to activate the first and second row select transistors 109 and 110 of the pixel 100 and read out (a) a first portion of (or reference voltage for) signal $S_{A-0}$ from the pixel 100 that corresponds to the voltage $V_{FDA}$ at the floating diffusion $FD_A$ and (b) a first portion of (or reference voltage for) signal $S_{B-1}$ from the pixel 100 that corresponds to the voltage $V_{FDB}$ at the floating diffusion $FD_B$. At least the first portion of signal $S_{B-1}$ can represent a sample of FPN (dark current FPN, ambient PLS, and pulsed-signal PLS) captured or generated by the pixel 100 at the floating diffusions $FD_B$. The first portion of signal $S_{A-0}$ can represent a sample of FPN (dark current FPN, ambient PLS, and pulsed-signal PLS) captured or generated by the pixel 100 at the floating diffusions $FD_A$, or can represent a sample of a combination of (a) charge (if any) that reaches the floating diffusion $FD_A$ from signal light received from one or more light pulses emitted by the illuminator (not shown) and (b) FPN (dark current FPN, ambient PLS, and pulsed-signal PLS) at the floating diffusions $FD_A$. Because the first portion of signal $S_{A-0}$ is read out at time t4 while the transfer signal TxA remains asserted, the voltage $V_{FDA}$ at the floating diffusion $FD_A$ remains free to change (e.g., due to light power from the one or more pulses received by the pixel 100 after time t4). The first portions of signals $S_{A-0}$ and $S_{B-1}$ read out from the pixel at time t4 can be stored for further processing at a later time, such as in sampling capacitors of the column readout circuitry 120 or in sampling capacitors of the pixel (as described in greater detail below).

All or a subset of the period of time between time t1 and time t7 (or of the period of time between time t3 and time t6) can correspond to a timing at which the illuminator (not shown) emits one or more light pulses, or to a timing at which a substantial amount of light power from one or more light pulses emitted by the illuminator and corresponding to a desired distance or distance range is being received by the pixel 100 and transferred to the floating diffusion $FD_A$. As such, the photosensor 102 of the pixel 100 can photogenerate charge or photocurrent during this time period, and the charge can be transferred to the floating diffusion $FD_A$ via the first transfer transistor 103. Thus, the voltage $V_{FDA}$ at the floating diffusion $FD_A$ drops between time t3 and time t6 (between assertions of the reset signal RST).

At time t5, the row select signal RS is asserted to activate the first and second row select transistors 109 and 110 of the pixel 100 and read out (a) a second portion of (or signal voltage for) signal $S_{A-0}$ from the pixel 100 that corresponds to the voltage $V_{FDA}$ at the floating diffusion $FD_A$ and (b) a second portion of (or signal voltage for) signal $S_{B-1}$ from the pixel 100 that corresponds to the voltage $V_{FDB}$ at the floating diffusion $FD_B$. As discussed above, the voltage $V_{FDA}$ decreases from time t3 to time t6 due at least in part to the pixel 100 receiving light power from one or more light pulses emitted by the illuminator and corresponding to a desired distance or distance range. Thus, the second portions of signals $S_{A-0}$ and/or $S_{B-1}$ read out from the pixel 100 at time t5 can represent a sample of a combination of (a) charge (if any) that reaches the floating diffusions $FD_A$ and/or $FD_B$, respectively, from signal light received from the one or more light pulses and (b) FPN (dark current FPN, ambient PLS, and pulsed-signal PLS) at the floating diffusions $FD_A$ and/or $FD_B$, respectively. Because the second portion of signal $S_{A-0}$ is read out at time t5 while the transfer signal TxA remains asserted, the voltage $V_{FDA}$ at the floating diffusion $FD_A$ remains free to change (e.g., due to additional light power from the one or more pulses received by the pixel 100 after time t5). The second portions of signals $S_{A-0}$ and $S_{B-1}$ read out from the pixel 100 at time t5 can be stored for further processing at a later time, such as in sampling capacitors of the column readout circuitry 120 or in sampling capacitors of the pixel (as discussed in greater detail below).

At time t6, the reset signal RST is asserted while the transfer signal TxA remains asserted. Asserting the reset signal RST activates the first and second reset transistors 105 and 106, and clears any charge accumulated at the floating diffusions $FD_A$ and $FD_B$. Thus, the voltage $V_{FDA}$ at the floating diffusion $FD_A$ and the voltage $V_{FDB}$ at the floating diffusion $FD_B$ are reset to a reference voltage (e.g., $V_{DD}$ or another positive power supply voltage) via the first and second reset transistors 105 and 106, respectively.

At time t7, while the reset signal RST and the transfer signal TxA remain asserted, the row select signal RS is asserted to activate the first and second row select transistors 109 and 110 of the pixel 100 and read out (a) a second reset noise component of (or second reset noise voltage for) signal $S_{A-0}$ from the pixel 100 that corresponds to the voltage $V_{FDA}$ at the floating diffusion $FD_A$ (e.g., $V_{DD}$+reset noise at time t7), and (b) a second reset noise component of (or second reset noise voltage for) signal $S_{B-1}$ from the pixel 100 that corresponds to the voltage $V_{FDB}$ at the floating diffusion $FD_B$ (e.g., $V_{DD}$+reset noise at time t7). The time t7 can correspond to a timing at which the illuminator (not shown) is not emitting a pulse of light, or to a timing at which a substantial amount of light power from one or more light pulses emitted by the illuminator and corresponding to a desired distance or distance range is not being received by the pixel 100 and transferred to the floating diffusions $FD_A$ and/or $FD_B$. Additionally, or alternatively, the time t7 can correspond to a timing at which the illuminator is emitting one or more pulses of light, or to a timing at which a substantial amount of light power from one or more light pulses emitted by the illuminator and corresponding to a desired distance or distance range is being received by the pixel 100 and transferred to the floating diffusion $FD_A$ but is being cleared out of the floating diffusion $FD_A$ via the first reset transistor 105. In any event, the second reset noise components of signals $S_{A-0}$ and $S_{B-1}$ can represent samples of reset noise captured or generated by the pixel 100 at the floating diffusions $FD_A$ and $FD_B$, respectively. The second reset noise components of signals $S_{A-0}$ and $S_{B-1}$ read out from the pixel at time t7 can be stored for further processing at a later time, such as in sampling capacitors of the column readout circuitry 120 or in sampling capacitors of the pixel (as discussed in greater detail below).

At time t8, the transfer signal TxA is deasserted (deactivating the first transfer transistor 103) while the overflow gate signal OFG is asserted (activating the overflow transistor 101). Activating the overflow transistor 101 clears any charge generated and accumulated at the photosensor 102.

At time t9, the overflow gate signal OFG is deasserted (deactivating the overflow transistor 101), the transfer signal TxB is asserted (activating the second transfer transistor 104 of the second tap of the pixel 100), and the reset signal RST remains asserted. As shown in the timing diagram 370, the transfer signal TxB remains asserted until time t16.

At time t10, while the reset signal RST and the transfer signal TxB remain asserted, the row select signal RS is asserted to activate the first and second row select transistors 109 and 110 of the pixel 100 and read out (a) a first reset noise component of (or first reset noise voltage for) signal $S_{A-1}$ from the pixel 100 that corresponds to the voltage $V_{FDA}$ at the floating diffusion $FD_A$ (e.g., $V_{DD}$+reset noise at time t10), and (b) a first reset noise component of (or first reset noise voltage for) signal $S_{B-0}$ from the pixel 100 that corresponds to the voltage $V_{FDB}$ at the floating diffusion $FD_B$ (e.g., $V_{DD}$+reset noise at time t10). The time t10 can correspond to a timing at which an illuminator (not shown) is not emitting a pulse of light, or to a timing at which a substantial amount of light power from one or more light pulses emitted by the illuminator and corresponding to a desired distance or distance range is not being received by the pixel 100 and transferred to the floating diffusions $FD_A$ and/or $FD_B$. Additionally, or alternatively, the time t10 can correspond to a timing at which the illuminator is emitting one or more pulses of light, or to a timing at which a substantial amount of light power from one or more light pulses emitted by the illuminator and corresponding to a desired distance or distance range is being received by the pixel 100 and transferred to the floating diffusion $FD_B$ but is being cleared out of the floating diffusion $FD_B$ via the second reset transistor 106. In any event, the first reset noise components of signals $S_{A-1}$ and $S_{B-0}$ can represent samples of reset noise captured or generated by the pixel 100 at the floating diffusions $FD_A$ and $FD_B$, respectively. The first reset noise components of signals $S_{A-1}$ and $S_{B-0}$ read out from the pixel at time t10 can be stored for further processing at a later time, such as in sampling capacitors of the column readout circuitry 120 or in sampling capacitors of the pixel (as discussed in greater detail below). The reset signal RST can then be deasserted at time t11 while the transfer signal TxB remains asserted.

If the time period between time t7 and time t10 is short in duration, the read performed at time t7 to obtain the second reset noise components of (or second reset noise voltages for) signals $S_{A-0}$ and $S_{B-1}$ and the read performed at time t10 to obtain the first reset noise components of (or first reset noise voltages for) signals $S_{A-1}$ and $S_{B-0}$, can be merged. For example, the read performed at time t10 of the timing diagram 370 can be omitted in some embodiments, and the second reset noise components of (or second reset noise voltages for) signals $S_{A-0}$ and $S_{B-1}$ can be used in place of the first reset noise components of (or first reset noise voltages for) signals $S_{A-1}$ and $S_{B-0}$. Alternatively, the read performed at time t7 of the timing diagram 370 can be omitted in some embodiments, and the first reset noise components of (or first reset noise voltages for) signals $S_{A-1}$ and $S_{B-0}$ can be used in place of the second reset noise components of (or second reset noise voltages for) signals $S_{A-0}$ and $S_{B-1}$. In still other embodiments, the read performed at time t7 and the read performed at time t10 can be merged such that a single read is performed while (a) both the transfer signals TxA and TxB are unasserted or (b) both the transfer signals TxA and TxB are asserted. The signal read from the first tap of the pixel during the single read can be used as the second reset noise component of (or second reset noise voltage for) signal $S_{A-0}$ and the first reset noise component of (or first reset noise voltage for) signal $S_{A-1}$. The signal read from the second tap of the pixel during the single read can be used as the second reset noise component of (or second reset noise voltage for) signal $S_{B-1}$ and the first reset noise component of (or first reset noise voltage for) signal $S_{B-0}$. Reducing the number of reads can reduce the number of sampling capacitors (e.g., in the column readout circuitry 120 or in the pixel) required to store signals read out from the pixel 100.

At time t12, while the transfer signal TxB remains asserted, the row select signal RS is asserted to activate the first and second row select transistors 109 and 110 of the pixel 100 and read out (a) a first portion of (or reference voltage for) signal $S_{A-1}$ from the pixel 100 that corresponds to the voltage $V_{FDA}$ at the floating diffusion $FD_A$ and (b) a first portion of (or reference voltage for) signal $S_{B-0}$ from the pixel 100 that corresponds to the voltage $V_{FDB}$ at the floating diffusion $FD_B$. At least the first portion of signal $S_{A-1}$ can represent a sample of FPN (dark current FPN, ambient PLS, and pulsed-signal PLS) captured or generated by the pixel 100 at the floating diffusions $FD_A$. The first portion of signal $S_{B-0}$ can represent a sample of FPN (dark current FPN, ambient PLS, and pulsed-signal PLS) captured or generated by the pixel 100 at the floating diffusions $FD_B$, or can represent a sample of a combination of (a) charge (if any) that reaches the floating diffusion $FD_B$ from signal light received from one or more light pulses emitted by the illuminator (not shown) and (b) FPN (dark current FPN, ambient PLS, and pulsed-signal PLS) at the floating diffusions $FD_B$. Because the first portion of signal $S_{B-0}$ is read out at time t12 while the transfer signal TxB remains asserted, the voltage $V_{FDB}$ at the floating diffusion $FD_B$ remains free to change (e.g., due to light power from the one or more pulses received by the pixel 100 after time t12). The first portions of signals $S_{A-1}$ and $S_{B-0}$ read out from the pixel 100 at time t12 can be stored for further processing at a later time, such as in sampling capacitors of the column readout circuitry 120 or in sampling capacitors of the pixel (as described in greater detail below).

All or a subset of the period of time between time t9 and time t16 (or of the period of time between time t11 and time t14) can correspond to a timing at which the illuminator (not shown) emits one or more light pulses, or to a timing at which a substantial amount of light power from one or more light pulses emitted by the illuminator and corresponding to a desired distance or distance range is being received by the pixel 100 and transferred to the floating diffusion $FD_B$. As such, the photosensor 102 of the pixel 100 can photogenerate charge or photocurrent during this time period, and the charge can be transferred to the floating diffusion $FD_B$ via the second transfer transistor 104. Thus, the voltage $V_{FDB}$ at the floating diffusion $FD_A$ drops between time t11 and time t14 (between assertions of the reset signal RST).

At time t13, the row select signal RS is asserted to activate the first and second row select transistors 109 and 110 of the pixel 100 and read out (a) a second portion of (or signal voltage for) signal $S_{A-1}$ from the pixel 100 that corresponds to the voltage $V_{FDA}$ at the floating diffusion $FD_A$ and (b) a second portion of (or signal voltage for) signal $S_{B-0}$ from the pixel 100 that corresponds to the voltage $V_{FDB}$ at the floating diffusion $FD_B$. As discussed above, the voltage $V_{FDB}$ decreases from time t11 to time t14 due at least in part to the pixel 100 receiving light power from one or more light pulses emitted by the illuminator and corresponding to a desired distance or distance range. Thus, the second portions of signals $S_{A-1}$ and/or $S_{B-0}$ read out from the pixel 100 at time t13 can represent a sample of a combination of (a) charge (if any) that reaches the floating diffusions $FD_A$ and/or $FD_B$, respectively, from signal light received from the one or more light pulses and (b) FPN (dark current FPN, ambient PLS, and pulsed-signal PLS) at the floating diffusions $FD_A$ and/or $FD_B$, respectively. Because the second portion of signal $S_{B-0}$ is read out at time t13 while the transfer signal TxB remains asserted, the voltage $V_{FDB}$ at the floating diffusion $FD_B$ remains free to change (e.g., due to additional light power from the one or more pulses received by the pixel 100 after time t13). The second portions of signals $S_{A-1}$ and $S_{B-0}$ read out from the pixel 100 at time t13 can be stored for further processing at a later time, such as in sampling capacitors of the column readout circuitry 120 or in sampling capacitors of the pixel (as discussed in greater detail below).

At time t14, the reset signal RST is asserted while the transfer signal TxB remains asserted. Asserting the reset signal RST activates the first and second reset transistors 105 and 106, and clears any charge accumulated at the floating diffusions $FD_A$ and $FD_B$. Thus, the voltage $V_{FDA}$ at the floating diffusion $FD_A$ and the voltage $V_{FDB}$ at the floating diffusion $FD_B$ are reset to a reference voltage (e.g., $V_{DD}$ or another positive power supply voltage) via the first and second reset transistors 105 and 106, respectively.

At time t15, while the reset signal RST and the transfer signal TxB remain asserted, the row select signal RS is asserted to activate the first and second row select transistors 109 and 110 of the pixel 100 and read out (a) a second reset noise component of (or second reset noise voltage for) signal $S_{A-1}$ from the pixel 100 that corresponds to the voltage $V_{FDA}$ at the floating diffusion $FD_A$ (e.g., $V_{DD}$+reset noise at time t15), and (b) a second reset noise component of (or second reset noise voltage for) signal $S_{B-0}$ from the pixel 100 that corresponds to the voltage $V_{FDB}$ at the floating diffusion $FD_B$ (e.g., $V_{DD}$+reset noise at time t15). The time t15 can correspond to a timing at which the illuminator (not shown) is not emitting a pulse of light, or to a timing at which a substantial amount of light power from one or more light pulses emitted by the illuminator and corresponding to a desired distance or distance range is not being received by the pixel 100 and transferred to the floating diffusions $FD_A$ and/or $FD_B$. Additionally, or alternatively, the time t15 can correspond to a timing at which the illuminator is emitting one or more pulses of light, or to a timing at which a substantial amount of light power from one or more light pulses emitted by the illuminator and corresponding to a desired distance or distance range is being received by the pixel 100 and transferred to the floating diffusion $FD_B$ but is being cleared out of the floating diffusion $FD_A$ via the second reset transistor 106. In any event, the second reset noise components of signals $S_{A-1}$ and $S_{B-0}$ can represent samples of reset noise captured or generated by the pixel 100 at the floating diffusions $FD_A$ and $FD_B$, respectively. The second reset noise components of signals $S_{A-1}$ and $S_{B-0}$ read out from the pixel at time t15 can be stored for further processing, such as in sampling capacitors of the column readout circuitry 120 or in sampling capacitors of the pixel (as discussed in greater detail below).

After obtaining the first and second portions and the first and second reset noise components of each of the signals $S_{A-0}$, $S_{A-1}$, $S_{B-0}$, and $S_{B-1}$, the signals can be processed to factor out FPN. For example, the column readout circuitry 120 can determine (a) a first difference by subtracting the first portion of the signal $S_{A-0}$ from the first reset noise component of the signal $S_{A-0}$; (b) a second difference by subtracting the first portion of the signal $S_{B-1}$ from the first reset noise component of the signal $S_{B-1}$; (c) a third difference by subtracting the first portion of the signal $S_{A-1}$ from the first reset noise component of the signal $S_{A-1}$; (d) a fourth difference by subtracting the first portion of the signal $S_{B-0}$ from the first reset noise component of the signal $S_{B-0}$; (e) a fifth difference by subtracting the second reset noise component of the signal $S_{A-0}$ from the second portion of the signal $S_{A-0}$; (f) a sixth difference by subtracting the second reset noise component of the signal $S_{B-1}$ from the second portion of the signal $S_{B-1}$; (g) a seventh difference by subtracting the second reset noise component of the signal $S_{A-1}$ from the second portion of the signal $S_{A-1}$; and (h) an eighth difference by subtracting the second reset noise component of the signal $S_{B-0}$ from the second portion of the signal $S_{B-0}$.

The column readout circuitry 120 can then determine (a) a first sum of the first difference and the fifth difference; (b) a second sum of the second difference and the sixth difference; (c) a third sum of the third difference and the seventh difference; and (d) a fourth sum of the fourth difference and the eighth difference. Assuming strong correlation in the noise components of the first through fourth sums, the noise components can largely cancel each other out, leaving the signal light components captured on each tap during each sub-frame. Consistent with the discussion of FIGS. 2A and 2B above, the column readout circuitry 120 can then determine (i) a ninth difference by subtracting the third sum from the first sum, (ii) a tenth difference by subtracting the second sum from the fourth sum, and (iii) a fifth sum of the ninth difference and the tenth difference. The fifth sum can represent the signal light component captured by the pixel 100 during a frame less FPN (dark current FPN, ambient PLS, and pulsed-signal PLS) and multiplied by a summation of known camera gain factors/constants of the pixel 100. The above process can be repeated for subsequent frames.

Figure 4:
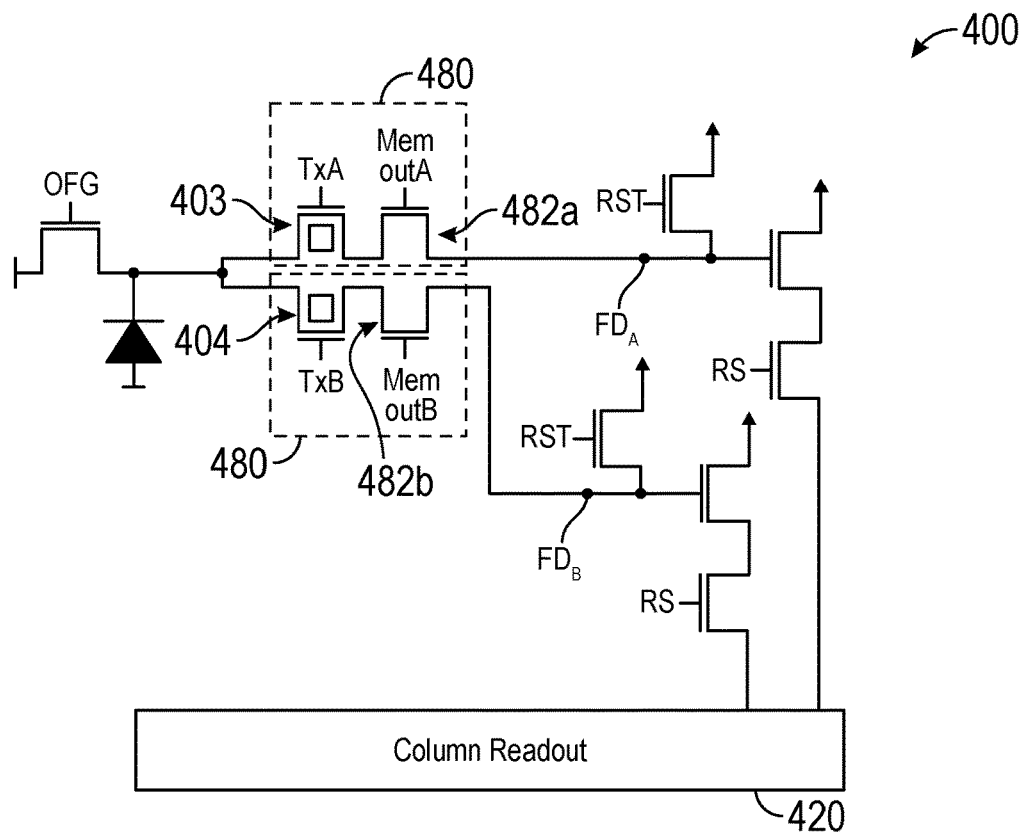
FIG. 4 is a partially schematic circuit diagram of another pixel configured in accordance with various embodiments of the present technology.

FIG. 4 is a partially schematic circuit diagram of another pixel 400 configured in accordance with various embodiments of the present technology. As shown, the pixel 400 is generally similar to the pixel 100 of FIG. 1 except that pixel 400 is a charge-mode storage pixel having (a) a first memory transistor 482a coupling a first transfer transistor 403 to a floating diffusion $FD_A$ in a first tap of the pixel 400 and (b) a second memory transistor 482b coupling a second transfer transistor 404 to a floating diffusion $FD_B$ in a second tap of the pixel 400. The first and second memory transistors 481a and 482b can be selectively activated via memory out signals Mem outA and Mem outB, respectively. In operation, the first and second transfer transistors 403 and 404 can be selectively activated using transfer signals TxA and TxB, respectively, to transfer charge generated by the photosensor of the pixel 400 to the first and second memory transistors 482a and 482b, respectively, for storage at the first and second memory transistor 482a and 482b. The memory out signals Mem outA and Mem outB can be used to selectively activate the first and second memory transistors 482a and 482b, respectively, to transfer charge stored at the first and second memory transistors 482a and 482b to the floating diffusions $FD_A$ and $FD_B$, respectively. The remaining components illustrated in FIG. 4 are generally similar to corresponding components illustrated in FIG. 1 and discussed in detail above. Therefore, a detailed discussion of the remaining components illustrated in FIG. 4 is omitted here for the sake of brevity. The pixel 400 can be operated using any of the FPN reduction techniques, the CDS sampling methods, and/or the quadruple sampling methods described in detail above.

Figure 4A:
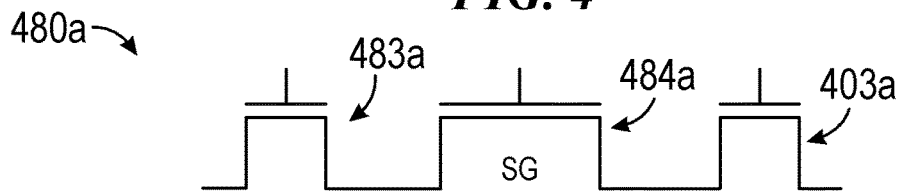
FIG. 4A is a partially schematic circuit diagram of an anti-spillback gate, a storage gate, and a transfer transistor configured in accordance with various embodiments of the present technology.
Figure 4B:
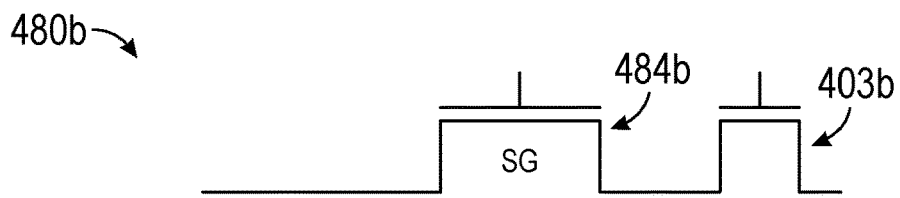
FIG. 4B is a partially schematic circuit diagram of a storage gate and a transfer transistor configured in accordance with various embodiments of the present technology.
Figure 4C:
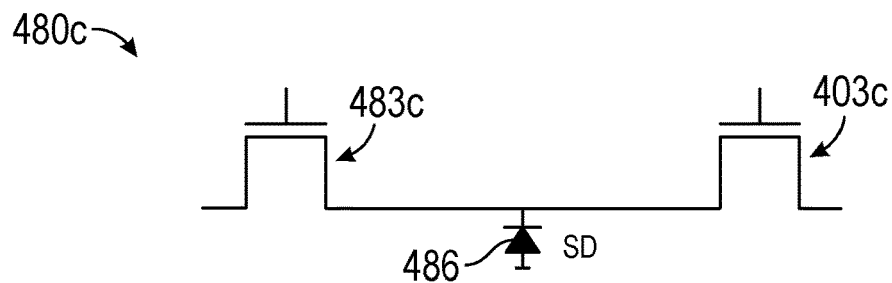
FIG. 4C is a partially schematic circuit diagram of an anti-spill back gate, a storage diode, and a transfer transistor configured in accordance with various embodiments of the present technology.

FIGS. 4A-4C illustrate alternative implementations of the pixel 400 of FIG. 4, configured in accordance with various embodiments of the present technology. More specifically, FIGS. 4A-4C are partially schematic circuit diagrams 480a-480c that can be used in lieu of one or both of the portions 480 (FIG. 4) of the pixel 400. As shown in FIG. 4A, the diagram 480a includes a storage gate 484a coupling an anti-spillback gate 483a to a transfer transistor 403a. The diagram 480b of FIG. 4B is similar to the diagram 480a of FIG. 4A in that the diagram 480b includes a storage gate 484b coupled to a transfer transistor 403b. The diagram 480b, however, lacks an anti-spillback gate. The diagram 480c of FIG. 4C is also similar to the diagram 480a of FIG. 4A except that the diagram 480c includes a storage diode 486 in place of a storage gate. The storage diode 486 includes a cathode that is coupled to an anti-spillback gate 483c and to a transfer transistor 403c.

Figure 5:
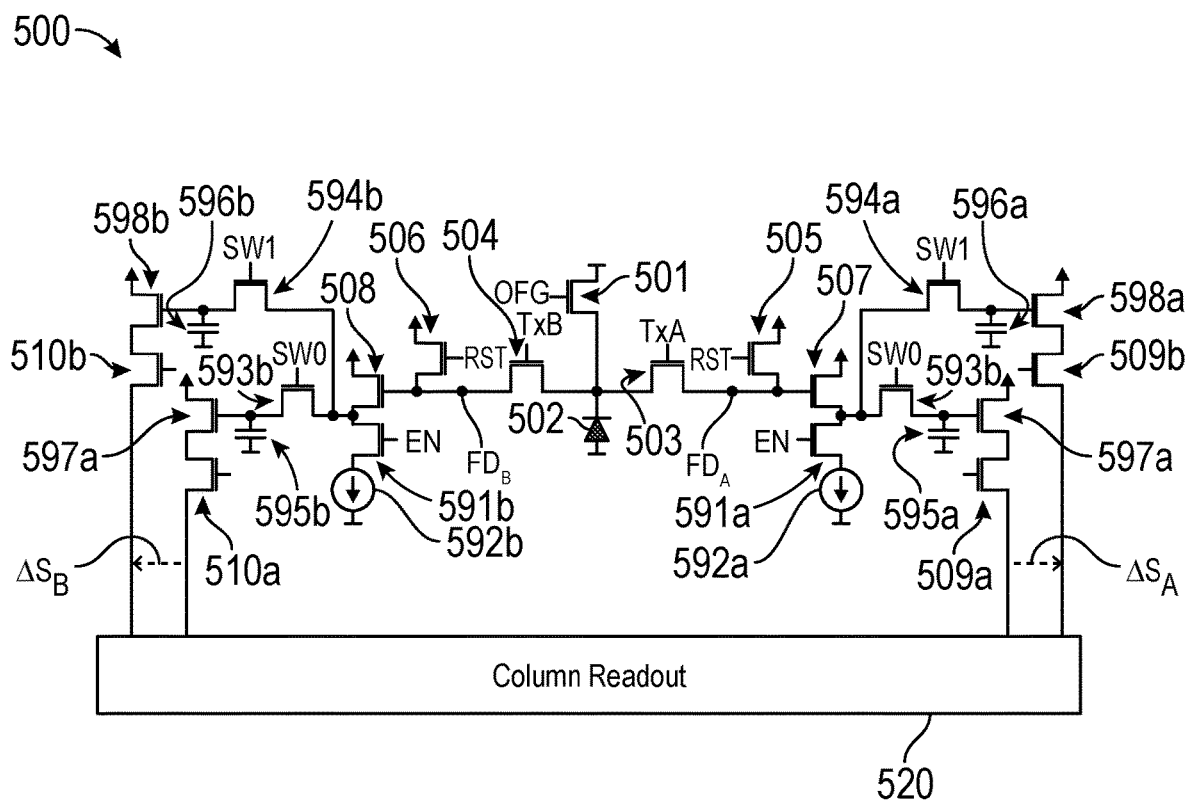
FIG. 5 is a partially schematic circuit diagram of another pixel configured in accordance with various embodiments of the present technology.

FIG. 5 is a partially schematic circuit diagram of another pixel 500 configured in accordance with various embodiments of the present technology. The pixel 500 is generally similar to the pixel 100 of FIG. 1. Thus, similar reference numbers are used in FIGS. 1 and 5 to denote identical or at least generally similar components, and a detailed discussion of these components is omitted here for the sake of brevity in light of the detailed discussion provided above. The pixel 500 differs from the pixel 100 of FIG. 1 downstream of the first and second source follower transistors 507 and 508 of the pixel 500. Referring to the first tap of the pixel 500, the pixel 500 includes a first enable transistor 591a having a gate supplied with an enable signal EN to selectively activate the first enable transistor 591a; a first current source 592a coupled between the first enable transistor 591a and ground; a first switch transistor 593a coupled to the first source follower transistor 507 and to the first enable transistor 591a, and having a gate supplied with a switch signal SW0 to selectively activate the first switch transistor 593a; a third source follower transistor 597a having a gate coupled to the first switch transistor 593a; a first sampling capacitor 595a coupled to the first switch transistor 593a and to the gate of the third source follower transistor 597a; and a first row select transistor 509a coupled to the third source follower transistor 597a. The first tap of the pixel 500 further includes a second switch transistor 594a coupled to the first source follower transistor 507 and to the first enable transistor 591a, and having a gate supplied with a switch signal SW1 to selectively activate the second switch transistor 594a; a fourth source follower transistor 598a having a gate coupled to the second switch transistor 594a; a second sampling capacitor 596a coupled to the second switch transistor 594a and to the gate of the fourth source follower transistor 598a; and a second row select transistor 509b coupled to the fourth source follower transistor 598a.

Referring now to the second tap of the pixel 500, the pixel 500 includes a second enable transistor 591b having a gate supplied with an enable signal EN to selectively activate the second enable transistor 591b. The enable signal EN supplied to the second enable transistor 591b can be the same signal as or a different signal from the enable signal EN applied to the first enable transistor 591a. The second tap further includes a second current source 592b coupled between the second enable transistor 591b and ground; a third switch transistor 593b coupled to the second source follower transistor 508 and to the second enable transistor 591b, and having a gate supplied with a switch signal SW0 to selectively activate the third switch transistor 593b; a fifth source follower transistor 597b having a gate coupled to the third switch transistor 593b; a third sampling capacitor 595b coupled to the third switch transistor 593b and to the gate of the fifth source follower transistor 597b; and a third row select transistor 510a coupled to the fifth source follower transistor 597b. The switch signal SW0 supplied to the gate of the third switch transistor 593b can be the same signal as or can be a different signal from the switch signal SW0 supplied to the gate of the first switch transistor 593a of the first tap. The second tap of the pixel 500 further includes a fourth switch transistor 594b coupled to the second source follower transistor 508 and to the second enable transistor 591b, and having a gate supplied with a switch signal SW1 to selectively activate the fourth switch transistor 594b; a sixth source follower transistor 598b having a gate coupled to the fourth switch transistor 594b; a fourth sampling capacitor 596b coupled to the fourth switch transistor 594b and to the gate of the sixth source follower transistor 598b; and a fourth row select transistor 510b coupled to the sixth source follower transistor 598b. The switch signal SW1 supplied to the gate of the fourth switch transistor 594b can be the same signal as or can be a different signal from the switch signal SW1 supplied to the gate of the second switch transistor 594a of the first tap.

The pixel 500 can be operated using any of the FPN reduction techniques, the CDS sampling methods, and/or the quadruple sampling methods described in detail above. In addition, the first enable transistor 591a and the first switch transistor 593a can be activated to sample the signal $S_{A-0}$ onto the first sampling capacitor 595a; the first enable transistor 591a and the second switch transistor 594a can be activated to sample the signal $S_{A-1}$ onto the second sampling capacitor 596a; the second enable transistor 591b and the third switch transistor 593b can be activated to sample the signal $S_{B-0}$ onto the third sampling capacitor 595b; and the second enable transistor 591b and the fourth switch transistor 594b can be activated to sample the signal $S_{B-1}$ onto the fourth sampling capacitor 596b. Each of the signals $S_{A-0}$, $S_{A-1}$, $S_{B-0}$, $S_{B-1}$ can be read out of the pixel 500 to column readout circuitry 520 via a corresponding one of the row select transistors 509a, 509b, 510a, and 510b. The column readout circuitry 520 can calculate the differences between the signals $S_{A-0}$ and $S_{A-1}$ and between the signals $S_{B-0}$ and $S_{B-1}$, for example, using one or more differential analog-to-digital converters (ADCs).

Although the pixels 100, 400, and 500 of FIGS. 1, 4, and 5, respectively, read out signals from the sub-frames directly to column readout circuitry 120, 420, and 520, respectively, other pixels configured in accordance with various embodiments of the present technology can compute various ones of the calculations discussed above that are employed to reduce FPN. Stated another way, although the column readout circuitry 120, 420, and 520 is configured to determine various differences and/or summations using signals read out from the pixels 100, 400, and 500, respectively, one or more of these difference and/or summation calculations can be performed in-pixel in some embodiments of the present technology. Several of these embodiments are described in detail below.

Figures 6, 6A:
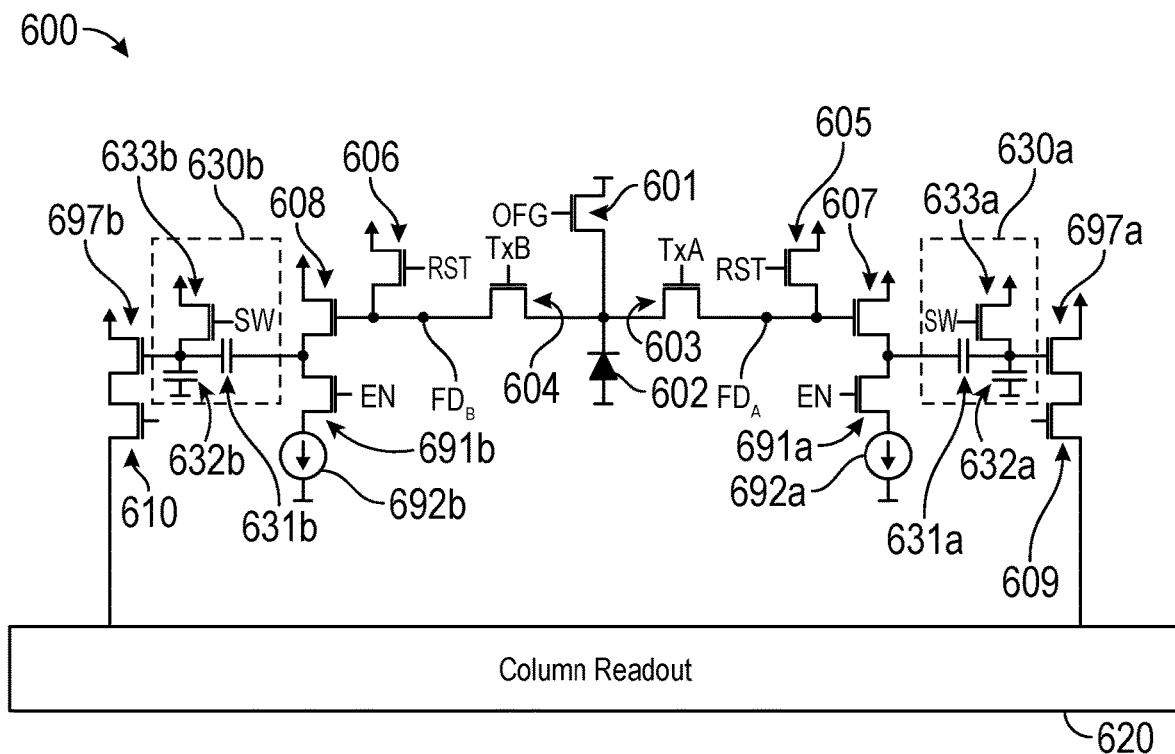
FIG. 6 is a partially schematic circuit diagram of still another pixel configured in accordance with various embodiments of the present technology.
FIG. 6A is a partially schematic circuit diagram of an active difference amplifier configured in accordance with various embodiments of the present technology.

For example, FIG. 6 is a partially schematic circuit diagram of a pixel 600 configured in accordance with various embodiments of the present technology. The pixel 600 is generally similar to the pixel 100 of FIG. 1. Thus, similar reference numbers are used in FIGS. 1 and 6 to denote identical or at least generally similar components, and a detailed discussion of these components is omitted here for the sake of brevity in light of the detailed discussion provided above. The pixel 600 differs from the pixel 100 of FIG. 1 downstream of the first and second source follower transistors 607 and 608 of the pixel 600. Referring to the first tap of the pixel 600, the pixel 600 includes a first enable transistor 691a coupled to the first source follower transistor 607 and having a gate supplied with an enable signal EN to selectively activate the first enable transistor 691a; a first current source 692a coupled between the first enable transistor 691a and ground; a first difference amplifier 630a having (a) an input coupled to the first source follower transistor 607 and the first enable transistor 691a, and (b) an output coupled to a gate of a third source follower transistor 697a. The third source follower transistor 697a is coupled to the first row select transistor 609 of the pixel 600.

Referring now to the second tap of the pixel 600, the pixel 600 includes a second enable transistor 691b coupled to the second source follower transistor 608 and having a gate supplied with an enable signal EN to selectively activate the second enable transistor 691b. The enable signal EN can be the same signal as or a different signal from the enable signal EN supplied to the gate of the first enable transistor 691a. The second tap of the pixel 600 further includes a second current source 692b coupled between the second enable transistor 691b and ground; a second difference amplifier 630b having (a) an input coupled to the second source follower transistor 608 and the second enable transistor 691b, and (b) an output coupled to a gate of a fourth source follower transistor 697b. The fourth source follower transistor 697b is coupled to the second row select transistor 610 of the pixel 600.

The first and second difference amplifiers 630a and 630b are passive difference detectors and are generally similar to one another. Referring to the first difference amplifier 630a as an example, the first difference amplifier 630a includes a first capacitor 631a having a capacitance C1, a second capacitor 632a having a capacitance C2, and a switch transistor 633a. The first capacitor 631a, the second capacitor 632a, the switch transistor 633a are coupled to one another at a common node between the input and the output of the first difference amplifier 630a. More specifically, the first capacitor 631a is coupled between the input of the first difference amplifier 630a and the common node; the second capacitor 632a is coupled between ground (e.g., a negative power supply rail or another reference voltage) and the common node; and a source of the switch transistor 633a is coupled to the common node. In the illustrated embodiment, the common node is directly coupled to the output of the first difference amplifier 630a. A drain of the switch transistor 633a is coupled to a reference voltage (e.g., $V_{DD}$, a positive power supply voltage, or another reference voltage). The switch transistor 633a is arranged as a reset switch for the first difference amplifier 630a. More specifically, a gate of the switch transistor 633a is configured to receive a switch signal SW that, when asserted, activates the switch transistor 633a and resets the voltage at the common node (and therefore the voltage at the output of the first difference amplifier 630a). When the switch signal SW is not asserted, the switch transistor 633a is deactivated, and the first capacitor 631a and the second capacitor 632a form a passive voltage divider circuit.

In operation, the switch transistor 633a can be activated to reset the voltage at the common node of the first difference amplifier 630a to a reference voltage. As a result, the voltage on the first capacitor 631a of the first difference amplifier 630a is brought to a voltage equivalent to the difference between a voltage output by the first source follower transistor 607 and the reference voltage. Then, as the voltage output by the first source follower transistor 607 changes depending at least in part on the voltage $V_{FDA}$ at the floating diffusion $FD_A$, a voltage at the common node of the first difference amplifier 630a can appear with a relative gain or attenuation that depends on the capacitance C1 of the first capacitor 631a and the capacitance C2 of the second capacitor 632a. For example, the voltage at the common node can appear with a relative gain or attenuation given by the capacitance C1 divided by the sum of the capacitance C1 and the capacitance C2 (e.g., C1/(C1+C2)) due to the capacitive voltage divider formed at least in part by the first capacitor 631a and the second capacitor 632a.

Such operation of the first difference amplifier 630a can be exploited to output a difference voltage to the gate of the third source follower transistor 697a. For example, when the signal $S_{A-0}$ is output from the first source follower transistor 607 based on the voltage $V_{FDA}$ at the floating diffusion $FD_A$, the first enable transistor 691a can be activated by asserting the enable signal EN and the switch transistor 633a can be activated by asserting the switch signal SW. This samples the signal $S_{A-0}$ onto the first capacitor 631a by setting the voltage on the first capacitor 631a equivalent to the difference between the signal $S_{A-0}$ output by the first source follower transistor 607 and the reference voltage at the common node of the first difference amplifier 630a. The first enable transistor 691a and the switch transistor 633a can then be deactivated by deasserting the enable signal EN and the switch signal SW, respectively. Then, when the signal $S_{A-1}$ is output from the source follower transistor 607, the first enable transistor 691a can be activated by asserting the enable signal EN, and a difference between the signal $S_{A-0}$ and the signal $S_{A-1}$ appears as a voltage at the common node of the first difference amplifier 630a with a gain or attenuation that depends on the capacitance C1 of the first capacitor 631a and the capacitance C2 of the second capacitor 632a. The difference voltage is output by the first difference amplifier 630a to the gate of the third source follower transistor 697a, and a corresponding analog voltage signal can be read out of the pixel 600 to column readout circuitry 620 via the first row select transistor 609. The column readout circuitry 620 can thereafter perform the remaining calculations to reduce FPN. Thus, the pixel 600 can be operated using any of the FPN reduction techniques, the CDS sampling methods, and/or the quadruple sampling methods described in detail above.

In some embodiments, the switch signal SW supplied to the gate switch transistor 633a of the first difference amplifier 630a can be the same signal as or a different signal from the switch signal SW supplied to the gate of the switch transistor 633b of the second difference amplifier 630b in the second tap of the pixel 600. In addition, in some embodiments, pixels and/or image sensors may be configured in a stacked configuration, such as using pixel-level hybrid bond at various locations.

FIG. 6A is a partially schematic circuit diagram of an alternative difference amplifier 630' configured in accordance with various embodiments of the present technology. In some embodiments, the difference amplifier 630' of FIG. 6A can used in lieu of the first difference amplifier 630a and/or the second difference amplifier 630b of the pixel 600 of FIG. 6. Indeed, it should be assumed that the alternative difference amplifier 630' of FIG. 6A can be used in lieu of any of the in-pixel difference amplifiers discussed or illustrated herein.

Referring to FIG. 6A, the difference amplifier 630' is an active difference amplifier having a first capacitor 634, an amplifier 635, a second capacitor 636, and a switch transistor 637. The first capacitor 634 is coupled to an input of the difference amplifier 630'. In addition, the amplifier 635, the second capacitor 636, and the switch transistor 637 each couple the first capacitor 634 to an output of the difference amplifier 630'. More specifically, the amplifier 635, the second capacitor 636, and the switch transistor 637 are coupled in parallel to one another between the first capacitor 634 and the output of the difference amplifier 630'. The amplifier 635 of the difference amplifier 630' includes an input (e.g., an inverting input) and an output. In some embodiments, the amplifier 635 can be an inverter or an opamp and/or can further include another input (not shown), such as a non-inverting input, that is coupled to ground (e.g., a negative power supply rail or another reference voltage).

The switch transistor 637 is arranged as a reset switch and includes a gate that is configured to receive a switch signal SW. When the switch signal SW is asserted, the switch transistor 637 is activated, thereby shorting the input and the output of the amplifier 635 together via the switch transistor 637. This can auto-zero the amplifier 635, setting the voltage at the input of the amplifier 635 equal to the voltage at the output of the amplifier 635 and at a mid-potential that is depends on characteristics of the amplifier 635. As the switch signal SW is deasserted, the switch transistor 637 is deactivated and a voltage signal (e.g., $S_{A-0}$) at the input of the difference amplifier 630' is sampled onto the first capacitor 634. Then, as the voltage at the input of the difference amplifier 630' changes (e.g., to $S_{A-1}$) a difference between the voltage (e.g., $S_{A-0}$) sampled onto the first capacitor 634 and the voltage (e.g., $S_{A-1}$) at the input of the difference amplifier 630' is amplified and appears at the output of the difference amplifier 630'.

Figure 7:
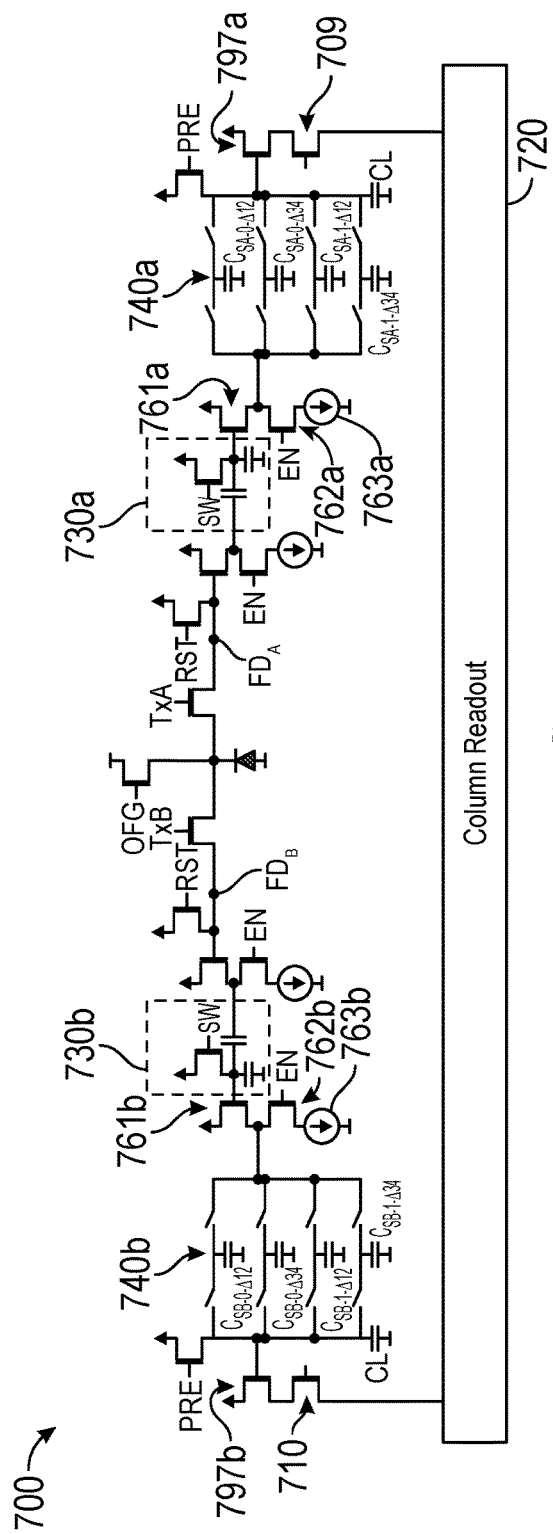
FIG. 7 is a partially schematic circuit diagram of yet another pixel configured in accordance with various embodiments of the present technology.

FIG. 7 is a partially schematic circuit diagram of another pixel 700 configured in accordance with various embodiments of the present technology. The pixel 700 is generally similar to the pixel 600 of FIG. 6. Thus, a detailed discussion of generally similar components between the pixel 600 and the pixel 700 is omitted here for the sake of brevity in light of the detailed discussion provided above. The pixel 700 differs from the pixel 600 of FIG. 6 downstream of the first and second difference amplifiers 730a and 730b of the pixel 700. Referring to the first tap of the pixel 700, the pixel 700 includes a fifth source follower transistor 761a having a gate coupled to an output of the first difference amplifier 730a; a third enable transistor 762a coupled to the fifth source follower transistor 761a and having a gate configured to receive an enable signal EN; a third current source 763a coupled between the third enable transistor 762a and ground; a first capacitor bank 740a; and a sixth source follower transistor 797a coupled to the first row select transistor 709, and having a gate coupled to an output of the first capacitor bank 740a. The enable signal EN supplied to the gate of the third enable transistor 762a can be the same signal as or a different signal from (a) the enable signal EN supplied to the gate of the enable transistor that is coupled to the input of the first difference amplifier 730a and/or (b) the enable signal EN supplied to the gate of the enable transistor that is coupled to the input of the second difference amplifier 730b.

Referring now to the second tap of the pixel 700, the pixel 700 includes a seventh source follower transistor 761b having a gate coupled to an output of the second difference amplifier 730b; a fourth enable transistor 762b coupled to the seventh source follower transistor 761b and having a gate configured to receive an enable signal EN; a fourth current source 763b coupled between the fourth enable transistor 762b and ground; a second capacitor bank 740b; and a eighth source follower transistor 797b coupled to the second row select transistor 710, and having a gate coupled to an output of the second capacitor bank 740b. The enable signal EN supplied to the gate of the fourth enable transistor 762a can be the same signal as or a different signal from (a) the enable signal EN supplied to the gate of the enable transistor that is coupled to the input of the second difference amplifier 730b, (b) the enable signal EN supplied to the gate of the enable transistor that is coupled to the input of the first difference amplifier 730a, and/or (c) the enable signal EN supplied to the gate of the third enable transistor 762a.

Figure 7A:
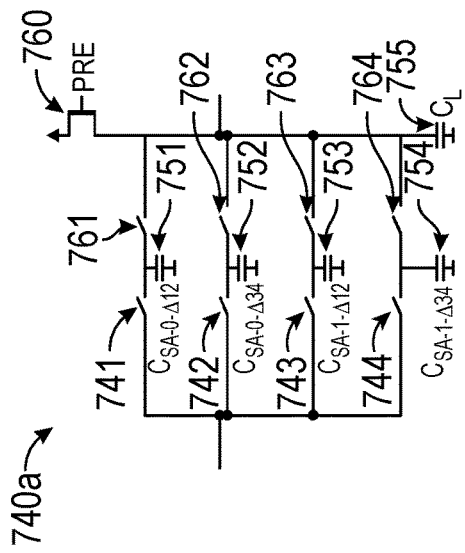
FIG. 7A is a partially schematic circuit diagram of a capacitor bank of the pixel of FIG. 7, configured in accordance with various embodiments of the present technology.

FIG. 7A is a partially schematic circuit diagram of the capacitor bank 740a of FIG. 7. The capacitor bank 740b of FIG. 7 can have a similar structure to the capacitor bank 740a illustrated in detail FIG. 7A. As shown in FIG. 7A, the capacitor bank 740a includes first switches 741-744, second switches 761-764, capacitors 751-754, a transistor 760, and a capacitor 755. More specifically, the capacitor bank 740a includes four circuit branches coupled in parallel with one another between an input and an output of the capacitor bank 740. Each of the branches includes a corresponding one of the first switches 741-744, a corresponding one of the sampling capacitors 751-754, and a corresponding one of the second switches 761-764. For example, a first circuit branch of the capacitor bank 740a includes the first switch 741, the sampling capacitor 751, and the second switch 761. The first switch 741 selectively couples an input of the capacitor bank 740a to the sampling capacitor 751 and to the second switch 761, and the second switch 761 selectively couples the first switch 741 and the sampling capacitor 751 to the output of the capacitor bank 740. The sampling capacitor 751 is coupled between (a) the first and second switches 741 and 761 and (b) ground. The transistor 760 is coupled between (a) $V_{DD}$ or another reference voltage and (b) each of the second switches 761-764, the output of the capacitor bank 740, and the capacitor 755. The transistor 760 includes a gate that is configured to receive a signal PRE to selectively activate the transistor 760. The capacitor 755 is coupled between (a) ground and (b) each of the second switches 761-764, the output of the capacitor bank 740, and the transistor 760. As discussed in greater detail below, the capacitor bank 740a can be used to sample and store various difference signals output from the first difference amplifier 730a or the second difference amplifier 730b, and to compute summations of various signals stored in the capacitor bank 740.

Referring again to FIG. 7, the difference amplifiers 730a and 730b can compute differences between various voltage signals generated by the pixel 700. For example, referring to FIGS. 3B and 7 together, the first difference amplifier 730a can compute (a) a first difference between a first reset noise signal captured based on the voltage $V_{FDA}$ at the floating diffusion $FD_A$ at time t1 and a signal $S_{A-0}$ captured based on the voltage $V_{FDA}$ at the floating diffusion $FD_A$ at time t3; (b) a second difference between a signal $S_{A-0}$ captured based on the voltage $V_{FDA}$ at the floating diffusion $FD_A$ at time t6 and a second reset noise signal captured based on the voltage $V_{FDA}$ at the floating diffusion $FD_A$ at time t8 (or a third reset noise signal captured at time t9 if the duration of time between time t8 and t9 is short); (c) a third difference between the third reset noise signal captured based on the voltage $V_{FDA}$ at the floating diffusion $FD_A$ at time t9 (or the second reset noise signal captured at time t8 if the duration of time between time t8 and t9 is short) and a signal $S_{A-1}$ captured based on the voltage $V_{FDA}$ at the floating diffusion $FD_A$ at time t11; and (d) a fourth difference between a signal $S_{A-1}$ captured based on the voltage $V_{FDA}$ at the floating diffusion $FD_A$ at time t14 and a fourth reset noise signal captured based on the voltage $V_{FDA}$ at the floating diffusion $FD_A$ at time t16.

The first difference output from the first difference amplifier 730a can be stored to the sampling capacitor 751 (FIG. 7A) of the first capacitor bank 740a by selectively coupling the sampling capacitor 751 to the fifth source follower transistor 761a via the first switch 741 (FIG. 7A) while the third enable transistor 762a is activated; the second difference output from the first difference amplifier 730a can be stored to the sampling capacitor 752 (FIG. 7A) of the first capacitor bank 740a by selectively coupling the sampling capacitor 752 to the fifth source follower transistor 761a via the first switch 742 (FIG. 7A) while the third enable transistor 762a is activated; the third difference output from the first difference amplifier 730a can be stored to the sampling capacitor 753 (FIG. 7A) of the first capacitor bank 740a by selectively coupling the sampling capacitor 753 to the fifth source follower transistor 761a via the first switch 743 (FIG. 7A) while the third enable transistor 762a is activated; and the fourth difference output from the first difference amplifier 730a can be stored to the sampling capacitor 754 (FIG. 7A) of the first capacitor bank 740a by selectively coupling the sampling capacitor 754 to the fifth source follower transistor 761a via the first switch 744 (FIG. 7A) while the third enable transistor 762a is activated.

After the differences are stored to the sampling capacitors 751-754 of the first capacitor bank 740a, the first capacitor bank 740a can be used to compute summations of two or more of the signals stored in the first capacitor bank 740a by shorting respective capacitors together. For example, referring to FIGS. 7 and 7A together, the first and second differences output from the first difference amplifier 730a and stored to the first capacitor bank 740a can be added together to calculate a first summation by selectively coupling the sampling capacitor 751 to the sampling capacitor 752 via the second switch 761 and the second switch 762 while the transistor 760 is activated. Similarly, the third and fourth differences output from the first difference amplifier 730a and stored to the first capacitor bank 740a can be added together to calculate a second summation by selectively coupling the sampling capacitor 753 to the sampling capacitor 754 via the second switch 763 and the second switch 764 while the transistor 760 is activated. The first summation and the second summation are applied (at different times) to the gate of the sixth source follower transistor 797a at the output of the first capacitor bank 740a, and signals corresponding to the first and second summations can be read out of the pixel 700 to the column readout circuitry 720 via the first row select transistor 709.

The second capacitor bank 740b of the second tap of the pixel 700 can be operated in a manner generally similar to the first capacitor bank 740a discussed in detail above.

Figure 8:
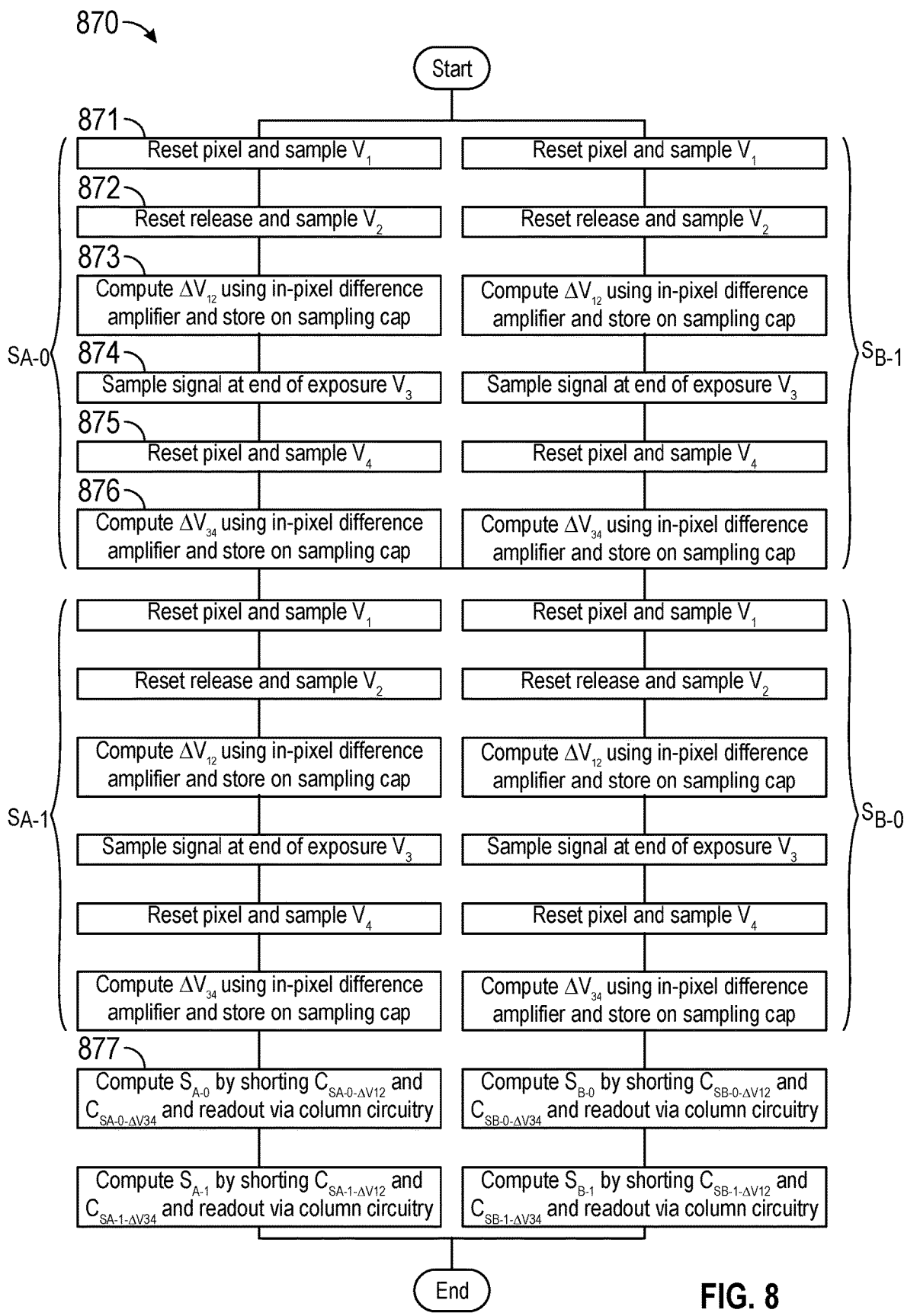
FIG. 8 is a flow diagram illustrating a method of operating the pixel of FIG. 7, in accordance with various embodiments of the present technology.

FIG. 8 is a flow diagram illustrating a method 870 of operating the pixel 700 of FIG. 7, in accordance with various embodiments of the present technology. The method 870 is illustrated as a series of steps or blocks. Blocks aligned on the left of the page correspond to the first tap of the pixel 700, and blocks aligned on the right of the page correspond to the second tap of the pixel 700. All or a subset of any one or more of the blocks can be executed in accordance with the discussion above. For the sake of example, only a subset of the blocks are discussed below.

Referring to FIGS. 7, 7A, and 8 together, the method 870 begins at block 871 by (i) asserting a reset signal RST to reset the pixel 700 and (ii) sampling a first reset noise component (shown as "$V_1$" in FIG. 8) of the signal $S_{A-0}$. The first reset noise component can be sampled onto the first difference amplifier 730a of the pixel 700. At block 872, the method 870 continues by (i) deasserting the reset signal RST and (ii) sampling a first portion of the signal $S_{A-0}$ (shown as "$V_2$" in FIG. 8). At block 873, the method 870 continues by computing, using the first difference amplifier 730a, a first difference ($V_1$-$V_2$) between the first reset noise component of signal $S_{A-0}$ and the first portion of signal $S_{A-0}$. The difference can be stored on the first sampling capacitor 751 of the first capacitor bank 740a of the pixel 700. At block 874, the method 870 continues by sampling a second portion of the signal $S_{A-0}$ (shown as "$V_3$" in FIG. 8). The second portion of the signal $S_{A-0}$ can be sampled onto the first difference amplifier 730a. At block 875, the method 870 continues by (i) asserting the reset signal RST to reset the pixel 700 and (ii) sampling a second reset noise component (shown as "$V_4$" in FIG. 8) of the signal $S_{A-0}$. At block 875, the method 870 continues by computing, using the first difference amplifier 730a, a second difference ($V_3$-$V_4$) between the second portion of the signal $S_{A-0}$ and the second reset noise component of the signal $S_{A-0}$. The difference can be stored on the sampling capacitor 752 of the first capacitor bank 740a of the pixel 700.

As shown in FIG. 8, the method 870 can additionally include performing steps generally similar to blocks 871-876 for each of the signals $S_{B-1}$, $S_{A-0}$, and $S_{B-0}$. More specifically, during a first sub-frame and/or at the same timings, blocks 871-876 can be performed for the signal $S_{A-0}$ on the first tap of the pixel 700, and steps generally similar to blocks 871-876 can be performed for the signal $S_{B-1}$ on the second tap of the pixel 700. Thereafter, during a second sub-frame and/or at the same timings, steps generally similar to blocks 871-876 can be performed for the signal $S_{A-1}$ on the first tap of the pixel 700, and steps generally similar to blocks 871-876 can be performed for the signal $S_{B-0}$ on the second tap of the pixel 700.

At block 877, the method 870 continues by computing the signal $S_{A-0}$. More specifically, the sampling capacitor 751 and the sampling capacitor 752 can be shorted together via the second switches 761 and 762 of the first capacitor bank 740a to combine the first difference ($V_1$-$V_2$) for the signal $S_{A-0}$ with the second difference ($V_3$-$V_4$) for the signal $S_{A-0}$. Assuming the noise components are strongly correlated, noise components can cancel each other out, leaving the signal $S_{A-0}$. The sum of the first difference and the second difference can be read out of the pixel 700 to the column readout circuitry 720 via the sixth source follower transistor 797a and the first row select transistor 709 of the pixel 700. As shown in FIG. 8, a step generally similar to block 877 can be (i) performed on the first tap of the pixel 700 for the signal $S_{A-1}$ using the other two sampling capacitors 753 and 754 and second switches 763 and 764 of the first capacitor bank 740a, and (ii) performed on the second tap of the pixel 700 for the signals $S_{B-0}$ and $S_{B-1}$ using the sampling capacitors and second switches of the second capacitor bank 740b of the pixel 700.

Although the steps of the method 870 are discussed and illustrated in a particular order, the method 870 is not so limited. In other embodiments, the method 870 can be performed in a different order. In these and other embodiments, any of the steps of the method 870 can be performed before, during, and/or after any of the other steps of the method 870. Furthermore, the method 870 can be altered and still remain within these and other embodiments of the present technology. For example, one or more steps of the method 870 can be omitted and/or repeated in some embodiments.

Figure 9:
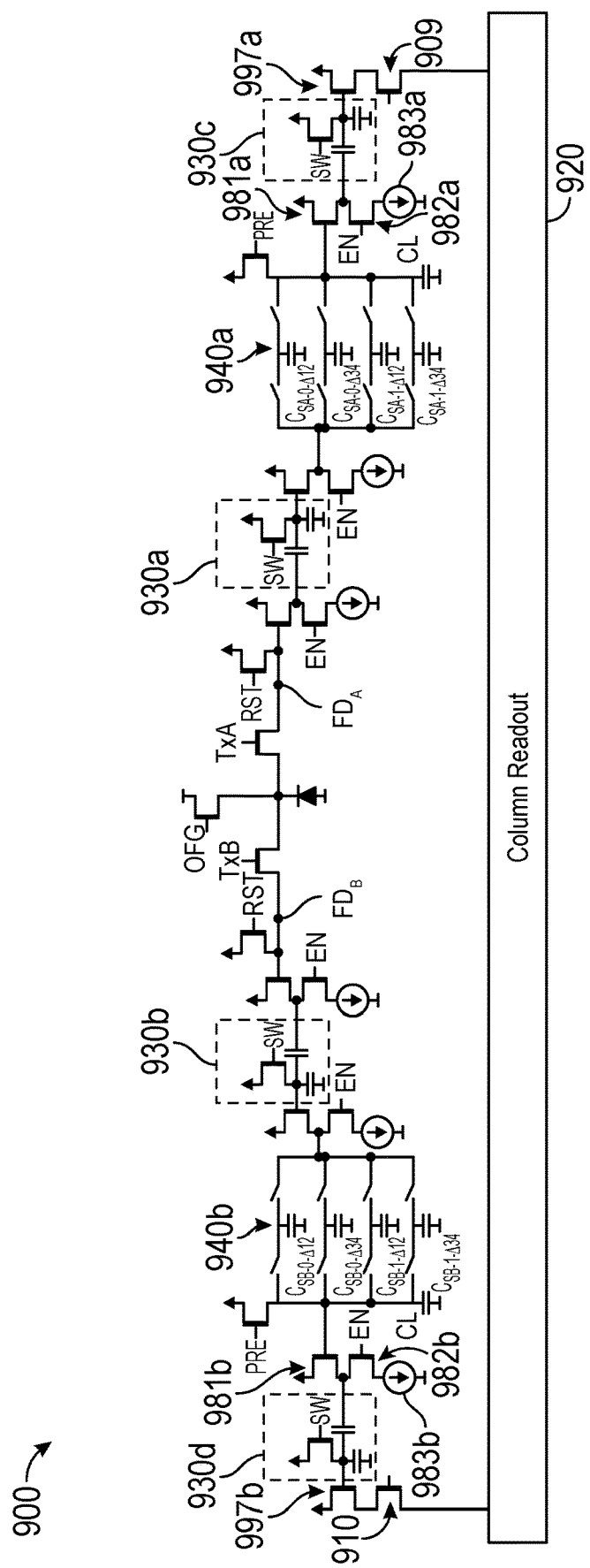
FIG. 9 is a partially schematic circuit diagram of another pixel configured in accordance with various embodiments of the present technology.

FIG. 9 is a partially schematic circuit diagram of another pixel 900 configured in accordance with various embodiments of the present technology. The pixel 900 is generally similar to the pixel 700 of FIG. 7. Thus, a detailed discussion of generally similar components between the pixel 700 and the pixel 900 is omitted here for the sake of brevity in light of the detailed discussion provided above. The pixel 900 differs from the pixel 700 of FIG. 7 downstream of the first and second capacitor banks 940a and 940b of the pixel 900. Referring to the first tap of the pixel 900, the pixel 900 includes a source follower transistor 981a having a gate coupled to an output of the first capacitor bank 940a; an enable transistor 982a coupled to the source follower transistor 981a and having a gate configured to receive an enable signal EN; a current source 983a coupled between the enable transistor 982a and ground; a third difference amplifier 930c having an input coupled to the source follower transistor 981a and the enable transistor 982a; a source follower transistor 997a coupled to the first row select transistor 909, and having a gate coupled to an output of the third difference amplifier 930c. The enable signal EN supplied to the gate of the enable transistor 982a can be the same signal as or a different signal from any one or more of the other enable signals EN illustrated in FIG. 9. As discussed in greater detail below with reference to FIG. 10, the third difference detector 930c is employed to compute a difference between the signal $S_{A-0}$ from a first sub-frame and the signal $S_{A-1}$ from a second sub-frame.

Referring now to the second tap of the pixel 900, the pixel 900 includes a source follower transistor 981b having a gate coupled to an output of the second capacitor bank 940b; an enable transistor 982b coupled to the source follower transistor 981b and having a gate configured to receive an enable signal EN; a current source 983b coupled between the enable transistor 982b and ground; a fourth difference amplifier 930d having an input coupled to the source follower transistor 981b and the enable transistor 982b; a source follower transistor 997b coupled to the second row select transistor 910, and having a gate coupled to an output of the fourth difference amplifier 930d. The enable signal EN supplied to the gate of the enable transistor 982b can be the same signal as or a different signal from any one or more of the other enable signals EN illustrated in FIG. 9. As discussed in greater detail below with reference to FIG. 10, the fourth difference detector 930d is employed to compute a difference between the signal $S_{B-0}$ from a first sub-frame and the signal $S_{B-1}$ from a second sub-frame.

Figure 10:
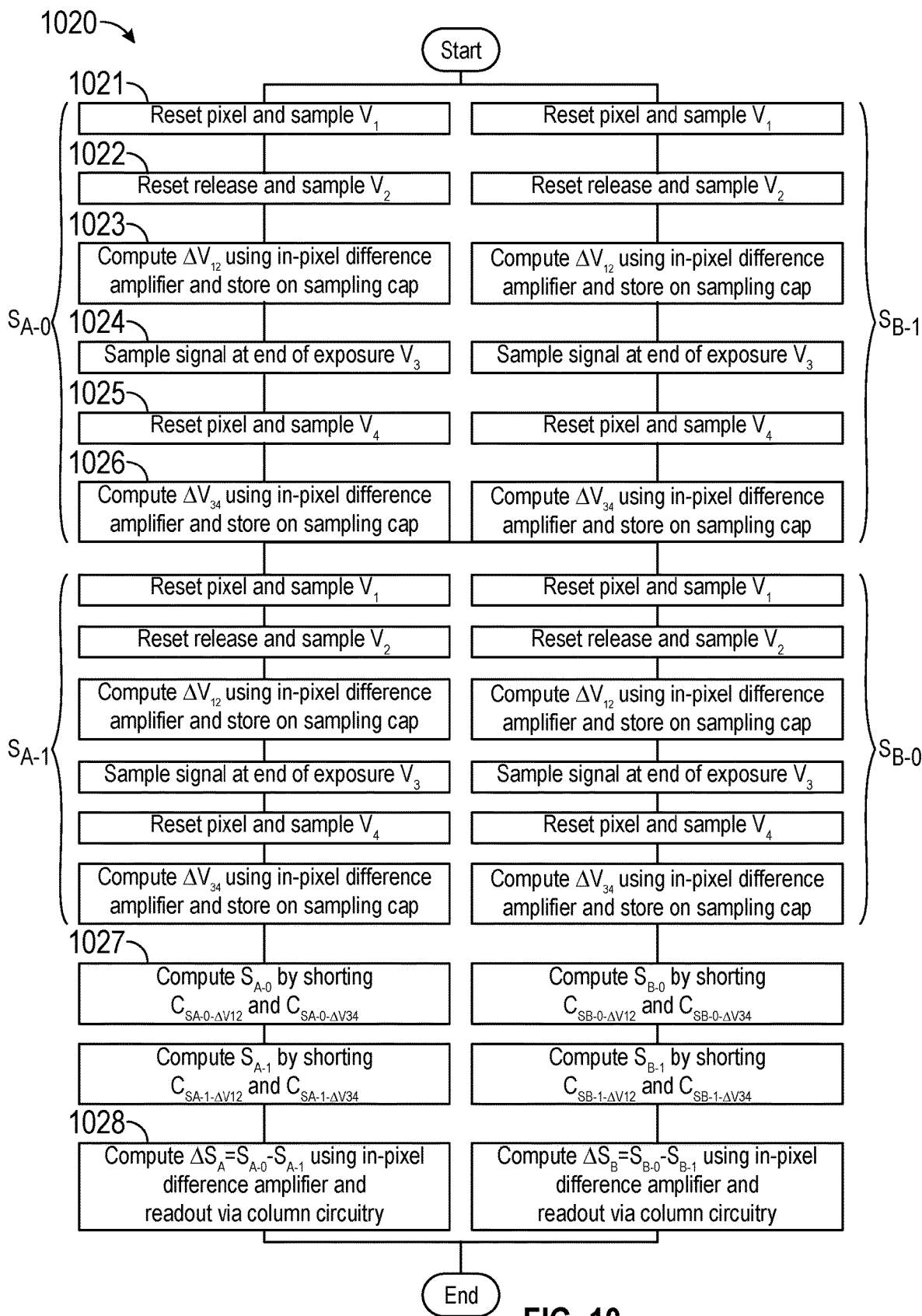
FIG. 10 is a flow diagram illustrating a method of operating the pixel of FIG. 9, in accordance with various embodiments of the present technology.

FIG. 10 is a flow diagram illustrating a method 1020 of operating the pixel 900 of FIG. 9, in accordance with various embodiments of the present technology. The method 1020 is illustrated as a series of steps or blocks. Blocks aligned on the left of the page correspond to the first tap of the pixel 900, and blocks aligned on the right of the page correspond to the second tap of the pixel 900. All or a subset of any one or more of the blocks can be executed in accordance with the discussion above. As shown, blocks 1021-1027 are generally similar to blocks 871-877 of the method 870 illustrated in FIG. 8 and discussed in detail above. Therefore, a detailed discussion of blocks 1021-1027 is omitted here for the sake of brevity.

At block 1027, in contrast with the block 877 of the method 870 of FIG. 8, the sums of the first differences and the second differences for the signals $S_{A\text{-}0}$, $S_{A\text{-}1}$, $S_{B\text{-}0}$, and $S_{B\text{-}1}$ are not read out of the pixel 900 to column readout circuitry 920. Instead, referring to the first tap of the pixel 900, the method 1020 (*i*) outputs the sum of the first and second differences for the signal $S_{A\text{-}0}$ (which can approximately represent the signal $S_{A\text{-}0}$ from the first sub-frame when the noise components are strongly correlated and largely cancel each other out) from the first capacitor bank 940*a* to the gate of the source follower transistor 981*a*, and (ii) samples a corresponding first signal onto the third difference amplifier 930*c* of the pixel 900. Then, the method 1020 (*i*) outputs the sum of the first and second differences for the signal $S_{A\text{-}1}$ (which can approximately represent the signal $S_{A\text{-}1}$ from the second sub-frame when the noise components are strongly correlated and largely cancel each other out) from the first capacitor bank 940*a* to the gate of the source follower transistor 981*a*, and (ii) inputs a corresponding second signal into the third difference amplifier 930*c*. The method 1020 performs a similar process for the signals $S_{B\text{-}0}$ and $S_{B\text{-}1}$ on the second tap of the pixel 900.

At block 1028, the method 1020 continues by computing, using the third difference amplifier 930*c*, a difference between the corresponding first signal and the corresponding second signal. When the noise components are strongly correlated and largely cancel each other out, the difference output from the third difference amplifier 930*c* can represent the difference between the signal $S_{A\text{-}0}$ and the signal $S_{A\text{-}1}$. The difference output from the third difference amplifier 930*c* is applied to the gate of the source follower transistor 997*a*, and a corresponding signal can be read out of the pixel 900 to the column readout circuitry 920 via the first row select transistor 909. The method performs a similar process for the signals $S_{B\text{-}0}$ and $S_{B\text{-}1}$ on the second tap of the pixel 900 and using the fourth difference amplifier 930*d*.

Although the steps of the method 1020 are discussed and illustrated in a particular order, the method 1020 is not so limited. In other embodiments, the method 1020 can be performed in a different order. In these and other embodiments, any of the steps of the method 1020 can be performed before, during, and/or after any of the other steps of the method 1020. Furthermore, the method 1020 can be altered and still remain within these and other embodiments of the present technology. For example, one or more steps of the method 1020 can be omitted and/or repeated in some embodiments.

In some embodiments, rather than (a) reading out the difference output from the third difference amplifier 930*c* to the column readout circuitry 920 via the first row select transistor 909 and (b) reading out the difference output from the fourth difference amplifier 930*d* to the column readout circuitry 920 via the second row select transistor 910, the outputs of the source follower transistor 997*a* and the source follower transistor 997*b* can be shorted together. For example, the bit line at the output of the source follower transistor 997*a* can be shorted with the bit line at the output of the source follower transistor 997*b*. Shorting the bit lines in this manner can compute the sum of the difference output from the third difference amplifier 930*c* and the difference output from the fourth difference amplifier 930*d* when the differences output from the third and fourth difference amplifiers 930*c* and 930*d* are close in value. The computed sum can represent $(S_{A\text{-}0}-S_{A\text{-}1})+(S_{B\text{-}0}-S_{B\text{-}1})$ when the noise components are strongly correlated and largely cancel each other. This sum can then be read out to the column readout circuitry 920, such as using a single row select transistor (not shown). In other words, the pixel 900 can employ a single-ended readout in some embodiments.

Figure 11:
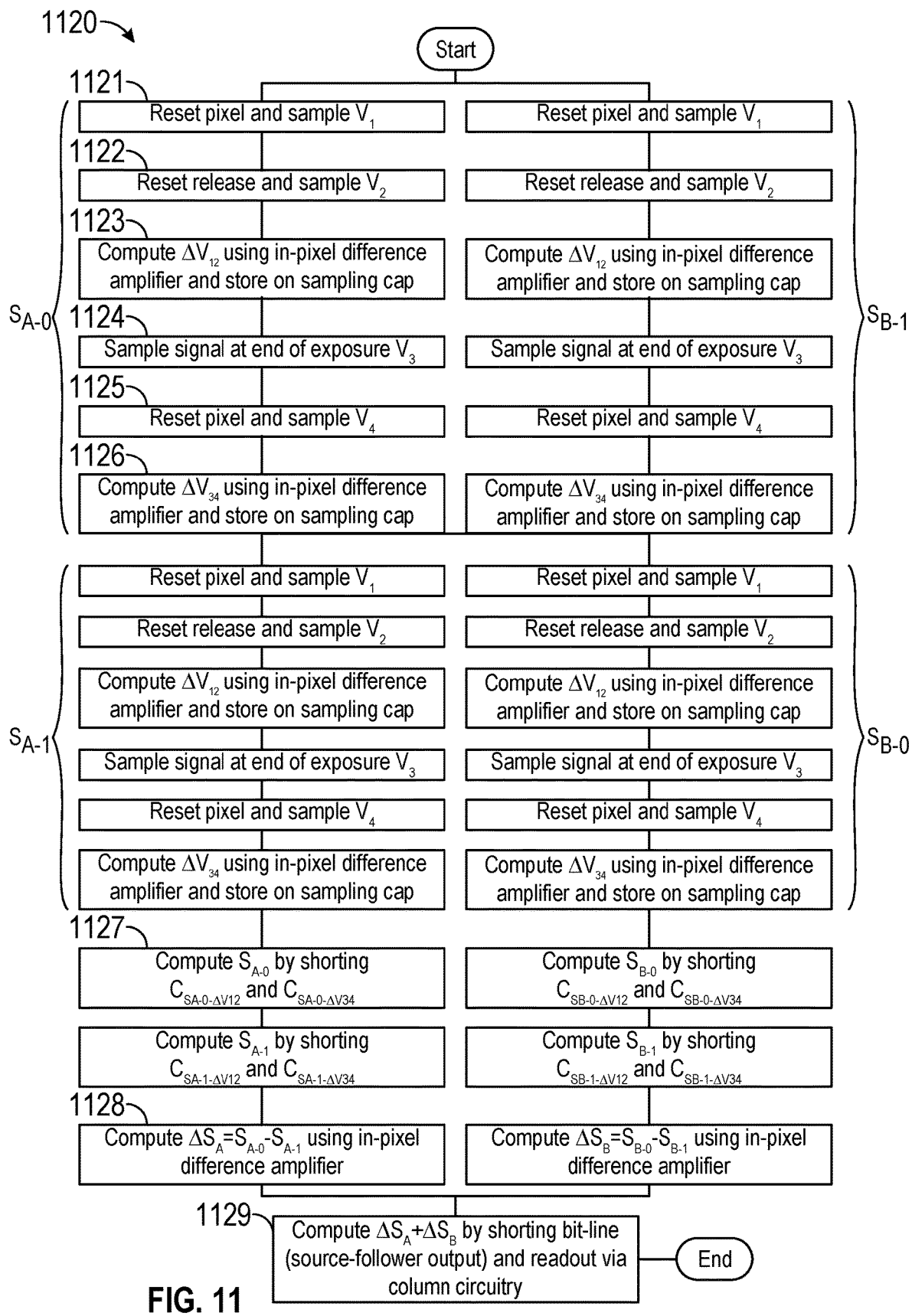
FIG. 11 is a flow diagram illustrating an alternative method of operating the pixel of FIG. 9, in accordance with various embodiments of the present technology.

FIG. 11 is a flow diagram illustrating such an alternative method 1120 of operating the pixel 900 of FIG. 9, in accordance with various embodiments of the present technology. The method 1120 is illustrated as a series of steps or blocks. Blocks aligned on the left of the page correspond to the first tap of the pixel 900, and blocks aligned on the right of the page correspond to the second tap of the pixel 900. All or a subset of any one or more of the blocks can be executed in accordance with the discussion above. As shown, blocks 1121-1128 are generally similar to blocks 1021-1028 of the method 1020 illustrated in FIG. 10 and discussed in detail above. Therefore, a detailed discussion of blocks 1121-1128 is omitted here for the sake of brevity.

At block 1128, in contrast with the block 1028 of the method 1020 of FIG. 10, the difference between the signal $S_{A\text{-}0}$ and the signal $S_{A\text{-}1}$ output from the third difference amplifier 930*c* is not read out of the pixel 900 to column readout circuitry 920. In addition, the difference between the signal $S_{B\text{-}0}$ and the signal $S_{B\text{-}1}$ output from the fourth difference amplifier 930*d* is not read out of the pixel 900 to column readout circuitry 920. Instead, the differences are each applied to a corresponding gate of the source follower transistors 997*a* and 997*b*, and the method 1120 shorts bit lines at the outputs of the source follower transistors 997*a* and 997*b* together at block 1129. Assuming the differences output from the third and fourth difference amplifiers 930*c* and 930*d* are close in value, the shorting process performed at block 1129 computes the sum of the differences. The sum of the differences can then be read out of the pixel 900 to the column readout circuitry 920. When the difference output from the third and fourth difference amplifiers 930*c* and 930*d* are not close in value, however, shorting the bit lines in this manner can cause the circuit to act as a winner-take-it-all circuit.

Although the steps of the method 1120 are discussed and illustrated in a particular order, the method 1120 is not so limited. In other embodiments, the method 1120 can be performed in a different order. In these and other embodiments, any of the steps of the method 1120 can be performed before, during, and/or after any of the other steps of the method 1120. Furthermore, the method 1120 can be altered and still remain within these and other embodiments of the present technology. For example, one or more steps of the method 1120 can be omitted and/or repeated in some embodiments.

Figure 12:
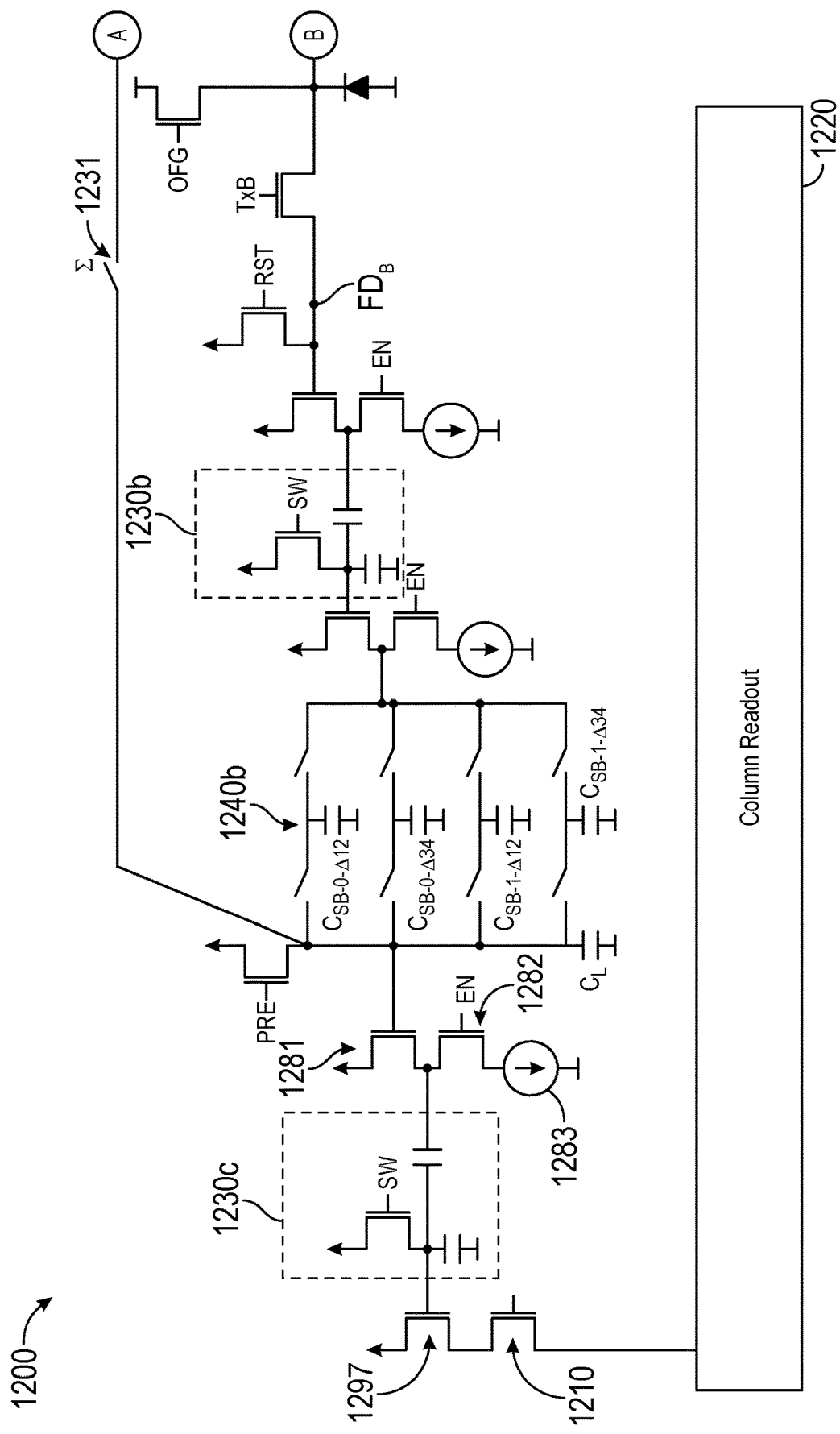
FIG. 12 is a partially schematic circuit diagram of still another pixel configured in accordance with various embodiments of the present technology.
Figure 12:
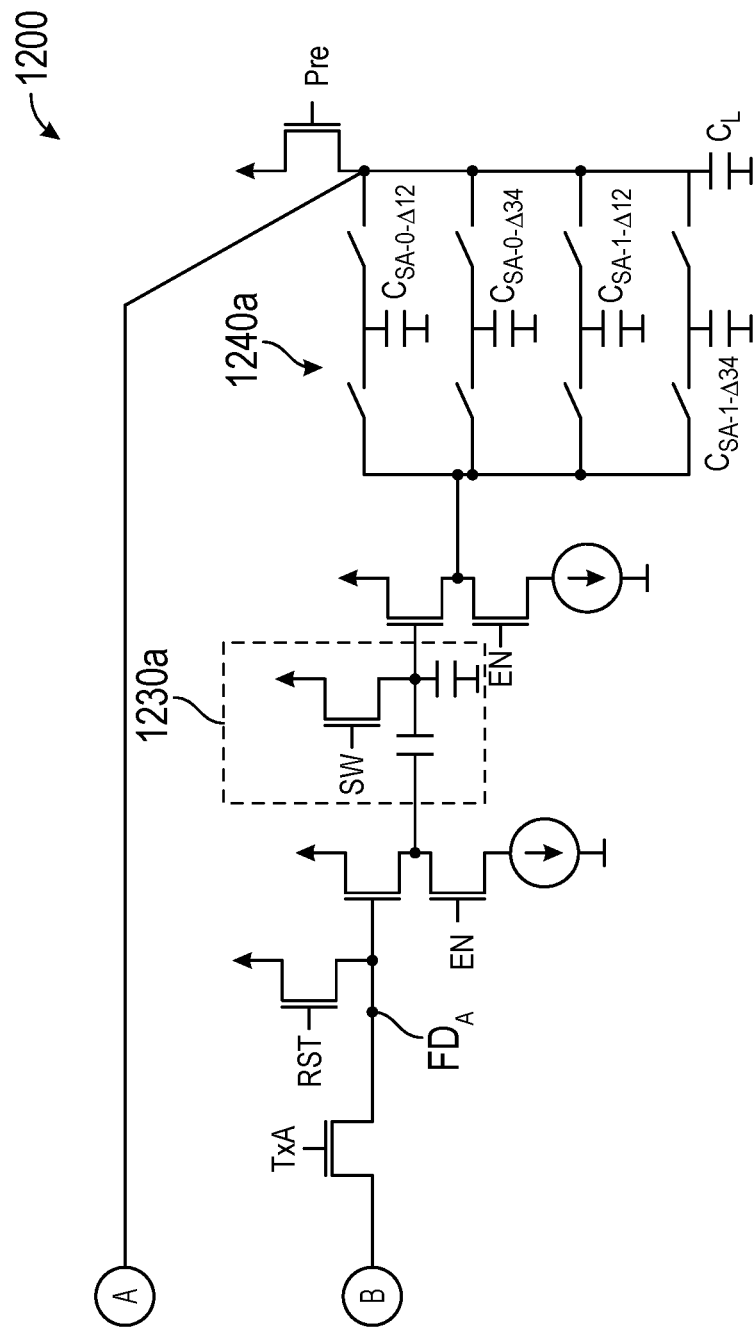

FIG. 12 is a partially schematic circuit diagram of still another pixel 1200 configured in accordance with various embodiments of the present technology. The pixel 1200 is generally similar to the pixel 900 of FIG. 9. Thus, a detailed discussion of generally similar components between the pixel 900 and the pixel 1200 is omitted here for the sake of brevity in light of the detailed discussion provided above. The pixel 1200 differs from the pixel 900 of FIG. 9 in a couple respects. First, a first capacitor bank 1240*a* of the first tap of the pixel 1200 is selectively shorted with a second capacitor bank 1240*b* of the second tap of the pixel 1200 via a summation switch 1231. Second, the components downstream of the second capacitor bank 1240*b* are shared between the first and second taps of the pixel 1200. More specifically, the first and second taps of the pixel share (a) a source follower transistor 1281 having a gate coupled to an output of the second capacitor bank 1240b; (b) an enable transistor 1282 coupled to the source follower transistor 1281 and having a gate configured to receive an enable signal EN; (c) a current source 1283 coupled between the enable transistor 1282 and ground; (d) a third difference amplifier 1230c having an input coupled to the source follower transistor 1281 and the enable transistor 1282; (e) a source follower transistor 1297 having a gate coupled to an output of the third difference amplifier 1230c; and (f) a row select transistor 1210 coupled to the source follower transistor 1297. Thus, components generally similar to the components illustrated downstream of the first capacitor bank 940a of the first tap of the pixel 900 of FIG. 9 can be omitted from the pixel 1200 of FIG. 12, and the pixel 1200 can employ a single-ended readout. The enable signal EN supplied to the gate of the enable transistor 1282 can be the same signal as or a different signal from any one or more of the other enable signals EN illustrated in FIG. 12.

Figure 13:
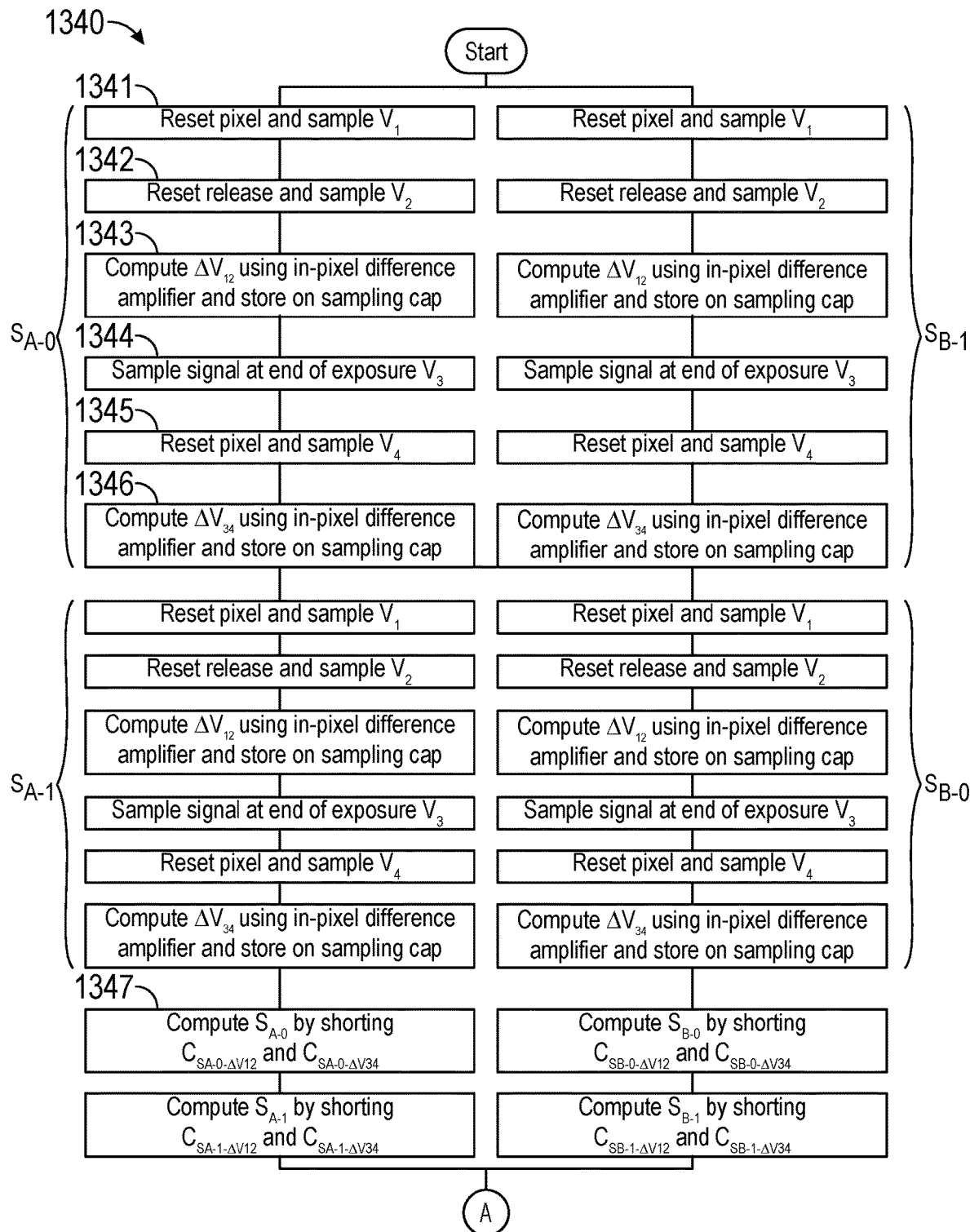
FIG. 13 is a flow diagram illustrating a method of operating the pixel of FIG. 12, in accordance with various embodiments of the present technology.
Figure 13:
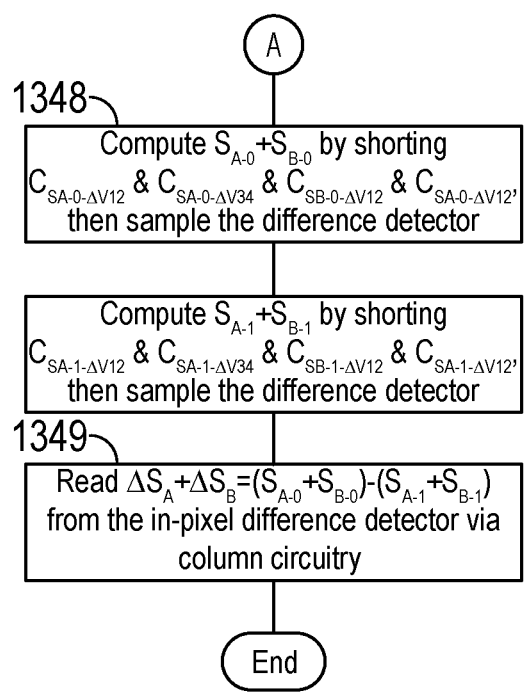

FIG. 13 is a flow diagram illustrating a method 1340 of operating the pixel 1200 of FIG. 12, in accordance with various embodiments of the present technology. The method 1340 is illustrated as a series of steps or blocks. Blocks aligned on the left of the page correspond to the first tap of the pixel 1200, and blocks aligned on the right of the page correspond to the second tap of the pixel 1200. All or a subset of any one or more of the blocks can be executed in accordance with the discussion above. As shown, blocks 1341-1347 are generally similar to blocks 1021-1027 of the method 1020 illustrated in FIG. 10 and discussed in detail above. Therefore, a detailed discussion of blocks 1341-1347 is omitted here for the sake of brevity.

At block 1348, the method 1340 activates the summation switch 1231 to short the outputs of the first capacitor bank 1240a and the second capacitor bank 1240b together. For example, while the method 1340 at block 1347 (a) shorts two sampling capacitors of the first capacitor bank 1240a together using corresponding second switches of the first capacitor bank 1240a (e.g., to compute ($\Delta V_{12}$ for $S_{A-0}$)+ ($\Delta V_{34}$ for $S_{A-0}$)) and (b) shorts two sampling capacitors of the second capacitor bank 1240b together using corresponding second switches of the second capacitor bank 1240b (e.g., to compute ($\Delta V_{12}$ for $S_{B-0}$)+($\Delta V_{34}$ for $S_{B-0}$)), the method 1340 can activate the switch 1231 such that the outputs of the first and second capacitor banks 1240a and 1240b are shorted to compute a first sum (e.g., equivalent to ($\Delta V_{12}$ for $S_{A-0}$)+($\Delta V_{34}$ for $S_{A-0}$)+($\Delta V_{12}$ for $S_{B-0}$)+($\Delta V_{34}$ for $S_{B-0}$)). As discussed above, when the noise components are strongly correlated and largely cancel each other out, the sum can be approximately equivalent to $S_{A-0}$+$S_{B-0}$. The first sum can then be output from the second capacitor bank 1240b and applied to the source follower transistor 1281, such that the first sum is sampled on the third difference amplifier 1230c.

Then, while the method 1340 at block 1347 (a) shorts the other two sampling capacitors of the first capacitor bank 1240a together using corresponding second switches of the first capacitor bank 1240a (e.g., to compute ($\Delta V_{12}$ for $S_{A-1}$)+($\Delta V_{34}$ for $S_{A-1}$)) and (b) shorts the other two sampling capacitors of the second capacitor bank 1240b together using corresponding second switches of the second capacitor bank 1240b (e.g., to compute ($\Delta V_{12}$ for $S_{B-1}$)+($\Delta V_{34}$ for $S_{B-1}$)), the method 1340 can activate the switch 1231 such that the outputs of the first and second capacitor banks 1240a and 1240b are shorted to compute a second sum (e.g., equivalent to ($\Delta V_{12}$ for $S_{A-1}$)+($\Delta V_{34}$ for $S_{A-1}$)+($\Delta V_{12}$ for $S_{B-1}$)+($\Delta V_{34}$ for $S_{B-1}$)). As discussed above, when the noise components are strongly correlated and largely cancel each other out, the second sum can be approximately equivalent to $S_{A-1}$+$S_{B-1}$. The second sum can then be output from the second capacitor bank 1240b and applied to the source follower transistor 1281, such that a corresponding signal is provided to the input of the third difference amplifier 1230c.

At block 1349, the method 1340 continues by (i) computing a difference between the first sum and the second sum, and (ii) reading the difference out of the pixel 1200 to column readout circuitry 1220 via the row select transistor 1210. The method 1340 can compute the difference using the third difference amplifier 1230c. When the noise components are strongly correlated and largely cancel each other out, the difference computed by the third difference amplifier 1230c can be approximately equivalent to ($S_{A-0}$+$S_{B-0}$)−($S_{A-1}$+$S_{B-1}$), or $\Delta S_A$+$\Delta S_B$.

Although the steps of the method 1340 are discussed and illustrated in a particular order, the method 1340 is not so limited. In other embodiments, the method 1340 can be performed in a different order. In these and other embodiments, any of the steps of the method 1340 can be performed before, during, and/or after any of the other steps of the method 1340. Furthermore, the method 1340 can be altered and still remain within these and other embodiments of the present technology. For example, one or more steps of the method 1340 can be omitted and/or repeated in some embodiments. As a specific example, the pixel 1200 can be operated using a method similar to the method 1020 of FIG. 10. For example, the third difference amplifier 1230c can be used to sequentially perform block 1028 and the corresponding block on the right side of the method 1020 illustrated in FIG. 10.

Figure 14:
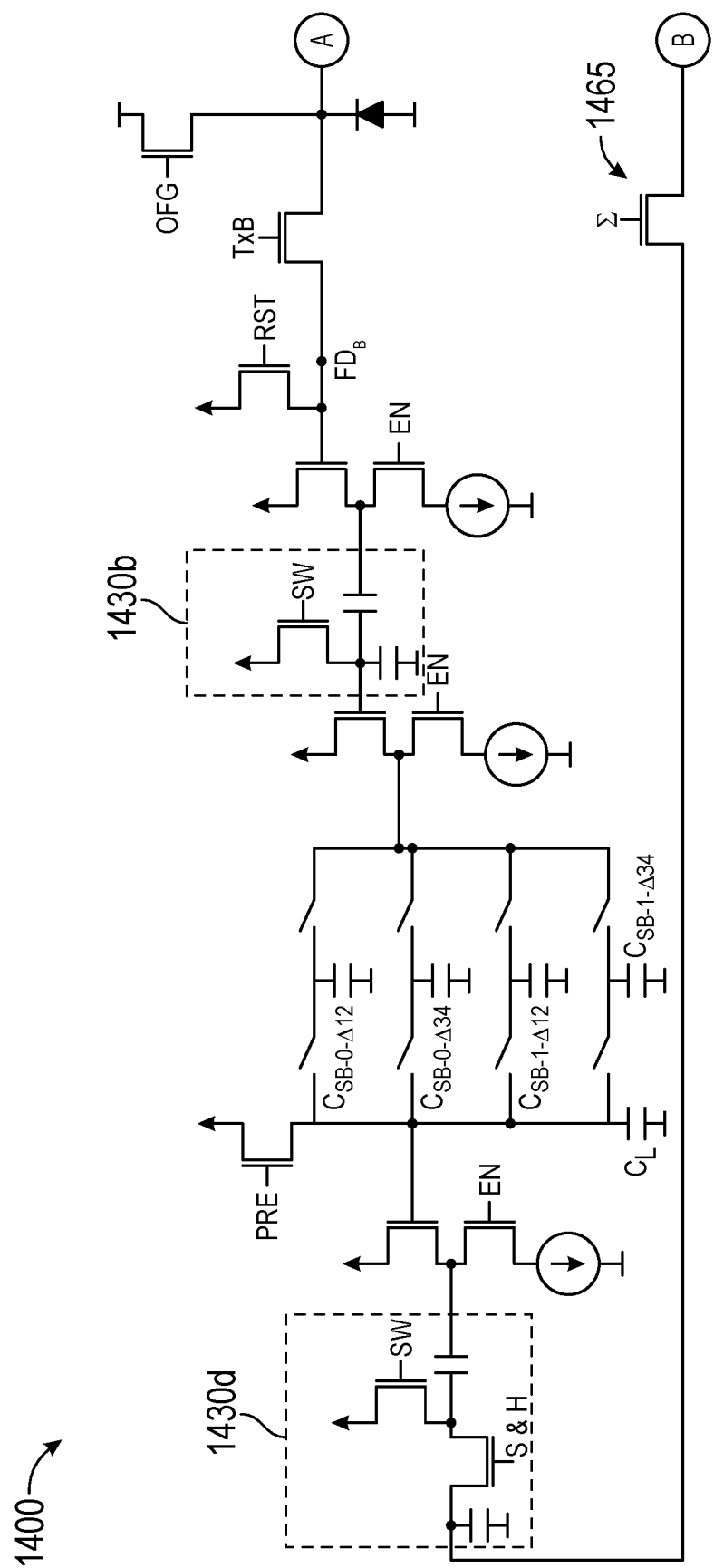
FIG. 14 is a partially schematic circuit diagram of yet another pixel configured in accordance with various embodiments of the present technology.
Figure 14:
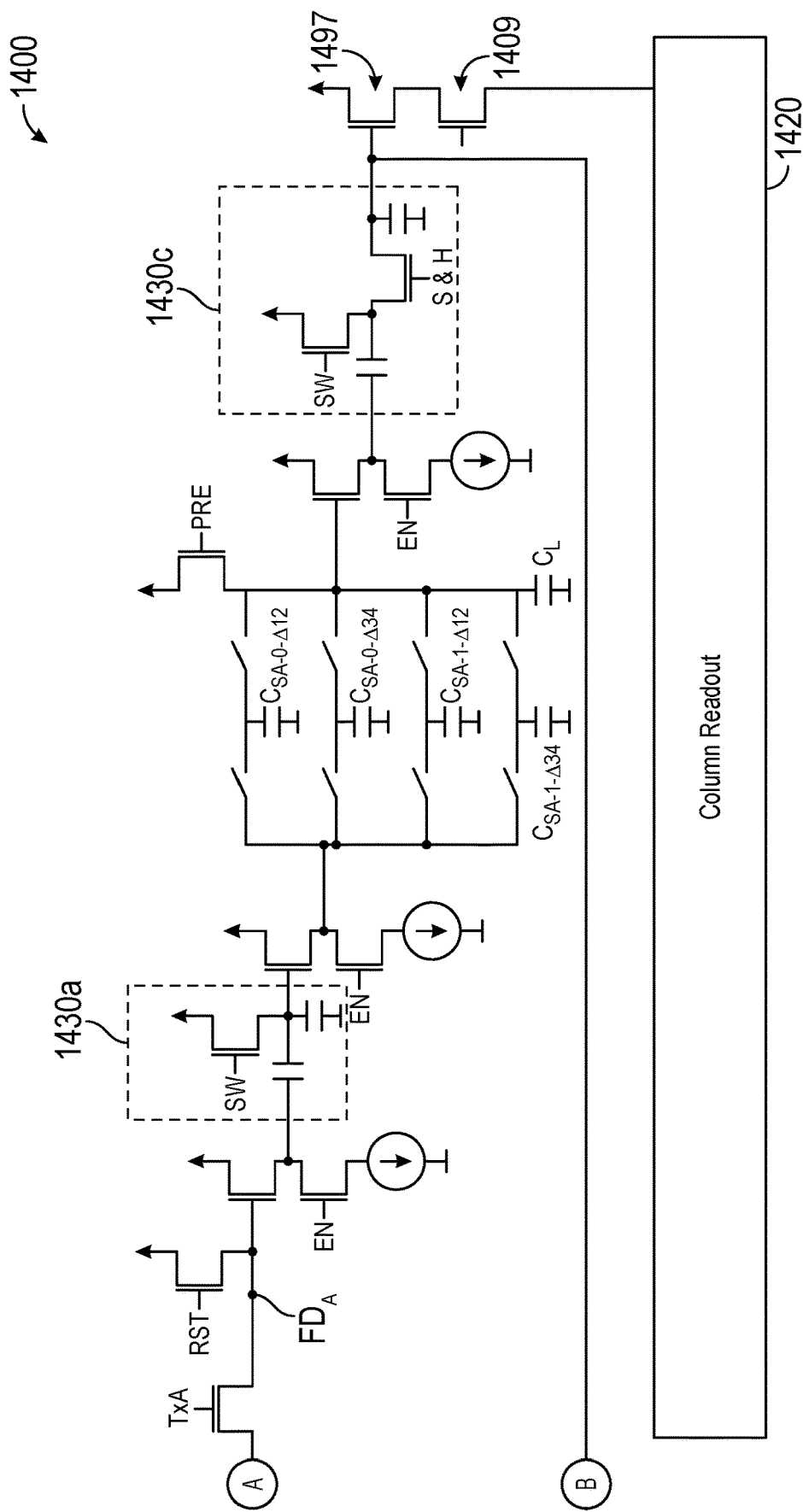

FIG. 14 is a partially schematic circuit diagram of yet another pixel 1400 configured in accordance with various embodiments of the present technology. The pixel 1400 is generally similar to the pixel 900 of FIG. 9. Thus, a detailed discussion of generally similar components between the pixel 900 and the pixel 1400 is omitted here for the sake of brevity in light of the detailed discussion provided above. The pixel 1400 differs from the pixel 900 of FIG. 9 in a couple respects. First, the output of the third difference amplifier 1430c of the first tap of the pixel 1400 is selectively shorted to an output of the fourth difference amplifier 1430d of the second tap of the pixel 1400 via a summation transistor 1465 that includes a gate configured to receive a summation signal 2. Second, the components downstream of the third difference amplifier 1430c are shared between the first and second taps of the pixel 1400. More specifically, the first and second taps of the pixel share (a) a source follower transistor 1497 having a gate coupled to the output of the third difference amplifier 1430c and to the output of the fourth difference amplifier 1430d (via the summation transistor 1465); and (b) a row select transistor 1409 coupled to the source follower transistor 1497. Thus, components generally similar to the components illustrated downstream of the fourth difference amplifier 930d of the second tap of the pixel 900 of FIG. 9 can be omitted from the pixel 1400 of FIG. 14, and the pixel 1400 can employ a single-ended readout.

Figure 15:
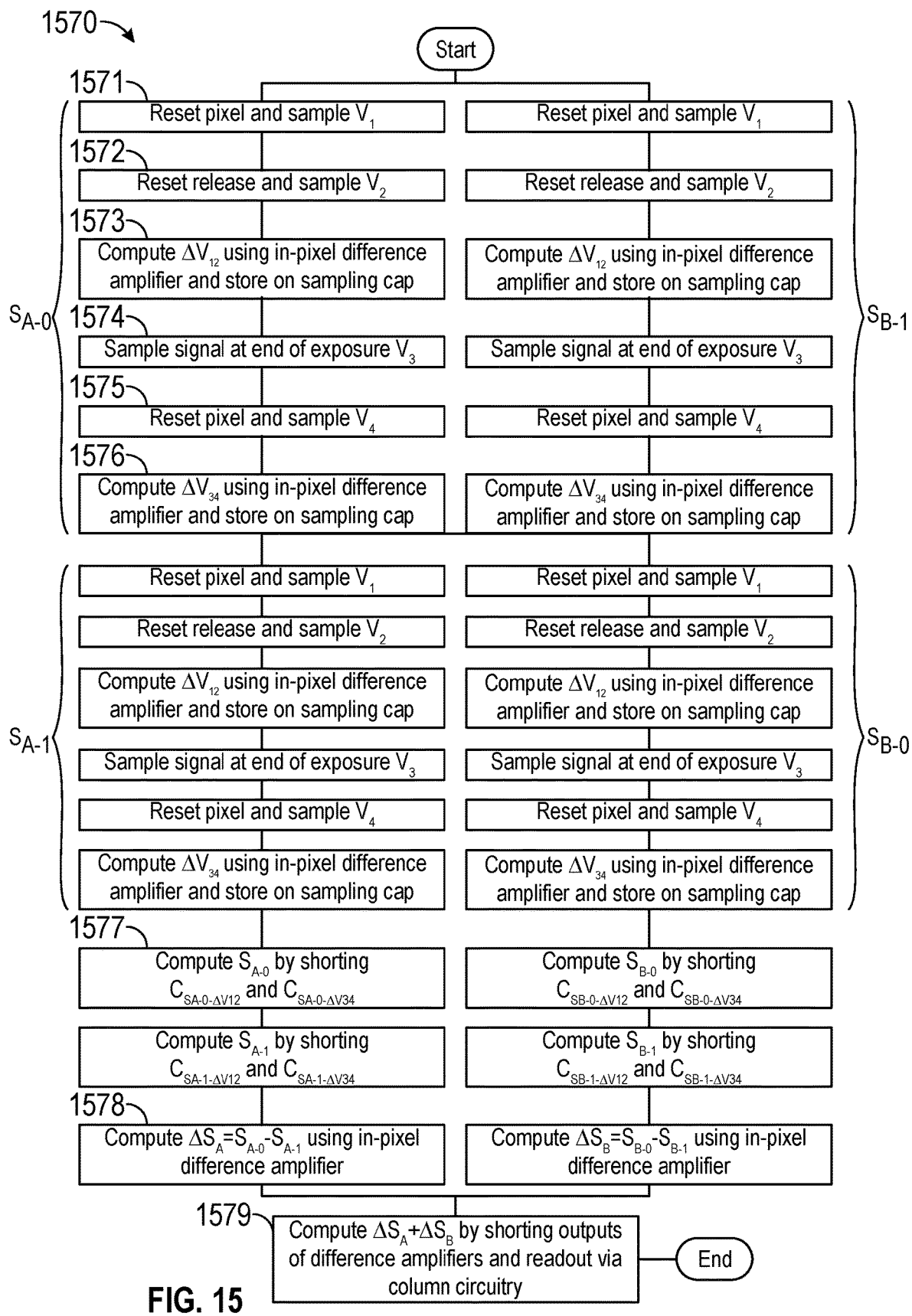
FIG. 15 is a flow diagram illustrating a method of operating the pixel of FIG. 14, in accordance with various embodiments of the present technology.

FIG. 15 is a flow diagram illustrating a method 1570 of operating the pixel 1400 of FIG. 14, in accordance with various embodiments of the present technology. The method 1570 is illustrated as a series of steps or blocks. Blocks aligned on the left of the page correspond to the first tap of the pixel 1400, and blocks aligned on the right of the page correspond to the second tap of the pixel 1400. All or a subset of any one or more of the blocks can be executed in accordance with the discussion above. As shown, blocks 1571-1578 are generally similar to blocks 1021-1028 of the method 1020 illustrated in FIG. 10 and discussed in detail above. Therefore, a detailed discussion of blocks 1571-1578 is omitted here for the sake of brevity.

At block 1579, the difference between the signal $S_{A-0}$ and the signal $S_{A-1}$ output from the third difference amplifier 1430c is summed with the difference between the signal $S_{B-0}$ and the signal $S_{B-1}$ output from the fourth difference amplifier 1430d. More specifically, the method 1570 shorts the output of the third difference amplifier 1430c with the output of the fourth difference amplifier 1430d by asserting the summation signal 2 to activate the summation transistor 1465. The sum of (a) the difference between the signal $S_{A-0}$ and the signal $S_{A-1}$ and (b) the difference between the signal $S_{B-0}$ and the signal $S_{B-1}$, is applied to the gate of the source follower transistor 1497, and a corresponding signal can be read out from the pixel 1400 to column readout circuitry 1420 via the row select transistor 1409. The sum of the differences can represent $\Delta S_A + \Delta S_B$.

Although the steps of the method 1570 are discussed and illustrated in a particular order, the method 1570 is not so limited. In other embodiments, the method 1570 can be performed in a different order. In these and other embodiments, any of the steps of the method 1570 can be performed before, during, and/or after any of the other steps of the method 1570. Furthermore, the method 1570 can be altered and still remain within these and other embodiments of the present technology. For example, one or more steps of the method 1570 can be omitted and/or repeated in some embodiments.

Figure 16:
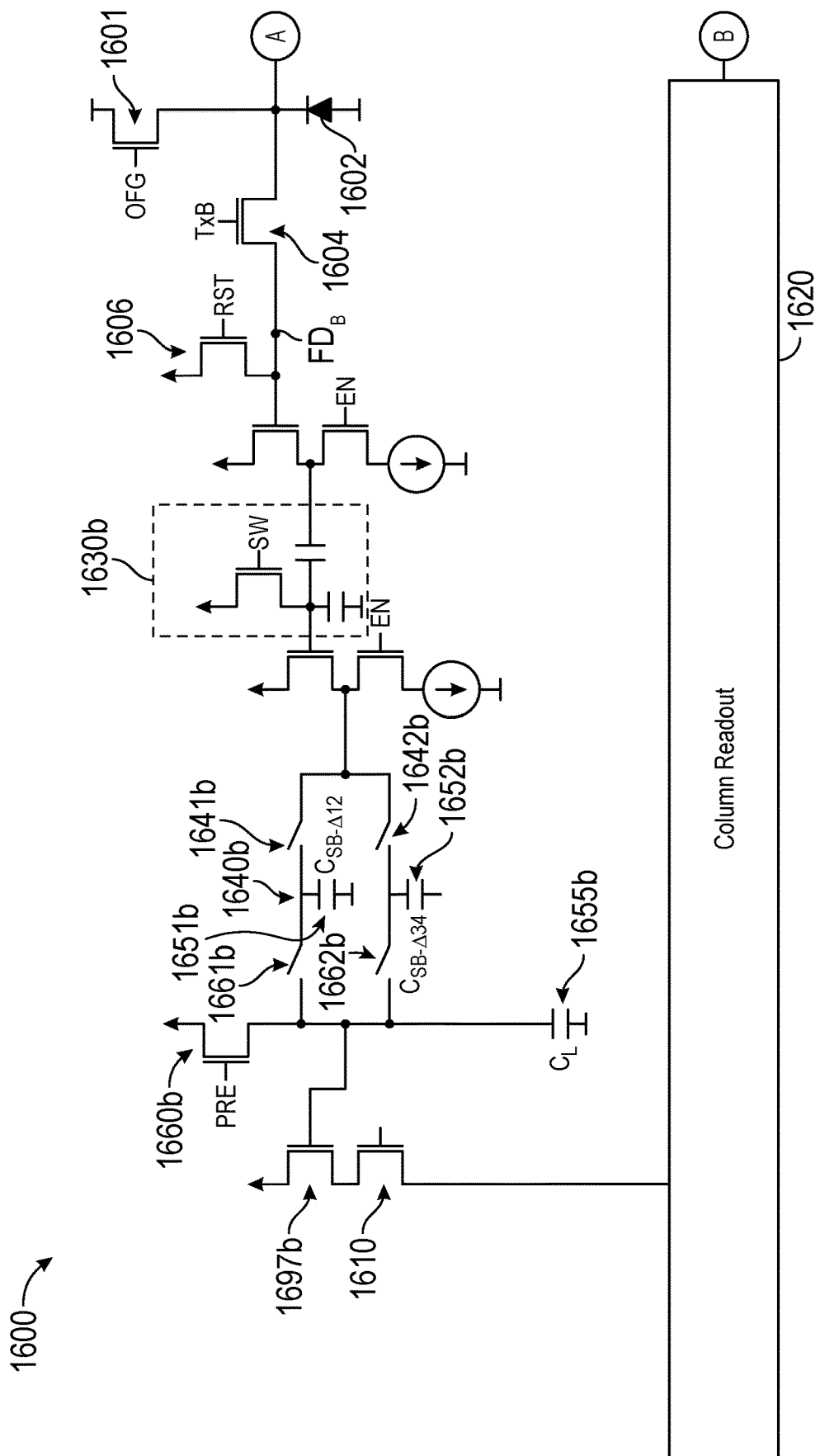
FIG. 16 is a partially schematic circuit diagram of another pixel configured in accordance with various embodiments of the present technology.
Figure 16:
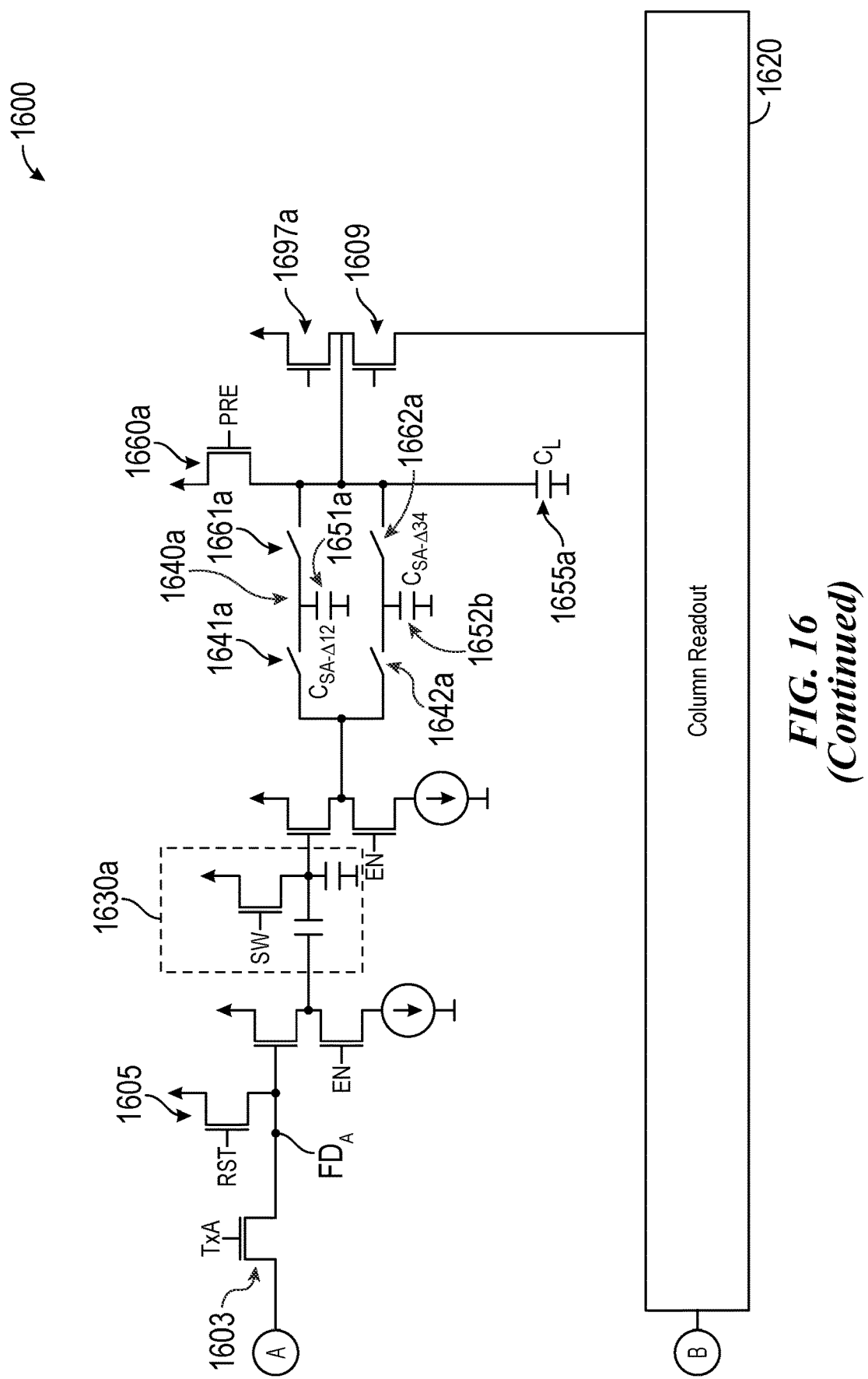

FIG. 16 is a partially schematic circuit diagram of another pixel 1600 configured in accordance with various embodiments of the present technology. The pixel 1600 is generally similar to the pixel 700 of FIG. 7. Thus, a detailed discussion of generally similar components between the pixel 700 and the pixel 1600 is omitted here for the sake of brevity in light of the detailed discussion provided above. The pixel 1600 differs from the pixel 700 of FIG. 7 in that a first capacitor bank 1640a of the first tap of the pixel 1600 includes fewer sampling capacitors than the first capacitor bank 740a of the pixel 700, and a second capacitor bank 1640b of the second tap of the pixel 1600 includes fewer sampling capacitors than the second capacitor bank 740b of the pixel 700. More specifically, referring to the first tap of the pixel 1600 as an example, the first capacitor bank 1640a includes first switches 1641a and 1642a, second switches 1661a and 1662a, sampling capacitors 1651a and 1652a, a transistor 1660a, and a capacitor 1655a. More specifically, the first capacitor bank 1640a includes two circuit branches (as opposed to four that are employed in the pixel 700) coupled in parallel with one another between an input and an output of the first capacitor bank 1640a. Each of the branches includes a corresponding one of the first switches 1641a and 1642a, a corresponding one of the sampling capacitors 1651a and 1652a, and a corresponding one of the second switches 1661a and 1662a. In other words, the first capacitor bank 1640a includes two fewer sampling capacitors and corresponding first and second switches than the first capacitor bank 740a of the pixel 700. All other components of the first capacitor bank 1640a are generally similar to the components of the first capacitor bank 740a. The same holds true for the second capacitor bank 1640b of the pixel 1600 in comparison to the second capacitor bank 740b of the pixel 700. As discussed in greater detail below, use of a long exposure time and a frame buffer enables (a) use of fewer sampling capacitors in each of the first capacitor bank 1640a and the second capacitor bank 1640b, and (b) reading past samples in a pipelined manner during the exposure.

Figure 17:
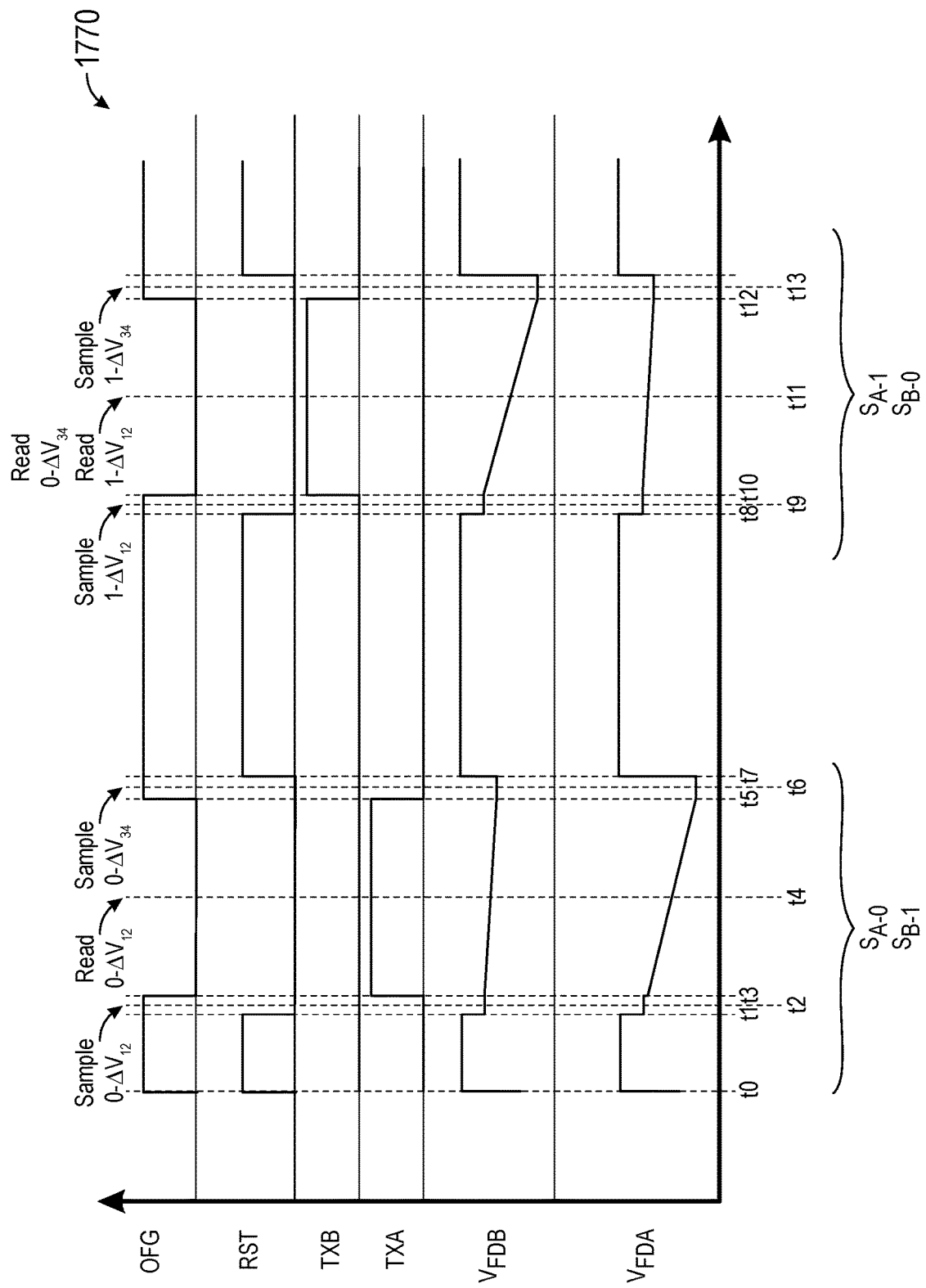
FIG. 17 is a timing diagram illustrating a method of operating the pixel of FIG. 16, in accordance with various embodiments of the present technology.

FIG. 17 is a timing diagram 1770 illustrating a method of operating the pixel 1600 of FIG. 16 that can be employed in combination with the FPN reduction methods described herein, in accordance with various embodiments of the present technology. Referring to FIGS. 16 and 17 together, the method begins at time t0 by asserting the overflow gate signal OFG and the reset signal RST. Asserting the overflow gate signal OFG activates the overflow transistor 1601 of the pixel 1600 and clears any charge generated and accumulated at the photosensor 1602. Asserting the reset signal RST activates the first and second reset transistors 1605 and 1606, and clears any charge accumulated at the floating diffusions $FD_A$ and $FD_B$. Thus, a voltage $V_{FDA}$ at the floating diffusion $FD_A$ and a voltage $V_{FDB}$ at the floating diffusion $FD_B$ are reset to a reference voltage (e.g., $V_{DD}$ or another positive power supply voltage) via the first and second reset transistors 1605 and 1606, respectively. The switch signal SW may also be asserted to reset the voltages at the common nodes of the first and second difference amplifiers 1630a and 1630b. The reset signal RST and/or the switch signal SW can then be deasserted at time t1 while the overflow gate signal OFG can remain asserted. Deasserting the switch signal SW can sample a first reset noise component of the signal $S_{A-0}$ onto the first difference amplifier 1630a and/or a first reset noise component of the signal $S_{B-1}$ onto the second difference amplifier 1630b.

At time t2, $\Delta V_{12}$ for $S_{A-0}$ output from the first difference amplifier 1630a is sampled onto the sampling capacitor 1651a of the first capacitor bank 1640a via the first switch 1641a, and $\Delta V_{12}$ for $S_{B-1}$ output from the second difference amplifier 1630b is sampled onto the sampling capacitor 1651b of the second capacitor bank 1640b via the first switch 1641b. In some embodiments, $\Delta V_{12}$ for $S_{A-0}$ is equivalent to a difference between a first reset noise component of the signal $S_{A-0}$ at time t1 and a first portion of the signal $S_{A-0}$ at time t2. In these and other embodiments, $\Delta V_{12}$ for $S_{B-1}$ is equivalent to a difference between a first reset noise component of the signal $S_{B-1}$ at time t1 and a first portion of the signal $S_{B-1}$ at time t2.

From time t3 to time t5, the transfer signal TxA is asserted to activate the first transfer transistor 1603 of the first tap of the pixel 1600. The period of time between time t3 and time t5 can correspond to a timing at which the illuminator (not shown) emits one or more light pulses, or to a timing at which a substantial amount of light power from one or more light pulses emitted by the illuminator and corresponding to a desired distance or distance range is being received by the pixel 1600 and transferred to the floating diffusion $FD_A$. As such, the photosensor 1602 of the pixel 1600 photogenerates charge or photocurrent during this time period, which is transferred to the floating diffusion $FD_A$ via the first transfer transistor 1603. Thus, the voltage $V_{FDA}$ at the floating diffusion $FD_A$ drops between time t3 and time t5.

At time t4, $\Delta V_{12}$ for $S_{A-0}$ stored on the sampling capacitor 1651a of the first capacitor bank 1640a of the first tap of the pixel 1600 is read out of the pixel 1600 to the column readout circuitry 1620 via the row select transistor 1609 (e.g., by selectively coupling the sampling capacitor 1651a to the gate of the source follower transistor 1697a via the second switch 1661a). In addition, $\Delta V_{12}$ for $S_{B-1}$ stored on the second sampling capacitor 1651b of the second capacitor bank 1640a of the second tap of the pixel 1600 is read out of the pixel 1600 to the column readout circuitry 1620 via the row select transistor 1610 (e.g., by selectively coupling the sampling capacitor 1651b to the gate of the source follower transistor 1697b via the second switch 1661b). Thus, although sampled onto a respective one of the first and second capacitor banks 1640a and 1640b at time t2, $\Delta V_{12}$ for $S_{A\text{-}0}$ and $\Delta V_{12}$ for $S_{B\text{-}1}$ are not read out of the pixel 1600 until time t4.

At time t5, the transfer signal TxA can be deasserted, thereby deactivating the first transfer transistor 1603. In addition, the overflow gate signal OFG can be asserted to activate the overflow transistor 1601 and clear out any charge at the photosensor 1602. The switch signal SW may also be pulsed to sample a second portion of the signal $S_{A\text{-}0}$ onto the first difference amplifier 1630a and/or to sample a second portion of the signal $S_{B\text{-}1}$ onto the second difference amplifier 1630b.

At time t6, $\Delta V_{34}$ for $S_{A\text{-}0}$ output from the first difference amplifier 1630a is sampled onto the sampling capacitor 1652a of the first capacitor bank 1640a via the first switch 1642a, and $\Delta V_{34}$ for $S_{B\text{-}1}$ output from the second difference amplifier 1630b is sampled onto the sampling capacitor 1652b of the second capacitor bank 1640b via the first switch 1642b. In some embodiments, $\Delta V_{34}$ for $S_{A\text{-}0}$ is equivalent to a difference between a second portion of the signal $S_{A\text{-}0}$ at time t5 and a second reset noise component of the signal $S_{A\text{-}0}$ at time t6. In these and other embodiments, $\Delta V_{34}$ for $S_{B\text{-}1}$ is equivalent to a difference between a second portion of the signal $S_{B\text{-}1}$ at time t5 and a second reset noise component of the signal $S_{B\text{-}1}$ at time t6.

At time t7, the reset signal RST is asserted to activate the first and second reset transistors 1605 and 1606. As discussed above, activating the first and second reset transistors 1605 and 1606 clears any charge accumulated at the floating diffusions $FD_A$ and $FD_B$. Thus, the voltage $V_{FDA}$ at the floating diffusion $FD_A$ and the voltage $V_{FDB}$ at the floating diffusion $FD_B$ are reset to the reference voltage (e.g., $V_{DD}$ or another positive power supply voltage) via the first and second reset transistors 1605 and 1606, respectively. The switch signal SW may also be asserted to reset the voltages at the common nodes of the first and second difference amplifiers 1630a and 1630b. The reset signal RST and/or the switch signal SW can then be deasserted at time t8 while the overflow gate signal OFG can remain asserted. Deasserting the switch signal SW can sample a first reset noise component of the signal $S_{A\text{-}1}$ onto the first difference amplifier 1630a and/or a first reset noise component of the signal $S_{B\text{-}0}$ onto the second difference amplifier 1630b.

At time t9, $\Delta V_{12}$ for $S_{A\text{-}1}$ output from the first difference amplifier 1630a is sampled onto the sampling capacitor 1651a of the first capacitor bank 1640a via the first switch 1641a, and $\Delta V_{12}$ for $S_{B\text{-}0}$ output from the second difference amplifier 1630b is sampled onto the sampling capacitor 1651b of the second capacitor bank 1640b via the first switch 1641b. In some embodiments, $\Delta V_{12}$ for $S_{A\text{-}1}$ is equivalent to a difference between a first reset noise component of the signal $S_{A\text{-}1}$ at time t8 and a first portion of the signal $S_{A\text{-}1}$ at time t9. In these and other embodiments, $\Delta V_{12}$ for $S_{B\text{-}0}$ is equivalent to a difference between a first reset noise component of the signal $S_{B\text{-}0}$ at time t8 and a first portion of the signal $S_{B\text{-}0}$ at time t9.

From time t10 to time t11, the transfer signal TxB is asserted to activate the second transfer transistor 1604 of the second tap of the pixel 1600. The period of time between time t10 and time t11 can correspond to a timing at which the illuminator (not shown) emits one or more light pulses, or to a timing at which a substantial amount of light power from one or more light pulses emitted by the illuminator and corresponding to a desired distance or distance range is being received by the pixel 1600 and transferred to the floating diffusion $FD_B$. As such, the photosensor 1602 of the pixel 1600 photogenerates charge or photocurrent during this time period, which is transferred to the floating diffusion $FD_B$ via the second transfer transistor 1604. Thus, the voltage $V_{FDB}$ at the floating diffusion $FD_B$ drops between time t10 and time t11.

At time t11, $\Delta V_{34}$ for $S_{A\text{-}0}$ stored on the sampling capacitor 1652a of the first capacitor bank 1640a of the first tap of the pixel 1600 is read out of the pixel 1600 to the column readout circuitry 1620 via the row select transistor 1609 (e.g., by selectively coupling the sampling capacitor 1652a to the gate of the source follower transistor 1697a via the second switch 1662a). In addition, $\Delta V_{34}$ for $S_{B\text{-}1}$ stored on the second sampling capacitor 1652b of the second capacitor bank 1640a of the second tap of the pixel 1600 is read out of the pixel 1600 to the column readout circuitry 1620 via the row select transistor 1610 (e.g., by selectively coupling the sampling capacitor 1652b to the gate of the source follower transistor 1697b via the second switch 1662b). Thus, although sampled onto a respective one of the first and second capacitor banks 1640a and 1640b at time t6, $\Delta V_{34}$ for $S_{A\text{-}0}$ and $\Delta V_{34}$ for $S_{B\text{-}1}$ are not read out of the pixel 1600 until time t11.

Also, at (or shortly before or after) time t11, $\Delta V_{12}$ for $S_{A\text{-}1}$ stored on the sampling capacitor 1651a of the first capacitor bank 1640a of the first tap of the pixel 1600 is read out of the pixel 1600 to the column readout circuitry 1620 via the row select transistor 1609 (e.g., by selectively coupling the sampling capacitor 1651a to the gate of the source follower transistor 1697a via the second switch 1661a). In addition, $\Delta V_{12}$ for $S_{B\text{-}0}$ stored on the second sampling capacitor 1651b of the second capacitor bank 1640a of the second tap of the pixel 1600 is read out of the pixel 1600 to the column readout circuitry 1620 via the row select transistor 1610 (e.g., by selectively coupling the sampling capacitor 1651b to the gate of the source follower transistor 1697b via the second switch 1661b). Thus, although sampled onto a respective one of the first and second capacitor banks 1640a and 1640b at time t9, $\Delta V_{12}$ for $S_{A\text{-}1}$ and $\Delta V_{12}$ for $S_{B\text{-}0}$ are not read out of the pixel 1600 until time t11. $\Delta V_{12}$ for $S_{A\text{-}1}$ stored on the sampling capacitor 1651a and $\Delta V_{12}$ for $S_{B\text{-}0}$ stored on the sampling capacitor 1651b can be read out simultaneously with $\Delta V_{34}$ for $S_{A\text{-}0}$ stored on the sampling capacitor 1652a and $\Delta V_{34}$ for $S_{B\text{-}1}$ stored on the second sampling capacitor 1652b, respectively, such as by (a) shorting the sampling capacitors 1651a and 1652a together via the second switches 1661a and 1662a and/or (b) shorting the sampling capacitors 1651b and 1652b together via the second switches 1661b and 1662b. Alternatively, $\Delta V_{12}$ for $S_{A\text{-}1}$ stored on the sampling capacitor 1651a and $\Delta V_{12}$ for $S_{B\text{-}0}$ stored on the sampling capacitor 1651b can be read out sequentially with $\Delta V_{34}$ for $S_{A\text{-}0}$ stored on the sampling capacitor 1652a and $\Delta V_{34}$ for $S_{B\text{-}1}$ stored on the second sampling capacitor 1652b, respectively.

At time t12, the transfer signal TxB can be deasserted, thereby deactivating the second transfer transistor 1604. In addition, the overflow gate signal OFG can be asserted to activate the overflow transistor 1601 and clear out any charge at the photosensor 1602. The switch signal SW may also be pulsed to sample a second portion of the signal $S_{A\text{-}1}$ onto the first difference amplifier 1630a and/or to sample a second portion of the signal $S_{B\text{-}0}$ onto the second difference amplifier 1630b.

At time t13, $\Delta V_{34}$ for $S_{A\text{-}1}$ output from the first difference amplifier 1630a is sampled onto the sampling capacitor 1652a of the first capacitor bank 1640a via the first switch 1642a, and $\Delta V_{34}$ for $S_{B-0}$ output from the second difference amplifier 1630b is sampled onto the sampling capacitor 1652b of the second capacitor bank 1640b via the first switch 1642b. In some embodiments, $\Delta V_{34}$ for $S_{A-0}$ is equivalent to a difference between a second portion of the signal $S_{A-1}$ at time t12 and a second reset noise component of the signal $S_{A-1}$ at time t13. In these and other embodiments, $\Delta V_{34}$ for $S_{B-0}$ is equivalent to a difference between a second portion of the signal $S_{B-0}$ at time t12 and a second reset noise component of the signal $S_{B-0}$ at time t13.

Although not shown in the timing diagram 1770 of FIG. 17, $\Delta V_{34}$ for $S_{A-1}$ stored on the sampling capacitor 1651a of the first capacitor bank 1640a of the first tap of the pixel 1600 can be read out of the pixel 1600 during a next sub-frame at a timing corresponding to time t4 of the first sub-frame. More specifically, $\Delta V_{34}$ for $S_{A-1}$ can be read out to the column readout circuitry 1620 via the row select transistor 1609 (e.g., by selectively coupling the sampling capacitor 1652a to the gate of the source follower transistor 1697a via the second switch 1662a). Similarly, $\Delta V_{34}$ for $S_{B-1}$ stored on the sampling capacitor 1651b of the second capacitor bank 1640b of the second tap of the pixel 1600 can be read out of the pixel 1600 during a next sub-frame at a timing corresponding to time t4 of the first sub-frame. More specifically, $\Delta V_{34}$ for $S_{B-1}$ can be read out to the column readout circuitry 1620 via the row select transistor 1610 (e.g., by selectively coupling the sampling capacitor 1652b to the gate of the source follower transistor 1697b via the second switch 1662b). Thus, although sampled onto a respective one of the first and second capacitor banks 1640a and 1640b at time t13, $\Delta V_{34}$ for $S_{A-1}$ and $\Delta V_{34}$ for $S_{B-0}$ are not read out of the pixel 1600 until a later time.

Although the steps of the method illustrated by the timing diagram 1770 are discussed and illustrated in a particular order, the method is not so limited. In other embodiments, the method illustrated by the timing diagram 1770 can be performed in a different order. In these and other embodiments, any of the steps of the method can be performed before, during, and/or after any of the other steps of the method. Furthermore, the method illustrated by the timing diagram 1770 can be altered and still remain within these and other embodiments of the present technology. For example, one or more steps of the method illustrated by the timing diagram 1770 can be omitted and/or repeated in some embodiments.

Figure 18:
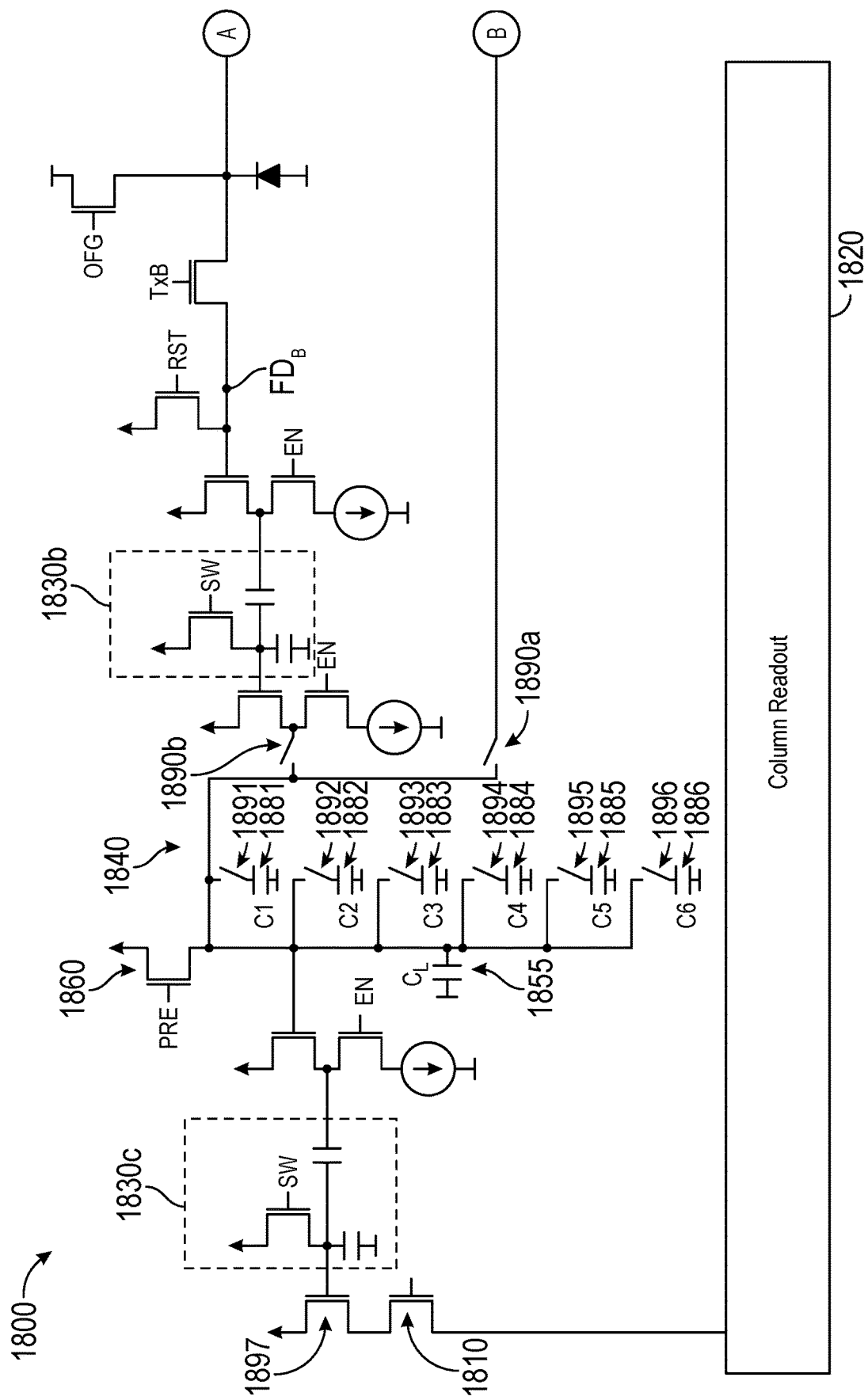
FIG. 18 is a partially schematic circuit diagram of still another pixel configured in accordance with various embodiments of the present technology.
Figure 18:
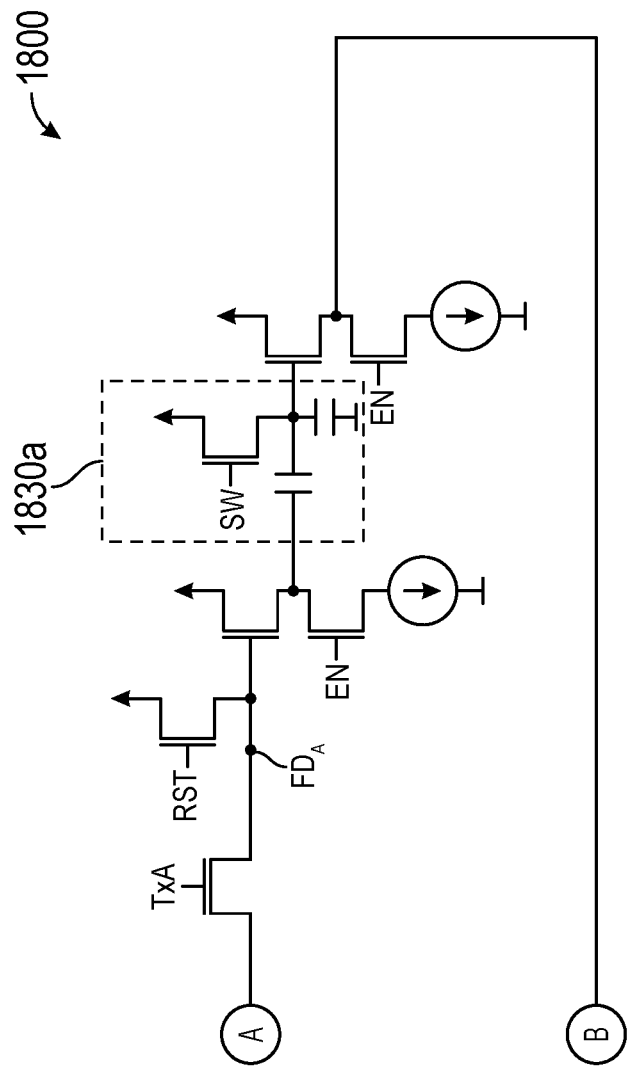

FIG. 18 is a partially schematic circuit diagram of still another pixel 1800 configured in accordance with various embodiments of the present technology. The pixel 1800 is generally similar to the pixel 1200 of FIG. 12. Thus, a detailed discussion of generally similar components between the pixel 1200 and the pixel 1800 is omitted here for the sake of brevity in light of the detailed discussion provided above. The pixel 1800 differs from the pixel 1200 of FIG. 12 in a couple respects. First, rather than coupling the outputs of two different capacitor banks, the pixel 1800 includes a capacitor bank 1840 that is shared between the first tap of the pixel 1800 and the second tap of the pixel 1800 and that is arranged such that capacitors 1881-1886 can be programmed using the outputs of either or both of the first difference amplifier 1830a and/or the second difference amplifier 1830b. Second, the outputs of the first and second difference amplifiers 1830a and 1830b are selectively coupled to the input of the capacitor bank 1840 via first and second switches 1890a and 1890b, respectively. Third, the structure of the capacitor bank 1840 and the total number of sampling capacitors of the pixel 1800 differ from the structure of a capacitor bank 1240 and the total number of sampling capacitors of the pixel 1200, respectively.

As shown in FIG. 18, the capacitor bank 1840 includes switches 1891-1896, sampling capacitors 1881-1886, a transistor 1860, and a capacitor 1855. More specifically, the capacitor bank 1840 includes six circuit branches that are each selectively coupled to the input and the output of the capacitor bank 1840 via a corresponding one of the switches 1891-1896. Each circuit branch includes the corresponding one of the switches 1891-1896 and a corresponding one of the sampling capacitors 1881-1886. For example, a first circuit branch includes the switch 1891 and the sampling capacitor 1881 coupled between ground and the switch 1891. The switch 1891 selectively couples the sampling capacitor 1881 to the input and output of the capacitor bank 1840. As discussed in greater detail below, the sampling capacitors can be used to selectively sample various difference signals output from the first difference amplifier 1830a and/or the second difference amplifier 1830b, and to sum two or more of the difference signals together before outputting the resulting sums to the third difference amplifier 1830c.

FIG. 19 is a table 1920 illustrating a method of operating the pixel 1800 of FIG. 18, in accordance with various embodiments of the present technology. Referring to FIGS. 18 and 19 together, $\Delta V_{12}$ for $S_{A-0}$ output from the first difference amplifier 1830a can be sampled onto the sampling capacitor 1881 of the capacitor bank 1840 via the first switch 1890a and the switch 1891. In addition, $\Delta V_{12}$ for $S_{B-1}$ output from the second difference amplifier 1830b can be sampled onto the sampling capacitor 1882 of the capacitor bank 1840 via the second switch 1890b and the switch 1892. Then, $\Delta V_{34}$ for $S_{A-0}$ output from the first difference amplifier 1830a can be sampled onto the sampling capacitor 1883 of the capacitor bank 1840 via the first switch 1890a and the switch 1893. Furthermore, $\Delta V_{34}$ for $S_{B-1}$ output from the second difference amplifier 1830b can be sampled onto the sampling capacitor 1884 of the capacitor bank 1840 via the second switch 1890b and the switch 1894.

Thereafter, $\Delta V_{12}$ for $S_{A-0}$ stored on the sampling capacitor 1881 and $\Delta V_{34}$ for $S_{A-0}$ stored on the sampling capacitor 1883 can be summed (e.g., by shorting the sampling capacitor 1881 and the sampling capacitor 1883 together via the switch 1891 and the switch 1893). The sum (representing $S_{A-0}$) can be stored on the sampling capacitor 1881 of the capacitor bank 1840. In addition, $\Delta V_{12}$ for $S_{B-1}$ stored on the sampling capacitor 1882 and $\Delta V_{34}$ for $S_{B-1}$ stored on the sampling capacitor 1884 can be summed (e.g., by shorting the sampling capacitor 1882 and the sampling capacitor 1884 together via the switch 1892 and the switch 1894). The sum (representing $S_{B-1}$) can be stored on the sampling capacitor 1882 of the capacitor bank 1840. In some embodiments, the voltages on the sampling capacitors 1883 and 1884 can then be reset by asserting the signal PRE to activate the transistor 1860 while activating the switches 1893 and 1894.

Then, $\Delta V_{12}$ for $S_{A-1}$ output from the first difference amplifier 1830a can be sampled onto the sampling capacitor 1883 of the capacitor bank 1840 via the first switch 1890a and the switch 1893. In addition, $\Delta V_{12}$ for $S_{B-0}$ output from the second difference amplifier 1830b can be sampled onto the sampling capacitor 1884 of the capacitor bank 1840 via the second switch 1890b and the switch 1894. Next, $\Delta V_{34}$ for $S_{A-1}$ output from the first difference amplifier 1830a can be sampled onto the sampling capacitor 1885 of the capacitor bank 1840 via the first switch 1890a and the switch 1895. Furthermore, $\Delta V_{34}$ for $S_{B-0}$ output from the second difference amplifier 1830b can be sampled onto the sampling capacitor 1886 of the capacitor bank 1840 via the second switch 1890b and the switch 1896.

Thereafter, $\Delta V_{12}$ for $S_{A-1}$ stored on the sampling capacitor 1883 and $\Delta V_{34}$ for $S_{A-1}$ stored on the sampling capacitor 1885 can be summed (e.g., by shorting the sampling capacitor 1883 and the sampling capacitor 1885 together via the switch 1893 and the switch 1895). The sum (representing $S_{A-1}$) can be stored on the sampling capacitor 1883 of the capacitor bank 1840. In addition, $\Delta V_{12}$ for $S_{B-0}$ stored on the sampling capacitor 1884 and $\Delta V_{34}$ for $S_{B-0}$ stored on the sampling capacitor 1886 can be summed (e.g., by shorting the sampling capacitor 1884 and the sampling capacitor 1886 together via the switch 1894 and the switch 1896). The sum (representing $S_{B-0}$) can be stored on the sampling capacitor 1884 of the capacitor bank 1840. In some embodiments, the voltages on the sampling capacitors 1885 and 1886 can then be reset by asserting the signal PRE to activate the transistor 1860 while activating the switches 1895 and 1896.

$S_{A-0}$ (representing the sum of $\Delta V_{12}$ for $S_{A-0}$ and $\Delta V_{34}$ for $S_{A-0}$) stored on the sampling capacitor 1881 can then be summed with $S_{B-0}$ (representing the sum of $\Delta V_{12}$ for $S_{B-0}$ and $\Delta V_{34}$ for $S_{B-0}$) stored on the sampling capacitor 1884 (e.g., by shorting the sampling capacitor 1881 and the sampling capacitor 1884 together via the switch 1891 and the switch 1894). The resulting sum (representing $S_{A-0}+S_{B-0}$) can be stored on the sampling capacitor 1881 of the capacitor bank 1840. In addition, $S_{A-1}$ (representing the sum of $\Delta V_{12}$ for $S_{A-1}$ and $\Delta V_{34}$ for $S_{A-1}$) stored on the sampling capacitor 1883 can be summed with $S_{B-1}$ (representing the sum of $\Delta V_{12}$ for $S_{B-1}$ and $\Delta V_{34}$ for $S_{B-1}$) stored on the sampling capacitor 1882 (e.g., by shorting the sampling capacitor 1883 and the sampling capacitor 1882 together via the switch 1893 and the switch 1892). The resulting sum (representing $S_{A-1}+S_{B-1}$) can be stored on the sampling capacitor 1882 of the capacitor bank 1840. In some embodiments, the voltages on the sampling capacitors 1883 and 1884 can then be reset by asserting the signal PRE to activate the transistor 1860 while activating the switches 1893 and 1894.

The third difference amplifier 1830c of the pixel 1800 can then determine a difference between (a) the sum (representing $S_{A-0}+S_{B-0}$) stored on the sampling capacitor 1881 of the capacitor bank 1840 and (b) the sum (representing $S_{A-1}+S_{B-1}$) stored on the sampling capacitor 1882 of the capacitor bank 1840. For example, the sum (representing $S_{A-0}+S_{B-0}$) stored on the sampling capacitor 1881 of the capacitor bank 1840 can be read out of the capacitor bank 1840 via the switch 1891 and sampled onto the third difference amplifier 1830c. Then, the sum (representing $S_{A-1}+S_{B-1}$) stored on the sampling capacitor 1882 of the capacitor bank 1840 can be read out of the capacitor bank 1840 via the switch 1892 and input into the third difference amplifier 1830c. The third difference amplifier 1830c can then compute the difference between the sums, and output the difference to a gate of the source follower transistor 1897. A signal corresponding to the difference applied to the gate of the source follower transistor 1897 can then be read out of the pixel 1800 to the column readout circuitry 1820 via the row select transistor 1810.

Although the steps of the method illustrated by the table 1920 are discussed and illustrated in a particular order, the method is not so limited. In other embodiments, the method illustrated by the table 1920 can be performed in a different order. In these and other embodiments, any of the steps of the method can be performed before, during, and/or after any of the other steps of the method. Furthermore, the method illustrated by the table 1920 can be altered and still remain within these and other embodiments of the present technology. For example, one or more steps of the method illustrated by the table 1920 can be omitted and/or repeated in some embodiments.

Figure 20:
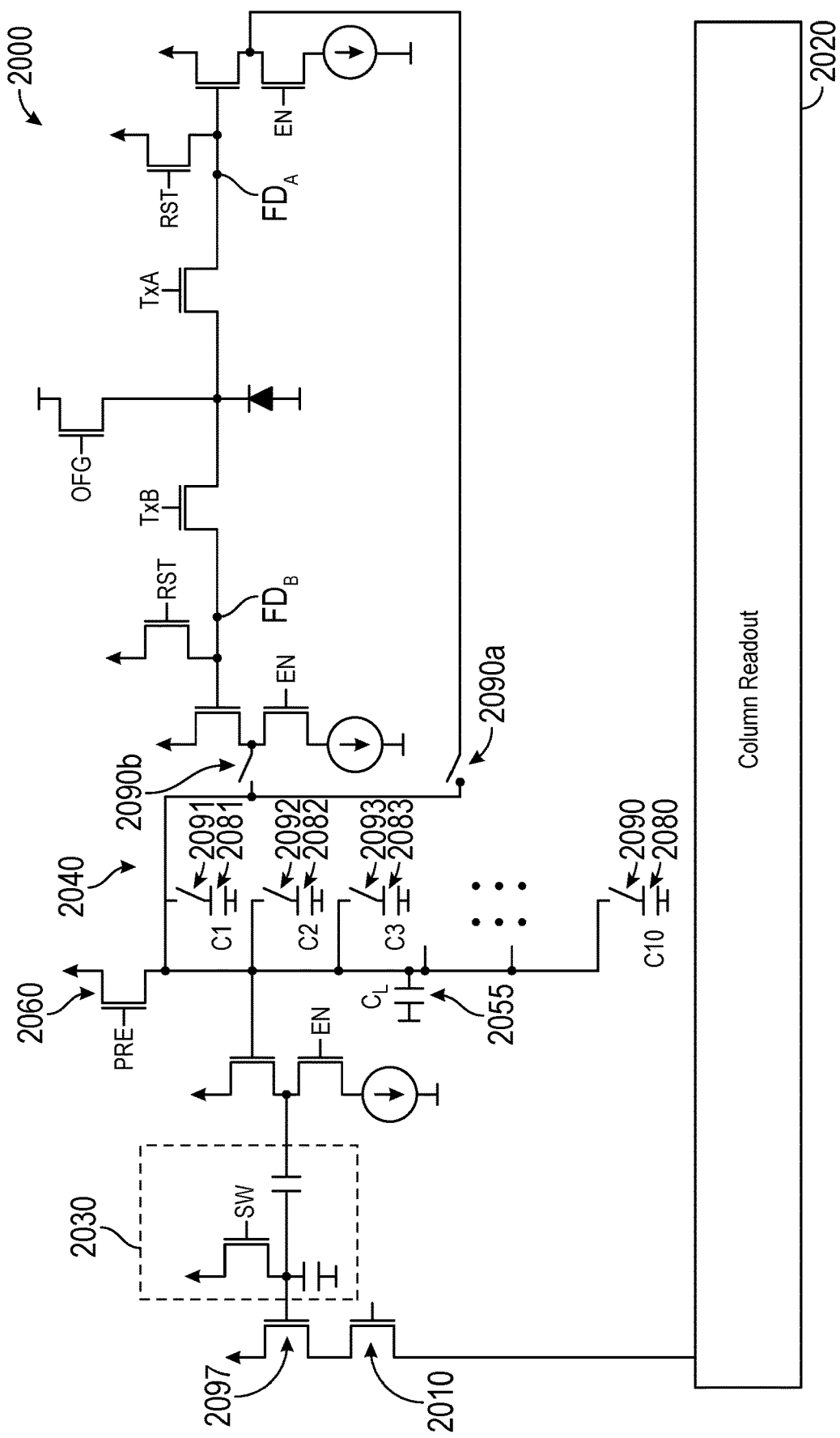
FIG. 20 is a partially schematic circuit diagram of yet another pixel configured in accordance with various embodiments of the present technology.

FIG. 20 is a partially schematic circuit diagram of yet another pixel 2000 configured in accordance with various embodiments of the present technology. The pixel 2000 is generally similar to the pixel 1800 of FIG. 18. Thus, a detailed discussion of generally similar components between the pixel 1800 and the pixel 2000 is omitted here for the sake of brevity in light of the detailed discussion provided above. The pixel 2000 differs from the pixel 1800 of FIG. 18 in a couple respects. First, the capacitor bank 2040 of the pixel 2000 includes ten circuit branches, meaning the capacitor bank 2040 includes (a) ten sampling capacitors 2080-2089 and (b) ten corresponding switches 2090-2099. Second, the pixel 2000 omits the first difference amplifier 1830a; the second difference amplifier 1830b; and the source follower transistors, enable transistors, and current sources immediately following the first and second difference amplifiers 1830a and 1830b of the pixel 1800 of FIG. 18. Thus, instead of directly computing $\Delta V_{12}$ and $\Delta V_{34}$ for each of $S_{A-0}$, $S_{A-1}$, $S_{B-0}$, and $S_{B-1}$ using difference amplifiers (e.g., the first difference amplifier 1830a and/or the second difference amplifier 1830b), the pixel 2000 of FIG. 20 can directly store $V_1$, $V_2$, $V_3$, and $V_4$ samples for $S_{A-0}$, $S_{A-1}$, $S_{B-0}$, and $S_{B-1}$ onto one or more of the sampling capacitors 1880-1881. In some embodiments, $V_1$ for each of $S_{A-0}$, $S_{A-1}$, $S_{B-0}$, and $S_{B-1}$ can represent a first reset noise component of the corresponding signal and can provided by Equation 1 below; $V_2$ for each of $S_{A-0}$, $S_{A-1}$, $S_{B-0}$, and $S_{B-1}$ can represent a first portion of the corresponding signal and can be provided by Equation 2 below; $V_3$ for each of $S_{A-0}$, $S_{A-1}$, $S_{B-0}$, and $S_{B-1}$ can represent a second portion of the corresponding signal and can be provided by Equation 3 below; and $V_4$ for each of $S_{A-0}$, $S_{A-1}$, $S_{B-0}$, and $S_{B-1}$ can represent a second reset noise component of the corresponding signal and can be provided by Equation 4 below.

$$V_1 = V_{DD} + v_n(t1,\omega) \qquad \text{Equation 1:}$$

$$V_2 = V_{DD} - \Delta V_{RST} + v_n(t2,\omega) \qquad \text{Equation 2:}$$

$$V_3 = V_{DD} - S - \Delta V_{RST} + v_n(t3,\omega) \qquad \text{Equation 3:}$$

$$V_4 = V_{DD} + v_n(t4,\omega) \qquad \text{Equation 4:}$$

FIG. 21 is a table 2140 illustrating a quadruple sampling method of operating the pixel of FIG. 20, in accordance with various embodiments of the present technology. Referring to FIGS. 20 and 21 together, $V_1$ for $S_{A-0}$ sampled by the first tap of the pixel 2000 can be sampled onto the sampling capacitor 2081 of the capacitor bank 2040 via the first switch 2090a and the switch 2091. In addition, $V_1$ for $S_{B-1}$ sampled by the second tap of the pixel 2000 can be sampled onto the sampling capacitor 2082 of the capacitor bank 2040 via the second switch 2090b and the switch 2092. Then, $V_2$ for $S_{A-0}$ sampled by the first tap of the pixel 2000 can be sampled onto the sampling capacitor 2083 of the capacitor bank 2040 via the first switch 2090a and the switch 2093. Furthermore, $V_2$ for $S_{B-1}$ sampled by the second tap of the pixel 2000 can be sampled onto the sampling capacitor 2084 of the capacitor bank 2040 via the second switch 2090b and the switch 2094. Additionally, $V_3$ for $S_{A-0}$ sampled by the first tap of the pixel 2000 can be sampled onto the sampling capacitor 2085 of the capacitor bank 2040 via the first switch 2090a and the switch 2095. Next, $V_3$ for $S_{B-1}$ sampled by the second tap of the pixel 2000 can be sampled onto the sampling capacitor 2086 of the capacitor bank 2040 via the second switch 2090b and the switch 2096.

Thereafter, $V_1$ for $S_{A-0}$ stored on the sampling capacitor 2081 and $V_3$ for $S_{A-0}$ stored on the sampling capacitor 2085 can be summed (e.g., by shorting the sampling capacitor 2081 and the sampling capacitor 2085 together via the switch 2091 and the switch 2095). The sum (representing ($V_1$ for $S_{A-0}$)+($V_3$ for $S_{A-0}$)) can be stored on the sampling capacitor 2081 of the capacitor bank 2040. In addition, $V_1$ for $S_{B-1}$ stored on the sampling capacitor 2082 and $V_3$ for $S_{B-1}$ stored on the sampling capacitor 2086 can be summed (e.g., by shorting the sampling capacitor 2082 and the sampling capacitor 2086 together via the switch 2092 and the switch 2096). The sum (representing ($V_1$ for $S_{B-1}$)+($V_3$ for $S_{B-1}$)) can be stored on the sampling capacitor 2082 of the capacitor bank 2040. In some embodiments, the voltages on the sampling capacitors 2085 and 2086 can then be reset by asserting the signal PRE to activate the transistor 2060 while activating the switches 2095 and 2096.

$V_4$ for $S_{A-0}$ sampled by the first tap of the pixel 2000 can then be sampled onto the sampling capacitor 2085 of the capacitor bank 2040 via the first switch 2090a and the switch 2095. In addition, $V_4$ for $S_{B-1}$ sampled by the second tap of the pixel 2000 can be sampled onto the sampling capacitor 2086 of the capacitor bank 2040 via the second switch 2090b and the switch 2096.

Thereafter, $V_2$ for $S_{A-0}$ stored on the sampling capacitor 2083 and $V_4$ for $S_{A-0}$ stored on the sampling capacitor 2085 can be summed (e.g., by shorting the sampling capacitor 2083 and the sampling capacitor 2085 together via the switch 2093 and the switch 2095). The sum (representing ($V_2$ for $S_{A-0}$)+($V_4$ for $S_{A-0}$)) can be stored on the sampling capacitor 2083 of the capacitor bank 2040. In addition, $V_2$ for $S_{B-1}$ stored on the sampling capacitor 2084 and $V_4$ for $S_{B-1}$ stored on the sampling capacitor 2086 can be summed (e.g., by shorting the sampling capacitor 2084 and the sampling capacitor 2086 together via the switch 2094 and the switch 2096). The sum (representing ($V_2$ for $S_{B-1}$)+($V_4$ for $S_{B-1}$)) can be stored on the sampling capacitor 2084 of the capacitor bank 2040. In some embodiments, the voltages on the sampling capacitors 2085 and 2086 can then be reset by asserting the signal PRE to activate the transistor 2060 while activating the switches 2095 and 2096.

Then, $V_1$ for $S_{A-1}$ sampled by the first tap of the pixel 2000 can be sampled onto the sampling capacitor 2085 of the capacitor bank 2040 via the first switch 2090a and the switch 2095. In addition, $V_1$ for $S_{B-0}$ sampled by the second tap of the pixel 2000 can be sampled onto the sampling capacitor 2086 of the capacitor bank 2040 via the second switch 2090b and the switch 2096. Next, $V_2$ for $S_{A-1}$ sampled by the first tap of the pixel 2000 can be sampled onto the sampling capacitor 2087 of the capacitor bank 2040 via the first switch 2090a and the switch 2097. Furthermore, $V_2$ for $S_{B-0}$ sampled by the second tap of the pixel 2000 can be sampled onto the sampling capacitor 2088 of the capacitor bank 2040 via the second switch 2090b and the switch 2098. Additionally, $V_3$ for $S_{A-1}$ sampled by the first tap of the pixel 2000 can be sampled onto the sampling capacitor 2089 of the capacitor bank 2040 via the first switch 2090a and the switch 2099. In addition, $V_3$ for $S_{B-0}$ sampled by the second tap of the pixel 2000 can be sampled onto the sampling capacitor 2080 of the capacitor bank 2040 via the second switch 2090b and the switch 2090.

Then, $V_1$ for $S_{A-1}$ stored on the sampling capacitor 2085 and $V_3$ for $S_{A-1}$ stored on the sampling capacitor 2089 can be summed (e.g., by shorting the sampling capacitor 2085 and the sampling capacitor 2089 together via the switch 2095 and the switch 2099). The sum (representing ($V_1$ for $S_{A-1}$)+($V_3$ for $S_{A-1}$)) can be stored on the sampling capacitor 2085 of the capacitor bank 2040. In addition, $V_1$ for $S_{B-0}$ stored on the sampling capacitor 2086 and $V_3$ for $S_{B-0}$ stored on the sampling capacitor 2080 can be summed (e.g., by shorting the sampling capacitor 2086 and the sampling capacitor 2080 together via the switch 2096 and the switch 2090). The sum (representing ($V_1$ for $S_{B-0}$)+($V_3$ for $S_{B-0}$)) can be stored on the sampling capacitor 2086 of the capacitor bank 2040. In some embodiments, the voltages on the sampling capacitors 2089 and 2080 can then be reset by asserting the signal PRE to activate the transistor 2060 while activating the switches 2099 and 2090.

Next, the sum (representing ($V_1$ for $S_{A-0}$)+($V_3$ for $S_{A-0}$)) stored on the sampling capacitor 2081 and the sum (representing ($V_1$ for $S_{B-0}$)+($V_3$ for $S_{B-0}$)) stored on the sampling capacitor 2086 can be summed (e.g., by shorting the sampling capacitor 2081 and the sampling capacitor 2086 together via the switch 2091 and the switch 2096). The resulting sum (representing ($V_1$ for $S_{A-0}$)+($V_3$ for $S_{A-0}$)+($V_1$ for $S_{B-0}$)+($V_3$ for $S_{B-0}$)) can be stored on the sampling capacitor 2081 of the capacitor bank 2040. In addition, the sum (representing ($V_1$ for $S_{A-1}$)+($V_3$ for $S_{A-1}$)) sampled onto the sampling capacitor 2085 and the sum (representing ($V_1$ for $S_{B-1}$)+($V_3$ for $S_{B-1}$)) sampled onto the sampling capacitor 2082 can be summed (e.g., by shorting the sampling capacitor 2085 and the sampling capacitor 2082 together via the switch 2095 and the switch 2092). The resulting sum (representing ($V_1$ for $S_{A-1}$)+($V_3$ for $S_{A-1}$)+($V_1$ for $S_{B-1}$)+($V_3$ for $S_{B-1}$)) can be stored on the sampling capacitor 2082 of the capacitor bank 2040. In some embodiments, the voltages on the sampling capacitors 2085 and 2086 can then be reset by asserting the signal PRE to activate the transistor 2060 while activating the switches 2095 and 2096.

$V_4$ for $S_{A-1}$ sampled by the first tap of the pixel 2000 can then be sampled onto the sampling capacitor 2089 of the capacitor bank 2040 via the first switch 2090a and the switch 2099. In addition, $V_4$ for $S_{B-0}$ sampled by the second tap of the pixel 2000 can be sampled onto the sampling capacitor 2080 of the capacitor bank 2040 via the second switch 2090b and the switch 2090.

Then, $V_2$ for $S_{A-1}$ stored on the sampling capacitor 2087 and $V_4$ for $S_{A-1}$ stored on the sampling capacitor 2089 can be summed (e.g., by shorting the sampling capacitor 2087 and the sampling capacitor 2089 together via the switch 2097 and the switch 2099). The sum (representing ($V_2$ for $S_{A-1}$)+($V_4$ for $S_{A-1}$)) can be stored on the sampling capacitor 2087 of the capacitor bank 2040. In addition, $V_2$ for $S_{B-0}$ stored on the sampling capacitor 2088 and $V_4$ for $S_{B-0}$ stored on the sampling capacitor 2080 can be summed (e.g., by shorting the sampling capacitor 2088 and the sampling capacitor 2080 together via the switch 2098 and the switch 2090). The sum (representing ($V_2$ for $S_{B-0}$)+($V_4$ for $S_{B-0}$)) can be stored on the sampling capacitor 2088 of the capacitor bank 2040. In some embodiments, the voltages on the sampling capacitors 2089 and 2080 can then be reset by asserting the signal PRE to activate the transistor 2060 while activating the switches 2099 and 2090.

Thereafter, the sum (representing ($V_2$ for $S_{A-0}$)+($V_4$ for $S_{A-0}$)) stored on the sampling capacitor 2083 and the sum (representing ($V_2$ for $S_{B-0}$)+($V_4$ for $S_{B-0}$)) stored on the sampling capacitor 2088 can be summed (e.g., by shorting the sampling capacitor 2083 and the sampling capacitor 2088 together via the switch 2093 and the switch 2098). The resulting sum (representing ($V_2$ for $S_{A-0}$)+($V_4$ for $S_{A-0}$)+($V_2$ for $S_{B-0}$)+($V_4$ for $S_{B-0}$)) can be stored on the sampling capacitor 2083 of the capacitor bank 2040. In addition, the sum (representing ($V_2$ for $S_{A-1}$)+($V_4$ for $S_{A-1}$)) sampled onto the sampling capacitor 2087 and the sum (representing ($V_2$ for $S_{B-1}$)+($V_4$ for $S_{B-1}$)) sampled onto the sampling capacitor 2084 can be summed (e.g., by shorting the sampling capacitor 2087 and the sampling capacitor 2084 together via the switch 2097 and the switch 2094). The resulting sum (representing ($V_2$ for $S_{A-1}$)+($V_4$ for $S_{A-1}$)+($V_2$ for $S_{B-1}$)+($V_4$ for $S_{B-1}$)) can be stored on the sampling capacitor 2084 of the capacitor bank 2040. In some embodiments, the voltages on the sampling capacitors 2087 and 2088 can then be reset by asserting the signal PRE to activate the transistor 2060 while activating the switches 2097 and 2098.

The sum (representing ($V_2$ for $S_{A-0}$)+($V_4$ for $S_{A-0}$)+($V_2$ for $S_{B-0}$)+($V_4$ for $S_{B-0}$)) stored on the sampling capacitor 2083 of the capacitor bank 2040 can then be added to the sum (representing ($V_2$ for $S_{A-1}$)+($V_4$ for $S_{A-1}$)+($V_2$ for $S_{B-1}$)+($V_4$ for $S_{B-1}$)) stored on the sampling capacitor 2084 of the capacitor bank 2040 (e.g., by shorting the sampling capacitor 2083 and the sampling capacitor 2084 together via the switch 2093 and the switch 2094) to generate a first sum. The first sum can be read out of the capacitor bank 2040 and sampled onto the difference amplifier 2030. Then, the sum (representing ($V_1$ for $S_{A-0}$)+($V_3$ for $S_{A-0}$)+($V_1$ for $S_{B-0}$)+($V_3$ for $S_{B-0}$)) stored on the sampling capacitor 2081 of the capacitor bank 2040 can be added to the sum (representing ($V_1$ for $S_{A-1}$)+($V_3$ for $S_{A-1}$)+($V_1$ for $S_{B-1}$)+($V_3$ for $S_{B-1}$)) stored on the sampling capacitor 2082 of the capacitor bank 2040 (e.g., by shorting the sampling capacitor 2081 and the sampling capacitor 2082 together via the switch 2091 and the switch 2092) to generate a second sum. The second sum can be read out of the capacitor bank 2040 and input into the difference amplifier 2030. In turn, the difference amplifier 2030 can compute the difference between the first and second sums, and output the difference to a gate of the source follower transistor 2097. A signal corresponding to the difference can then be read out of the pixel 2000 to the column readout circuitry 2020 via the row select transistor 2010.

Although the steps of the method illustrated by the table 2140 are discussed and illustrated in a particular order, the method is not so limited. In other embodiments, the method illustrated by the table 2140 can be performed in a different order. In these and other embodiments, any of the steps of the method can be performed before, during, and/or after any of the other steps of the method. Furthermore, the method illustrated by the table 2140 can be altered and still remain within these and other embodiments of the present technology. For example, one or more steps of the method illustrated by the table 2140 can be omitted and/or repeated in some embodiments. As another example, the order in which the capacitors 2080-2089 of the capacitor bank 2040 are used and/or the various signals/sums stored to specific ones of the capacitors 2080-2089 can vary from the example shown in FIG. 21 and remain within the scope of the present technology. Additionally, or alternatively, the various computations described with reference to FIG. 21 can be altered and/or performed in a different order than illustrated in FIG. 21.

Figure 22:
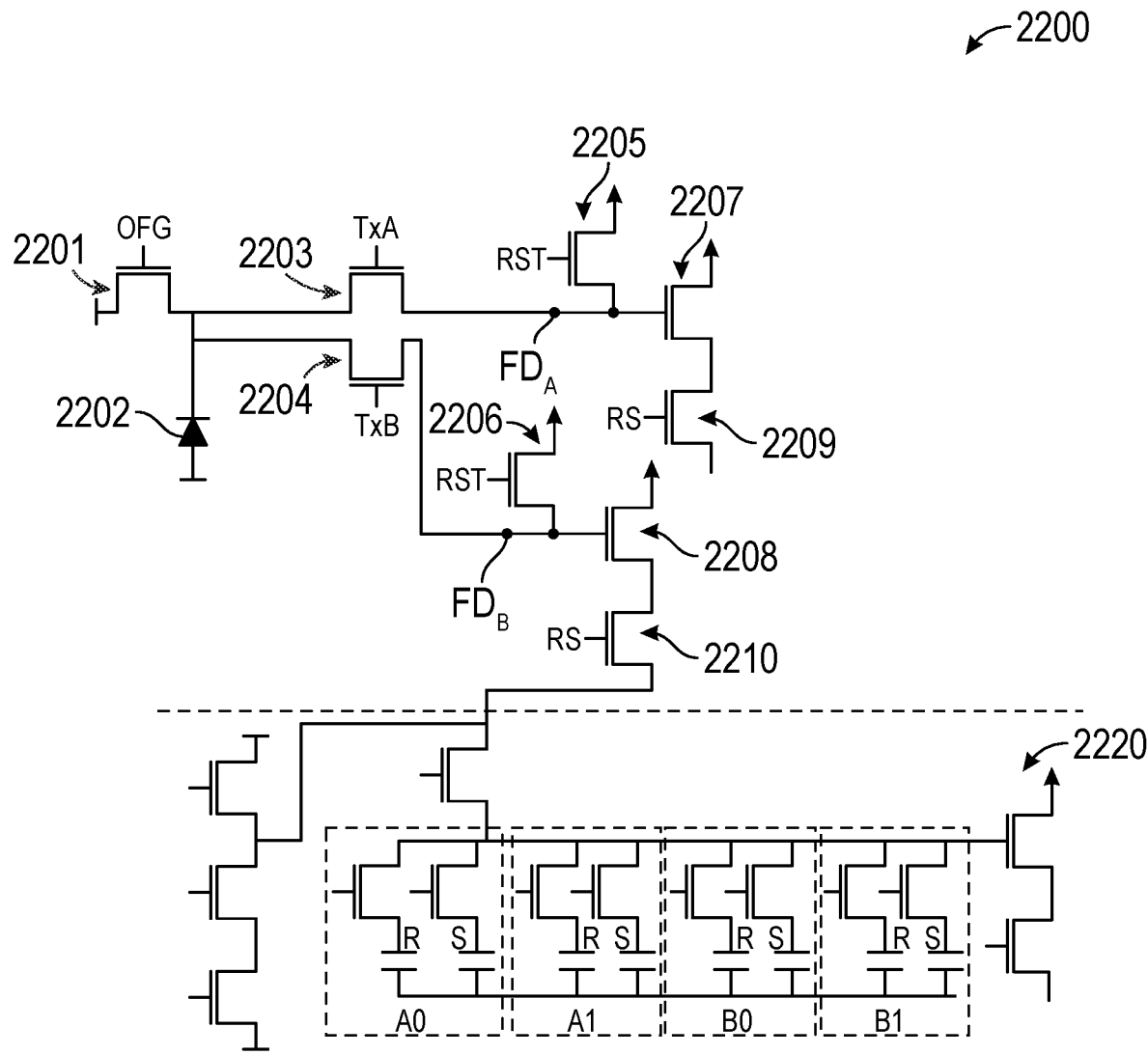
FIG. 22 is a partially schematic circuit diagram of another pixel configured in accordance with various embodiments of the present technology.

FIG. 22 is a partially schematic circuit diagram of another pixel 2200 and of corresponding sample and hold circuitry 2220, each configured in accordance with various embodiments of the present technology. The pixel 2200 is generally similar to the pixel 100 of FIG. 1. Thus, a detailed discussion of generally similar components between the pixel 100 and the pixel 2200 is omitted here for the sake of brevity in light of the detailed discussion provided above. As shown, the sample and hold circuitry 2220 includes a plurality of transistors and a plurality of sampling capacitors. Only the connections between the row select transistor 2210 and the sample and hold circuitry 2220 are shown in FIG. 22 for the sake of simplicity and clarity. Similar connections can be used between the row select transistor 2209 and the sample and hold circuitry 2220.

Figure 23:
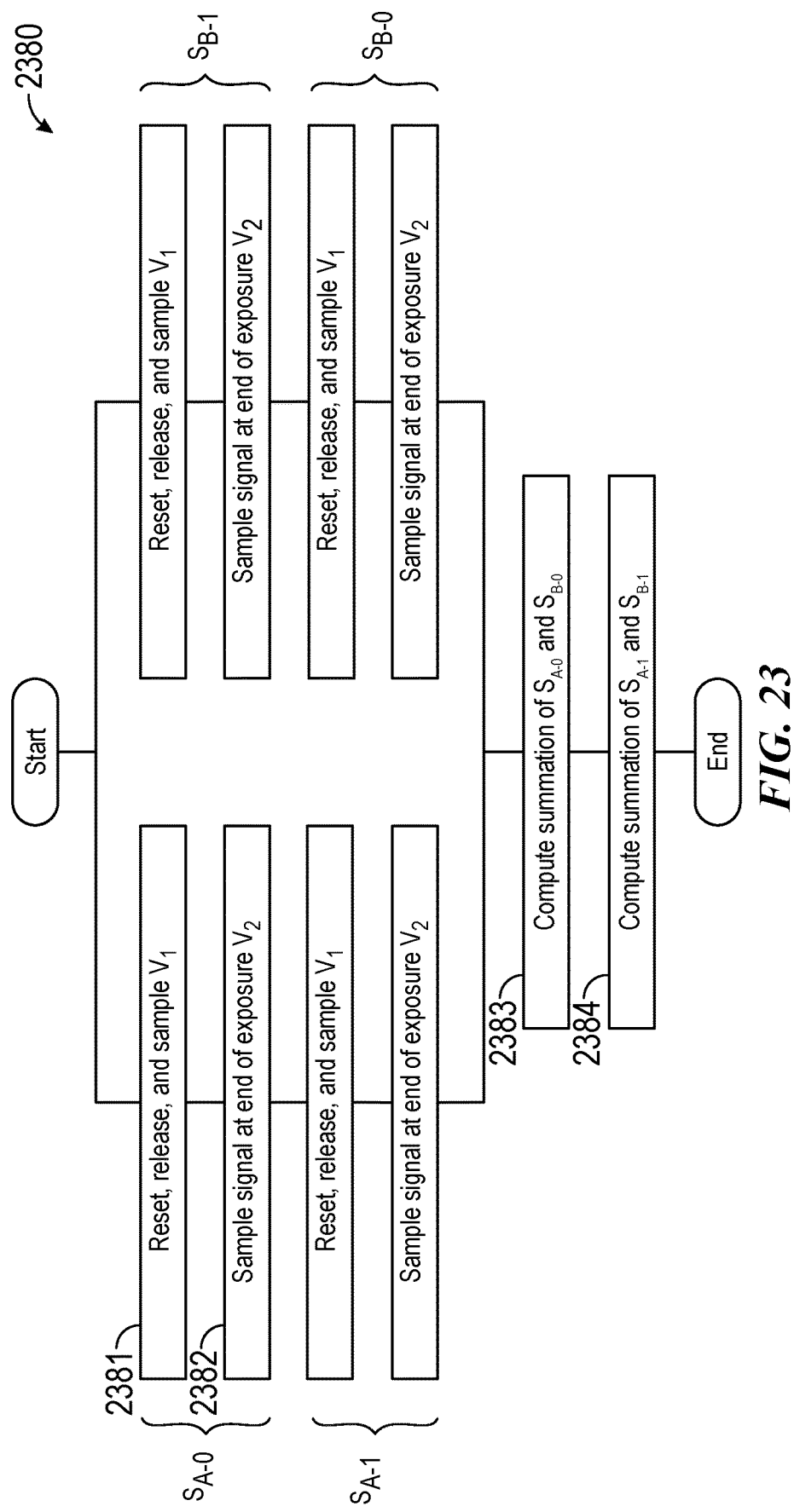
FIG. 23 is a flow diagram illustrating a method of operating the pixel of FIG. 22, in accordance with various embodiments of the present technology.

FIG. 23 is a flow diagram illustrating a method 2380 of operating the pixel 2200 and the sample and hold circuitry 2220 of FIG. 22, in accordance with various embodiments of the present technology. The method 2350 is illustrated as a series of steps or blocks. Blocks aligned on the left of the page correspond to the first tap of the pixel 2200, and blocks aligned on the right of the page correspond to the second tap of the pixel 2200. All or a subset of any one or more of the blocks can be executed in accordance with the discussion above.

Referring to FIGS. 22 and 23 together, the method 2380 begins at block 2381 by (i) deasserting a reset signal RST applied to the reset transistor 2205 and (ii) sampling a reset signal portion of the signal $S_{A-0}$ (shown as "$V_1$" in FIG. 23) onto a first sampling capacitor (e.g., the sampling capacitor labeled R in the pair of sampling capacitors labeled A0 in the sample and hold circuitry 2220 of FIG. 22). At block 2382, the method 2380 continues by sampling a signal portion of the signal $S_{A-0}$ (shown as "$V_2$" in FIG. 23) onto a second sampling capacitor (e.g., the sampling capacitor labeled S in the pair of sampling capacitors labeled A0 in the sample and hold circuitry 2220 of FIG. 22). As shown in FIG. 23, the method 2380 can additionally include performing steps generally similar to blocks 2381 and 2382 for each of the signals $S_{B-1}$, $S_{A-0}$, and $S_{B-0}$. More specifically, during a first sub-frame and/or at the same or sequential timings, blocks 2381 and 2382 can be performed for the signal $S_{A-0}$ on the first tap of the pixel 2200, and steps generally similar to blocks 2381 and 2382 can be performed for the signal $S_{B-1}$ on the second tap of the pixel 2200. Thereafter, during a second sub-frame and/or at the same or sequential timings, steps generally similar to blocks 2381 and 2382 can be performed for the signal $S_{A-1}$ on the first tap of the pixel 2200, and steps generally similar to blocks 2381 and 2382 can be performed for the signal $S_{B-0}$ on the second tap of the pixel 2200.

At block 2383, the method 2380 continues by computing the summation of the signal $S_{A-0}$ and the signal $S_{B-0}$. For example, the reset signal portions for $S_{A-0}$ and $S_{B-0}$ stored on the sampling capacitors labeled R in the pairs of sampling capacitors labeled A0 and B0, respectively, in the sample and hold circuitry 2220 of FIG. 22 can be shorted together (e.g., by activating the corresponding transistors of the sample and hold circuitry 2220 at the same time), and the resulting summation of the reset signal portions for $S_{A-0}$ and $S_{B-0}$ can be read out from the sample and hold circuitry 2220 to column readout circuitry. Continuing with this example, the signal portions for $S_{A-0}$ and $S_{B-0}$ stored on the sampling capacitor labeled S in the pairs of sampling capacitors labeled A0 and B0, respectively, in the sample and hold circuitry 2220 can be shorted together (e.g., by activating the corresponding transistors of the sample and hold circuitry 2220 at the same time), and the resulting summation of the signal portions for $S_{A-0}$ and $S_{B-0}$ can be read out from the sample and hold circuitry 2220 to column readout circuitry. Thereafter, the column circuitry can compute the summation of the signal $S_{A-0}$ and $S_{B-0}$ by subtracting the summation of the reset signal portions for $S_{A-0}$ and $S_{B-0}$ from the summation of the signal portions for $S_{A-0}$ and $S_{B-0}$.

At block 2384, the method 2380 continues by computing the summation of the signal $S_{A-1}$ and the signal $S_{B-1}$. For example, the reset signal portions for $S_{A-1}$ and $S_{B-1}$ stored on the sampling capacitors labeled R in the pairs of sampling capacitors labeled A1 and B1, respectively, in the sample and hold circuitry 2220 of FIG. 22 can be shorted together (e.g., by activating the corresponding transistors of the sample and hold circuitry 2220 at the same time), and the resulting summation of the reset signal portions for $S_{A-1}$ and $S_{B-1}$ can be read out from the sample and hold circuitry 2220 to column readout circuitry. Continuing with this example, the signal portions for $S_{A-1}$ and $S_{B-1}$ stored on the sampling capacitor labeled S in the pairs of sampling capacitors labeled A1 and B1, respectively, in the sample and hold circuitry 2220 can be shorted together (e.g., by activating the corresponding transistors of the sample and hold circuitry 2220 at the same time), and the resulting summation of the signal portions for $S_{A-1}$ and $S_{B-1}$ can be read out from the sample and hold circuitry 2220 to column readout circuitry. Thereafter, the column circuitry can compute the summation of the signal $S_{A-1}$ and $S_{B-1}$ by subtracting the summation of the reset signal portions for $S_{A-1}$ and $S_{B-1}$ from the summation of the signal portions for $S_{A-1}$ and $S_{B-1}$.

In some embodiments, the column circuitry can additionally determine a signal light component captured by the pixel 2200 during a frame less FPN (dark current FPN, ambient PLS, and pulsed-signal PLS) and multiplied by a summation of known camera gain factors/constants of the pixel 2200. For example, the column circuitry can determine the signal light component by subtracting (i) the summation of the signal $S_{A-1}$ and the signal $S_{B-1}$ from (ii) the summation of the signal $S_{A-0}$ and $S_{B-0}$. Continuing with this example, the signal light component can be represented by (signal $S_{A-0}$+signal $S_{B-0}$)−(signal $S_{A-1}$+signal $S_{B-1}$). The above process can be repeated for subsequent frames.

Although the steps of the method 2380 are discussed and illustrated in a particular order, the method 2380 is not so limited. In other embodiments, the method 2380 can be performed in a different order. In these and other embodiments, any of the steps of the method 2380 can be performed before, during, and/or after any of the other steps of the method 2380. Furthermore, the method 2380 can be altered and still remain within these and other embodiments of the present technology. For example, one or more steps of the method 2380 can be omitted and/or repeated in some embodiments.

C. Conclusion

The above detailed descriptions of embodiments of the technology are not intended to be exhaustive or to limit the technology to the precise form disclosed above. Although specific embodiments of, and examples for, the technology are described above for illustrative purposes, various equivalent modifications are possible within the scope of the technology as those skilled in the relevant art will recognize. For example, although steps are presented in a given order above, alternative embodiments may perform steps in a different order. Furthermore, the various embodiments described herein may also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. To the extent any material incorporated herein by reference conflicts with the present disclosure, the present disclosure controls. Where context permits, singular or plural terms may also include the plural or singular term, respectively. In addition, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Furthermore, as used herein, the phrase "and/or" as in "A and/or B" refers to A alone, B alone, and both A and B. Additionally, the terms "comprising," "including," "having," and "with" are used throughout to mean including at least the recited feature(s) such that any greater number of the same features and/or additional types of other features are not precluded. Moreover, as used herein, the phrases "based on," "depends on," "as a result of," and "in response to" shall not be construed as a reference to a closed set of conditions. For example, an exemplary step that is described as "based on condition A" may be based on both condition A and condition B without departing from the scope of the present disclosure. In other words, as used herein, the phrase "based on" shall be construed in the same manner as the phrase "based at least in part on" or the phrase "based at least partially on." Also, the terms "connect" and "couple" are used interchangeably herein and refer to both direct and indirect connections or couplings. For example, where the context permits, element A "connected" or "coupled" to element B can refer (i) to A directly "connected" or directly "coupled" to B and/or (ii) to A indirectly "connected" or indirectly "coupled" to B.

From the foregoing, it will also be appreciated that various modifications may be made without deviating from the disclosure or the technology. For example, one of ordinary skill in the art will understand that various components of the technology can be further divided into subcomponents, or that various components and functions of the technology may be combined and integrated. In addition, certain aspects of the technology described in the context of particular embodiments may also be combined or eliminated in other embodiments. Furthermore, although advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

What is claimed is:

1. A method of operating a pixel to reduce fixed pattern noise, the method comprising:
during a first sub-exposure period of a frame,
capturing, using a first tap of the pixel, a first signal corresponding to first charge at a first floating diffusion of the first tap, wherein the first charge is generated by a photosensor of the pixel in response to one or more first light pulses incident on the photosensor, and wherein capturing the first signal includes sampling a plurality of first voltage signals using circuitry of the first tap, and
capturing, using a second tap of the pixel, a first noise signal corresponding to fixed pattern noise (FPN) at a second floating diffusion of the second tap, wherein capturing the first noise signal includes sampling a plurality of second voltage signals using circuitry of the second tap; and during a second sub-exposure period of the frame,
capturing, using the second tap, a second signal corresponding to second charge at the second floating diffusion, wherein the second charge is generated by the photosensor in response to one or more second light pulses incident on the photosensor, and wherein capturing the second signal includes sampling a plurality of third voltage signals using circuitry of the second tap, and
capturing, using the first tap, a second noise signal corresponding to fixed pattern noise (FPN) at the first floating diffusion, wherein capturing the second noise signal includes sampling a plurality of fourth voltage signals using circuitry of the second tap.

2. The method of claim 1, wherein sampling the plurality of first voltage signals includes:
sampling a reference voltage for the first signal onto a first sampling capacitor of the first tap; and
sampling a signal voltage for the first signal onto a second sampling capacitor of the first tap.

3. The method of claim 2, wherein capturing the first signal further includes: reading the reference voltage for the first signal out of the pixel, and reading the signal voltage for the first signal out of the pixel; and the pixel.

4. The method of claim 2, wherein sampling the plurality of second voltage signals includes:
sampling a reference voltage for the first noise signal onto a first sampling capacitor of the second tap; and
sampling a signal voltage for the first noise signal onto a second sampling capacitor of the second tap.

5. The method of claim 1, wherein:
sampling the plurality of first voltage signals includes:
sampling a reference voltage for the first signal, and
sampling a signal voltage for the first signal; and
capturing the first signal further includes computing, using a difference amplifier of the first tap, a difference between the reference voltage for the first signal and the signal voltage for the first signal.

6. The method of claim 5, wherein capturing the first signal further includes reading the difference out of the pixel.

7. The method of claim 5, wherein:
sampling the plurality of second voltage signals includes:
sampling a reference voltage for the first noise signal, and
sampling a signal voltage for the first noise signal; and
capturing the first noise signal further includes computing, using a difference amplifier of the second tap, a difference between the reference voltage for the first noise signal and the signal voltage for the first noise signal.

8. The method of claim 1, wherein:
sampling the plurality of first voltage signals includes:
sampling a first reset noise voltage for the first signal,
sampling a reference voltage for the first signal,
sampling a signal voltage for the first signal, and
sampling a second reset noise voltage for the first signal; and
capturing the first signal further includes:
computing, using a different amplifier of the first tap, a first difference between the first reset noise voltage for the first signal and the reference voltage for the first signal, and
computing, using the difference amplifier of the first tap, a second difference between the signal voltage for the first signal and the second reset noise voltage for the first signal.

9. The method of claim 8, wherein capturing the first signal further includes reading the first and second differences out of the pixel.

10. The method of claim 8, wherein capturing the first signal further includes:
storing the first difference on a first capacitor of a capacitor bank of the first tap; and
storing the second difference on a second capacitor of the capacitor bank of the first tap.

11. The method of claim 10, wherein capturing the first signal further includes:
computing the first signal, wherein computing the first signal includes shorting the first capacitor of the capacitor bank storing the first difference with the second capacitor of the capacitor bank storing the second difference; and
reading the first signal out from the pixel.

12. The method of claim 10, wherein:
sampling the plurality of fourth voltage signals includes:
sampling a first reset noise voltage for the second noise signal,
sampling a reference voltage for the second noise signal,
sampling a signal voltage for the second noise signal, and
sampling a second reset noise voltage for the second noise signal; and
capturing the second noise signal further includes:
computing, using the difference amplifier of the first tap, a third difference between the first reset noise voltage for the second noise signal and the reference voltage for the second noise signal,
storing the third difference on a third capacitor of the capacitor bank of the first tap,
computing, using the difference amplifier of the first tap, a fourth difference between the signal voltage for the second noise signal and the second reset noise voltage for the second noise signal, and
storing the fourth difference on a fourth capacitor of the capacitor bank of the first tap.

13. The method of claim 12, wherein:
capturing the first signal further includes computing the first signal;
computing the first signal includes shorting the first capacitor of the capacitor bank storing the first difference with the second capacitor of the capacitor bank storing the second difference;
capturing the second noise signal further includes computing the second noise signal;
computing the second noise signal includes shorting the third capacitor of the capacitor bank storing the third difference with the fourth capacitor of the capacitor bank storing the fourth difference; and
the method further comprises computing, using a second difference amplifier, a fifth difference between the first signal and the second noise signal.

14. The method of claim 13, further comprising reading the fifth difference out of the pixel.

15. The method of claim 8, wherein:
sampling the plurality of second voltage signals includes:
sampling a first reset noise voltage for the first noise signal,
sampling a reference voltage for the first noise signal,
sampling a signal voltage for the first noise signal, and
sampling a second reset noise voltage for the first noise signal; and capturing the first noise signal further includes:
    computing, using a difference amplifier of the second tap, a third difference between the first reset noise voltage for the first noise signal and the reference voltage for the first noise signal, and
    computing, using the difference amplifier of the second tap, a fourth difference between the signal voltage for the first noise signal and the second reset noise voltage for the first noise signal.

16. The method of claim 15, wherein capturing the first noise signal further includes:
    storing the third difference on a first capacitor of a capacitor bank of the second tap, and
    storing the fourth difference on a second capacitor of a capacitor bank of the second tap.

17. The method of claim 16, wherein capturing the first noise signal further includes:
    computing the first noise signal, wherein computing the first noise signal includes shorting the first capacitor of the capacitor bank storing the third difference with the second capacitor of the capacitor bank storing the fourth difference; and
    reading the first noise signal out from the pixel.

18. The method of claim 16, wherein:
    sampling the plurality of third voltage signals includes:
        sampling a first reset noise voltage for the second signal,
        sampling a reference voltage for the second signal,
        sampling a signal voltage for the second signal, and
        sampling a second reset noise voltage for the second signal; and
    capturing the second signal further includes:
        computing, using the difference amplifier of the second tap, a fifth difference between the first reset noise voltage for the second signal and the reference voltage for the second signal,
        storing the fifth difference on a third capacitor of the capacitor bank of the second tap,
        computing, using the difference amplifier of the second tap, a sixth difference between the signal voltage for the second signal and the second reset noise voltage for the second signal, and
        storing the sixth difference on a fourth capacitor of the capacitor bank of the second tap.

19. The method of claim 18, wherein:
    capturing the first noise signal further includes computing the first noise signal;
    computing the first noise signal includes shorting the first capacitor of the capacitor bank storing the third difference with the second capacitor of the capacitor bank storing the fourth difference;
    capturing the second signal further includes computing the second noise signal;
    computing the second signal includes shorting the third capacitor of the capacitor bank storing the fifth difference with the fourth capacitor of the capacitor bank storing the sixth difference; and
    the method further comprises computing, using a second difference amplifier, a seventh difference between the first noise signal and the second signal.

20. The method of claim 19, further comprising reading the seventh difference out of the pixel.

21. The method of claim 19, wherein:
    capturing the first signal further includes:
        storing the first difference on a first capacitor of a capacitor bank of the first tap,
        storing the second difference on a second capacitor of the capacitor bank of the first tap, and
        computing the first signal;
    computing the first signal includes shorting the first capacitor of the capacitor bank storing the first difference with the second capacitor of the capacitor bank storing the second difference;
    sampling the plurality of fourth voltage signals includes:
        sampling a first reset noise voltage for the second noise signal,
        sampling a reference voltage for the second noise signal,
        sampling a signal voltage for the second noise signal, and
        sampling a second reset noise voltage for the second noise signal;
    capturing the second noise signal further includes:
        computing, using the difference amplifier of the first tap, an eighth difference between the first reset noise voltage for the second noise signal and the reference voltage for the second noise signal,
        storing the eighth difference on a third capacitor of the capacitor bank of the first tap,
        computing, using the difference amplifier of the first tap, a ninth difference between the signal voltage for the second noise signal and the second reset noise voltage for the second noise signal,
        storing the ninth difference on a fourth capacitor of the capacitor bank of the first tap, and
        computing the second noise signal;
    computing the second noise signal includes shorting the third capacitor of the capacitor bank storing the eighth difference with the fourth capacitor of the capacitor bank storing the ninth difference; and
    the method further comprises computing, using a third difference amplifier, a tenth difference between the first signal and the second noise signal.

22. The method of claim 21, further comprising:
    computing a sum of the seventh difference and the tenth difference, wherein computing the sum of the seventh difference and the tenth difference includes shorting an output of a source follower transistor of the first tap with an output of a source follower transistor of the second tap; and
    reading the sum of the seventh difference and the tenth difference out of the pixel.

23. The method of claim 21, further comprising:
    computing a sum of the seventh difference and the tenth difference, wherein computing the sum of the seventh difference and the tenth difference includes shorting an output of the second difference amplifier with an output of the third difference amplifier; and
    reading the sum of the seventh difference and the tenth difference out of the pixel.

24. The method of claim 1, further comprising computing a sum of the first signal and the second signal, wherein computing the sum of the first signal and the second signal includes shorting together (i) a first capacitor of a capacitor bank of the first tap, (ii) a second capacitor of the capacitor bank of the first tap, (iii) a first capacitor of a capacitor bank of the second tap, and (iv) a second capacitor of the capacitor bank of the second tap.

25. The method of claim 24, further comprising computing a sum of the first noise signal and the second noise signal, wherein computing the sum of the first noise signal and the second noise signal includes shorting together (i) a third capacitor of the capacitor bank of the first tap, (ii) a fourth capacitor of the capacitor bank of the first tap, (iii) a third capacitor of the capacitor bank of the second tap, and (iv) a fourth capacitor of the capacitor bank of the second tap.

26. The method of claim 25, further comprising:
computing, using a difference amplifier of the pixel, a difference between (a) the sum of the first signal and the second signal and (b) the sum of the first noise signal and the second noise signal; and
reading the difference out of the pixel.

27. The method of claim 1, wherein:
capturing the first signal further includes:
storing, on a first capacitor of a capacitor bank of the first tap, a first difference between (i) a first reset noise voltage for the first signal and (ii) a reference voltage for the first signal, and
storing, on a second capacitor of the capacitor bank of the first tap, a second difference between (i) a signal voltage for the first signal and (ii) a second reset noise voltage for the first signal; and
capturing the second noise signal further includes:
storing, on the first capacitor of the capacitor bank of the first tap, a third difference between (i) a first reset noise voltage for the second noise signal and (ii) a reference voltage for the second noise signal.

28. The method of claim 27, further comprising:
reading the first difference out of the pixel during the first sub-exposure period; and
reading the second difference and the third difference out of the pixel during the second sub-exposure period.

29. The method of claim 27, wherein:
capturing the first noise signal further includes:
storing, on a first capacitor of a capacitor bank of the second tap, a fourth difference between (i) a first reset noise voltage for the first noise signal and (ii) a reference voltage for the first noise signal, and
storing, on a second capacitor of the capacitor bank of the second tap, a second difference between (i) a signal voltage for the first noise signal and (ii) a second reset noise voltage for the first noise signal; and
capturing the second signal further includes:
storing, on the first capacitor of the capacitor bank of the second tap, a third difference between (i) a first reset noise voltage for the second signal and (ii) a reference voltage for the second signal.

30. The method of claim 1, wherein:
capturing the first signal includes:
sampling, on a first capacitor of the pixel, a first difference between (i) a first reset noise voltage for the first signal and (ii) a reference voltage for the first signal,
sampling, on a second capacitor of the pixel, a second difference between (i) a signal voltage for the first signal and (ii) a second reset noise voltage for the first signal,
computing the first signal, wherein computing the first signal includes shorting the first capacitor storing the first difference with the second capacitor storing the second difference; and
storing the first signal on a third capacitor of the pixel; and
capturing the first noise signal includes:
sampling, on a fourth capacitor of the pixel, a third difference between (i) a first reset noise voltage for the first noise signal and (ii) a reference voltage for the first noise signal,
sampling, on a fifth capacitor of the pixel, a fourth difference between (i) a signal voltage for the first noise signal and (ii) a second reset noise voltage for the first noise signal,
computing the first noise signal, wherein computing the first noise signal includes shorting the fourth capacitor storing the third difference with the fifth capacitor storing the fourth difference, and
storing the first noise signal on a sixth capacitor of the pixel.

31. The method of claim 30, wherein:
capturing the second noise signal includes:
sampling, on a seventh capacitor of the pixel, a fifth difference between (i) a first reset noise voltage for the second noise signal and (ii) a reference voltage for the second noise signal,
sampling, on an eighth capacitor of the pixel, a sixth difference between (i) a signal voltage for the second noise signal and (ii) a second reset noise voltage for the second noise signal,
computing the second noise signal, wherein computing the second noise signal includes shorting the seventh capacitor storing the fifth difference with the eighth capacitor storing the sixth difference, and
storing the second noise signal on a ninth capacitor of the pixel; and
capturing the second signal includes:
sampling, on a tenth capacitor of the pixel, a seventh difference between (i) a first reset noise voltage for the second signal and (ii) a reference voltage for the second signal,
sampling, on an eleventh capacitor of the pixel, an eighth difference between (i) a signal voltage for the second signal and (ii) a second reset noise voltage for the second signal,
computing the second signal, wherein computing the second signal includes shorting the tenth capacitor storing the seventh difference with the eleventh capacitor storing the eighth difference, and
storing the second signal on a twelfth capacitor of the pixel.

32. The method of claim 31, further comprising:
computing a sum of the first signal and the second signal, wherein computing the sum of the first signal and the second signal includes shorting the third capacitor storing the first signal with the twelfth capacitor storing the second signal;
storing the sum of the first signal and the second signal on a thirteenth capacitor of the pixel;
computing a sum of the first noise signal and the second noise signal, wherein computing the sum of the first noise signal and the second noise signal includes shorting the sixth capacitor storing the first noise signal with the ninth capacitor storing the second noise signal; and
storing the sum of the first noise signal and the second noise signal on a fourteenth capacitor of the pixel.

33. The method of claim 32, further comprising:
computing, using a difference amplifier of the pixel, a difference between (i) the sum of the first signal and the second signal and (ii) the sum of the first noise signal and the second noise signal; and
reading the difference out of the pixel.

34. The method of claim 32, wherein:
the first capacitor, the third capacitor, and the thirteenth capacitor refer to a first same capacitor of the pixel;

the fourth capacitor, the sixth capacitor, and the fourteenth capacitor refer to a second same capacitor of the pixel;

the second capacitor, the seventh capacitor, and the ninth capacitor refer to a third same capacitor of the pixel; and the fifth capacitor, the tenth capacitor, and the twelfth capacitor refer to a fourth same capacitor of the pixel.

35. The method of claim 1, wherein:
sampling the plurality of first voltage signals includes:
   sampling, on a first capacitor of the pixel, a first voltage for the first signal, and
   sampling, on a second capacitor of the pixel, a second voltage for the first signal;
capturing the first signal further includes computing a sum of the first voltage and the second voltage; and
computing the sum of the first voltage and the second voltage includes shorting the first capacitor with the second capacitor.

36. The method of claim 35, wherein capturing the first signal further includes storing the sum of the first voltage and the second voltage to a third capacitor of the pixel, wherein the third capacitor is one of the first and second capacitors.

37. The method of claim 36, wherein sampling the plurality of first voltage signals further includes:
   sampling, on a fourth capacitor of the pixel, a third voltage for the first signal, and
   sampling, on a fifth capacitor of the pixel different from the third capacitor, a fourth voltage for the first signal, wherein the fifth capacitor is another one of the first and second capacitors.

38. The method of claim 37, wherein capturing the first signal further includes:
   computing a sum of the third voltage and the fourth voltage, wherein computing the sum of the third voltage and the fourth voltage includes shorting the fourth capacitor with the fifth capacitor; and
   storing the sum of the third voltage and the fourth voltage on a sixth capacitor of the pixel, wherein the sixth capacitor is one of the fourth and fifth capacitors.

39. The method of claim 38, wherein sampling the plurality of fourth voltage signals includes sampling, on a seventh capacitor of the pixel different from the sixth capacitor, a first voltage for the first noise signal, wherein the seventh capacitor is another one of the fourth and fifth capacitors.

* * * * *

UNITED STATES PATENT AND TRADEMARK OFFICE
CERTIFICATE OF CORRECTION

| | | |
|---|---|---|
| PATENT NO. | : 12,363,457 B2 | Page 1 of 1 |
| APPLICATION NO. | : 18/451764 | |
| DATED | : July 15, 2025 | |
| INVENTOR(S) | : Andreas Suess et al. | |

It is certified that error appears in the above-identified patent and that said Letters Patent is hereby corrected as shown below:

In the Claims

In Column 55, Line 24, in Claim 3, delete "pixel; and the pixel." and insert -- pixel. --.

Signed and Sealed this
Twenty-first Day of October, 2025

John A. Squires
*Director of the United States Patent and Trademark Office*